(12) United States Patent
Gallant et al.

(10) Patent No.: US 10,891,054 B2
(45) Date of Patent: *Jan. 12, 2021

(54) PRIMARY DATA STORAGE SYSTEM WITH QUALITY OF SERVICE

(71) Applicant: NexGen Storage, Inc., Louisville, CO (US)

(72) Inventors: David A. Gallant, Denver, CO (US); Kelly E. Long, Westminster, CO (US); Paul A. Ashmore, Longmont, CO (US); Sebastian P. Sobolewski, Broomfield, CO (US)

(73) Assignee: NEXGEN STORAGE, INC., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/360,012

(22) Filed: Mar. 21, 2019

(65) Prior Publication Data
US 2019/0220191 A1 Jul. 18, 2019

Related U.S. Application Data

(63) Continuation of application No. 14/930,614, filed on Nov. 2, 2015, now Pat. No. 10,282,101, which is a (Continued)

(51) Int. Cl.
*G06F 3/06* (2006.01)
*G06F 7/24* (2006.01)

(52) U.S. Cl.
CPC ............ *G06F 3/061* (2013.01); *G06F 3/0614* (2013.01); *G06F 3/0619* (2013.01);
(Continued)

(58) Field of Classification Search
CPC ...... G06F 3/0619; G06F 3/061; G06F 3/0689; G06F 3/0649; G06F 7/24; G06F 3/0665; G06F 3/0614; G06F 3/0685
(Continued)

(56) References Cited

U.S. PATENT DOCUMENTS

| 5,881,311 A | 3/1999 | Woods |
| 6,233,653 B1 | 5/2001 | Abe et al. |

(Continued)

OTHER PUBLICATIONS

International Search Report and Written Opinion for International Patent Application No. PCT/US2012/063989, dated Jul. 21, 2014, 10 pgs.

(Continued)

*Primary Examiner* — David Yi
*Assistant Examiner* — Zubair Ahmed
(74) *Attorney, Agent, or Firm* — Sprinkle IP Law Group

(57) ABSTRACT

The invention is directed to a primary data storage system for use in a computer network in which a network allows user computers to transfer data to/from the primary data storage system. In one embodiment, the primary data storage system allows an administrator of the computer network to define two or more volumes on the primary data storage system and define quality of service goals for each volume. The primary data storage system operates so as allocate resources within the primary data storage system to the volumes based upon criticality and performance goals specified for each of the volumes.

26 Claims, 8 Drawing Sheets

Related U.S. Application Data continuation of application No. 13/671,544, filed on Nov. 7, 2012, now Pat. No. 9,176,708.

(60) Provisional application No. 61/556,820, filed on Nov. 7, 2011.

(52) U.S. Cl.
CPC .......... *G06F 3/0649* (2013.01); *G06F 3/0665* (2013.01); *G06F 3/0685* (2013.01); *G06F 3/0689* (2013.01); *G06F 7/24* (2013.01)

(58) Field of Classification Search
USPC ........................................................ 711/114
See application file for complete search history.

(56) References Cited

U.S. PATENT DOCUMENTS

| | | | |
|---|---|---|---|
| 6,487,562 B1 | 11/2002 | Mason, Jr. et al. | |
| 6,535,518 B1 | 3/2003 | Hu et al. | |
| 6,785,794 B2 | 8/2004 | Chase et al. | |
| 6,901,484 B2 | 5/2005 | Doyle et al. | |
| 6,912,585 B2 | 6/2005 | Taylor et al. | |
| 6,976,134 B1 | 12/2005 | Lolayekar et al. | |
| 7,107,403 B2 | 9/2006 | Modha et al. | |
| 7,206,860 B2 | 4/2007 | Murakami et al. | |
| 7,281,086 B1 | 10/2007 | More et al. | |
| 7,421,509 B2 | 9/2008 | Lolayekar et al. | |
| 7,519,725 B2 | 4/2009 | Alvarez et al. | |
| 7,539,824 B2 | 5/2009 | Lolayekar et al. | |
| 7,602,774 B1 | 10/2009 | Sundaresan et al. | |
| 7,623,457 B2 | 11/2009 | Hu | |
| 7,757,279 B2 | 7/2010 | Furukawa et al. | |
| 7,774,491 B2 | 8/2010 | Alvarez et al. | |
| 7,917,903 B2* | 3/2011 | Lumb ................... | G06F 9/4887 718/100 |
| 8,015,281 B2 | 9/2011 | Baker et al. | |
| 9,176,708 B2 | 11/2015 | Gallant et al. | |
| 10,282,101 B2 | 5/2019 | Gallant et al. | |
| 2003/0081544 A1 | 5/2003 | Goetzinger et al. | |
| 2003/0149838 A1 | 8/2003 | Mowery et al. | |
| 2005/0050270 A1 | 3/2005 | Horn et al. | |
| 2006/0259728 A1 | 11/2006 | Chandrasekaran et al. | |
| 2009/0138616 A1 | 5/2009 | Alvarez et al. | |
| 2009/0307421 A1 | 12/2009 | Galloway et al. | |
| 2010/0076805 A1 | 3/2010 | Batsakis et al. | |
| 2010/0211620 A1 | 8/2010 | Matsuzawa et al. | |
| 2010/0332401 A1 | 12/2010 | Prahlad et al. | |
| 2011/0196996 A1 | 8/2011 | Goyal | |
| 2012/0047287 A1* | 2/2012 | Chiu ..................... | G06F 3/0647 710/8 |
| 2012/0054329 A1 | 3/2012 | Gulati et al. | |

OTHER PUBLICATIONS

Office Action issued for U.S. Appl. No. 14/930,614, dated Jan. 17, 2017, 16 pgs.

Final Office Action issued for U.S. Appl. No. 14/930,614, dated Jun. 8, 2017, 19 pgs.

Office Action issued for U.S. Appl. No. 14/930,614, dated Nov. 9, 2017, 19 pgs.

Final Office Action issued for U.S. Appl. No. 14/930,614, dated Jul. 6, 2018, 18 pgs.

Notice of Allowance issued for U.S. Appl. No. 14/930,614, dated Jan. 23, 2019, 9 pgs.

A. Bhargava, FlexShare Design and Implementation Guide, Apr. 2006, pp. 1-30, NetApp Appliance, Inc.

Author Not Identified, Navisphere Quality of Service Manager (NQM) Applied Technology, Oct. 2006, pp. 1-13, EMC Corporation.

M. Woods, Optimizing Storage Performance and Cost with Intelligent Caching, Aug. 2010, pp. 1-15, NetApp, Inc.

International Preliminary Report on Patentability for International Patent Application No. PCT/US2012/063989, dated Aug. 21, 2014, 20 pgs.

Office Action issued for U.S. Appl. No. 13/671,554, dated Jul. 18, 2014, 28 pgs.

Office Action issued for U.S. Appl. No. 13/671,554, dated Feb. 13, 2015, 15 pgs.

Office Action in Canadian Patent Application No. 3019048, dated Jul. 19, 2019, 5 pgs.

Office Action in Canadian Patent Application No. 3019048, dated Jul. 10, 2020, 6 pgs.

* cited by examiner

Statistics Database Table    ← 258

| Component | UniqID | TimeStamp | Resolution | Throughput | | Queue Depth | | Latency | | UseCount | |
|---|---|---|---|---|---|---|---|---|---|---|---|
| | | | | Read | Write | Read | Write | Read | Write | Read | Write |
| CPU | 234 | 2362 | Second | 10 | 11 | 52 | 43 | 9 | 6 | 103 | 138 |
| CPU | 234 | 2300 | Minute | 15 | 9 | 76 | 34 | 16 | 4 | 94 | 97 |
| CPU | 234 | 2000 | Hour | 86 | 56 | 45 | 89 | 5 | 2 | 92 | 135 |
| CPU | 234 | 10 | Day | 59 | 87 | 47 | 53 | 16 | 23 | 145 | 123 |
| SSD | 154 | 2363 | Second | 108 | 105 | 63 | 74 | 13 | 18 | 98 | 101 |
| SSD | 154 | 2302 | Minute | 138 | 207 | 74 | 86 | 12 | 23 | 90 | 103 |
| SSD | 154 | 2005 | Hour | 172 | 173 | 76 | 72 | 14 | 21 | 82 | 113 |
| SSD | 154 | 17 | Day | 103 | 187 | 68 | 84 | 10 | 23 | 88 | 101 |
| Ether Net | 283 | 2363 | Second | 10 | 11 | 52 | 43 | 9 | 6 | 103 | 138 |
| Ether Net | 283 | 2302 | Minute | 15 | 9 | 76 | 34 | 16 | 4 | 94 | 97 |
| Ether Net | 283 | 2005 | Hour | 86 | 56 | 45 | 89 | 5 | 2 | 92 | 135 |
| Ether Net | 283 | 17 | Day | 59 | 87 | 47 | 53 | 16 | 23 | 145 | 123 |
| Criticality | 583 | 2363 | Second | 10 | 11 | 52 | 43 | 9 | 6 | 103 | 138 |
| Criticality | 583 | 2302 | Minute | 15 | 9 | 76 | 34 | 16 | 4 | 94 | 97 |
| Criticality | 583 | 2005 | Hour | 86 | 56 | 45 | 89 | 5 | 2 | 92 | 135 |
| Criticality | 583 | 17 | Day | 59 | 87 | 47 | 53 | 16 | 23 | 145 | 123 |
| Criticality | 584 | 2363 | Second | 10 | 11 | 52 | 43 | 9 | 6 | 103 | 138 |
| Criticality | 584 | 2302 | Minute | 15 | 9 | 76 | 34 | 16 | 4 | 94 | 97 |
| Criticality | 584 | 2005 | Hour | 86 | 56 | 45 | 89 | 5 | 2 | 92 | 135 |
| Criticality | 584 | 17 | Day | 59 | 87 | 47 | 53 | 16 | 23 | 145 | 123 |
| Criticality | 585 | 2363 | Second | 10 | 11 | 52 | 43 | 9 | 6 | 103 | 138 |
| Criticality | 585 | 2302 | Minute | 15 | 9 | 76 | 34 | 16 | 4 | 94 | 97 |
| Criticality | 585 | 2005 | Hour | 86 | 56 | 45 | 89 | 5 | 2 | 92 | 135 |
| Criticality | 585 | 17 | Day | 59 | 87 | 47 | 53 | 16 | 23 | 145 | 123 |
| Volume | 493 | 2363 | Second | 10 | 11 | 52 | 43 | 9 | 6 | 103 | 138 |
| Volume | 493 | 2302 | Minute | 15 | 9 | 76 | 34 | 16 | 4 | 94 | 97 |
| Volume | 493 | 2005 | Hour | 86 | 56 | 45 | 89 | 5 | 2 | 92 | 135 |
| Volume | 493 | 17 | Day | 59 | 87 | 47 | 53 | 16 | 23 | 145 | 123 |
| Initiator | 697 | 2363 | Second | 10 | 11 | 52 | 43 | 9 | 6 | 103 | 138 |
| Initiator | 697 | 2302 | Minute | 15 | 9 | 76 | 34 | 16 | 4 | 94 | 97 |
| Initiator | 697 | 2005 | Hour | 86 | 56 | 45 | 89 | 5 | 2 | 92 | 135 |
| Initiator | 697 | 17 | Day | 59 | 87 | 47 | 53 | 16 | 23 | 145 | 123 |

Figure 2A

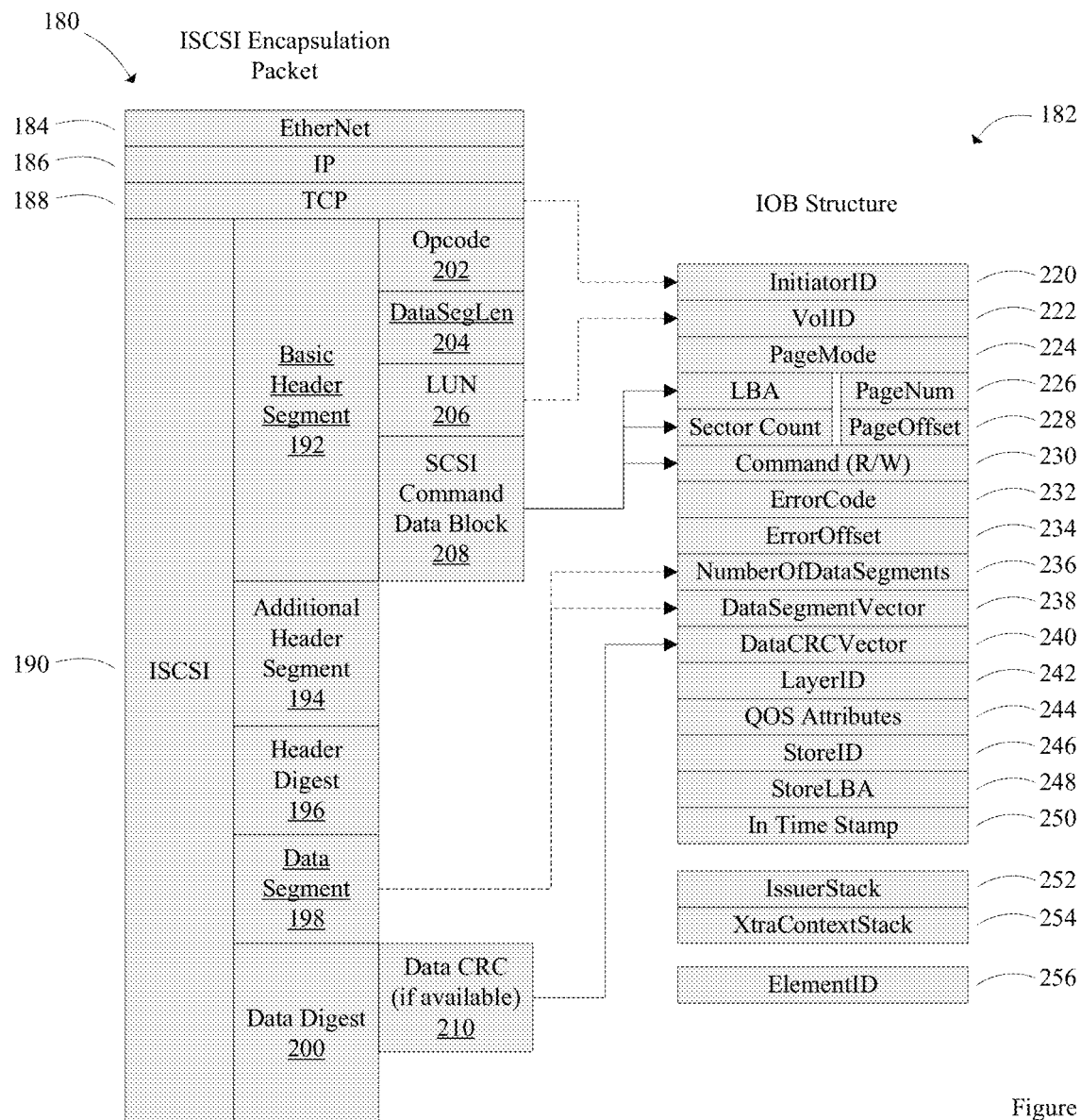
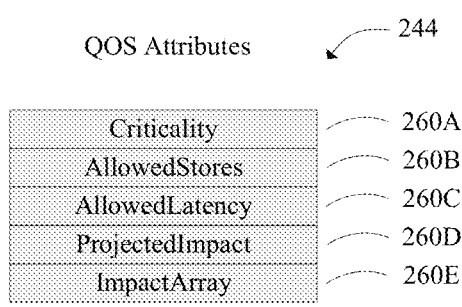
Figure 3
Figure 3A

PRIMARY DATA STORAGE SYSTEM WITH QUALITY OF SERVICE

RELATED APPLICATIONS

The present application is a continuation of, and claims a benefit of priority under 35 U.S.C. 120 of, U.S. patent application Ser. No. 14/930,614 filed Nov. 2, 2015, entitled "Primary Data Storage System with Quality of Service," issued as U.S. Pat. No. 10,282,101, which is a continuation of, and claims a benefit of priority under 35 U.S.C. 120 of, U.S. patent application Ser. No. 13/671,544 filed Nov. 7, 2012, entitled "Primary Data Storage System with Quality of Service," issued as U.S. Pat. No. 9,176,708, which claims a benefit of priority under 35 U.S.C. 119 to U.S. Provisional Application No. 61/556,820 filed Nov. 7, 2011, entitled "Primary Data Storage System with Quality of Service," which are hereby incorporated herein for all purposes.

FIELD OF THE INVENTION

The present invention relates to a primary data storage system suitable for use in a computer network.

BACKGROUND OF THE INVENTION

A computer network typically comprises multiple user computers, a primary data storage system that stores data provided by the user computers and provides previously stored data to the user computers, and a network system that facilitates the transfer of data between the user computers and the primary data storage system. The user computers typically have local data storage capacity. In contrast, the primary data storage system is separate from the user computers with local data storage capacity and provides the ability for the user computers to share data/information with one another. The network system that is between the user computers and the primary data storage system can take a number of forms. For example, there can be a dedicated channel between each of the user computers and the primary data storage system. More typically, the network system includes switches (fabric switches) and servers (in certain situations known as initiators) that cooperate to transfer data between the primary data storage system and the user computers. Also associated with many computer networks is a secondary data storage system. The secondary data storage system provides secondary storage of data, i.e., storage that is not constantly available for use by one or more user computers when the computer network is in a normal/acceptable operating mode. As such, many secondary data storage systems are employed to backup data and to facilitate other maintenance functions. In contrast, primary data storages are substantially constantly available for use by one or more user computers when the computer network is in a normal/acceptable operating mode that involves substantial interaction with the user computers.

SUMMARY OF THE INVENTION

The present invention is directed to a primary data storage system that comprises: (a) one or more i/o ports, each i/o port capable of receiving a packet with a block command and providing a packet with a reply, (b) a data store system having at least one data store capable of receiving and storing data in response to a write block command and/or retrieving and providing data in response to a read block command, and (c) a storage processor with a processor and application memory for executing computer code related to the transfer of data between the one or more i/o ports and the at least one data store.

In one embodiment of the invention, the storage processor operates to allocate resources within the primary data storage system to volumes that are competing for resources in the system based upon criticality and performance goals specified for each of the volumes. By way of background, a volume is an area of data storage that may or may not have an actual physical boundary. For example, the storage space on a disk drive can be divided up into several volumes, in which case none of the volumes have a complete physical boundary. In contrast, the storage space on a disk drive can be entirely allocated to a single volume, in which case the volume has a complete physical boundary. The primary data storage system allows the data store system to be allocated to two or more volumes. Further, criticality and performance goals can be specified for each volume. For instance, one volume may be more critical than another volume and this criticality may manifest itself in the need for low latency or turnaround time in responding to read/write commands relating to the volume.

In one embodiment, the system provides a data store system that is capable of having at least two volumes with each volume having a defined criticality and defined quality of service goals. The storage processor includes a sorting processor for sorting an input queue or string of read/write block commands directed to at least two volumes into an output string of read/write block commands that reflects the criticality and performance goals of the volumes. The sorting processor, in conducting such a sort, uses statistical data provided by a statistics database. In a particular embodiment, the sorting processor uses a substantial amount of statistical data. To elaborate, when the sorting processor is assessing a particular read/write block command, the processor takes into account the "criticality" attributed to the volume to which the particular read/write block command relates, statistical data that relates to the volume to which the particular read/write block command relates, criticality and statistical data that relates to the other volumes in the system (i.e., the other volumes that are competing for resources within the system), statistical data relating to the hardware (e.g., disk drives, solid drives, switches etc.) that are likely to be involved in carrying out the read/write block command, and characteristics of the read/write command itself (e.g., the size of the data transfer that is the subject of the read/write block command).

In a particular embodiment, the statistical data includes both current statistical data and historical statistical data relating to the volume to which a particular read/write command relates and to the other volumes in the system. The sorting processor uses both current and historical data to facilitate the identification of trends that, in turn, facilitate sorting or prioritization of the read/write block commands. For example, if the system has operated so that the execution of read/write block commands relating to one volume have resulted in the volume approaching or exceeding the performance goals assigned to the volume but have caused another volume to increasingly fall behind its performance goals, the current and historical data allows this trend to be identified. Further, the sorting processor is capable of operating in a fashion that brings the volume that was increasingly falling behind in meeting its performance goals closer to meeting its performance goals. As another example, if the read/write block commands being directed to a particular volume require significantly less resources than would be expected for the criticality and performance goals defined for the volume, the use of the current and historical data allows this trend to be recognized. Further, if the sorting processor identifies such a trend, the sorting processor can exploit this trend by favoring the sorting or prioritization of read/write block commands directed to other volumes relative to read/write block commands directed to the underutilized but over weighted volume.

In yet a further embodiment, the sorting processor evaluates or prioritizes a particular read/write block command based on the weighted sum of several factors, including criticality, characteristics of the read/write command, and statistical data relating to whatever volumes have been defined in the system and the hardware present in the system for carrying out the read/write block commands. The sorting processor implements such a weighted sum in a fashion that recognizes the time constraints present in a primary data storage system. To elaborate, if a particular read/write block command is recognized as primarily impacting throughput and having considerably less impact on IOPS, the sorting processor can forego any calculation relating to IOPS in reaching a weighted sum or effectively set the coefficient associated with any IOPS factors to zero. Stated differently, the weighted sum takes into account the factors that are likely to have a substantial impact on the weighted sum. For example, in a sorting processor that includes (a) a first sub-string processor that sorts a string of read/write block commands by criticality and produces a queue of read/write block commands with a "mission critical" criticality and (b) a second sub-string processor that sorts the read/write block commands in the "mission critical" queue by impact on the system in terms of throughput, IOPS, and latency, the sorting processor substantially ignores data relating to non-mission critical and non-throughput impacting factors in producing the queue of "mission critical—throughput impact" read/write block commands.

In another embodiment, the sorting processor performs at least a three-stage sort of an input queue of block commands that relate to the transfer of data to or from the data store system and that relate to two or more volumes with criticality and performance goal(s) associated with each volume. In the first stage, the storage processor initially sorts the block commands in the input queue based upon the criticality of the volume to which the block command relates. For instance, if there are three volumes respectively with "critical", "somewhat critical", and "non-critical" criticalities, the processor would sort the block commands into three streams, one for each of the volumes. In the second stage, each of the three streams of block commands is sorted into two or more sub-streams based upon the projected impact of the execution of the block commands. The sorting considers the characteristics of the data associated with the block command and/or statistical data relating to the volume with which the command is associated. For example, a stream of block commands could be sorted into a latency stream, a throughput stream, and an input/output per second stream based upon the data associated with each of the commands and statistical data relating to the volume. In the third stage, all of the sub-streams for each of the volumes are sorted into an execution queue based on statistical information relating to the hardware associated with the system.

BRIEF DESCRIPTION OF THE DRAWINGS

FIG. 2A illustrates an example of a statistics database that receives data from various elements of the primary data storage system and provides data to various elements of the system that, in many instances, use the data in performing a data storage related operation;

FIG. 3 illustrates an iSCSI encapsulation packet and an input/out block (IOB) derived from the packet;

FIG. 3A illustrates the QoS attributes identified in FIG. 3;

DETAILED DESCRIPTION

Networked Computer System

Figure 1:
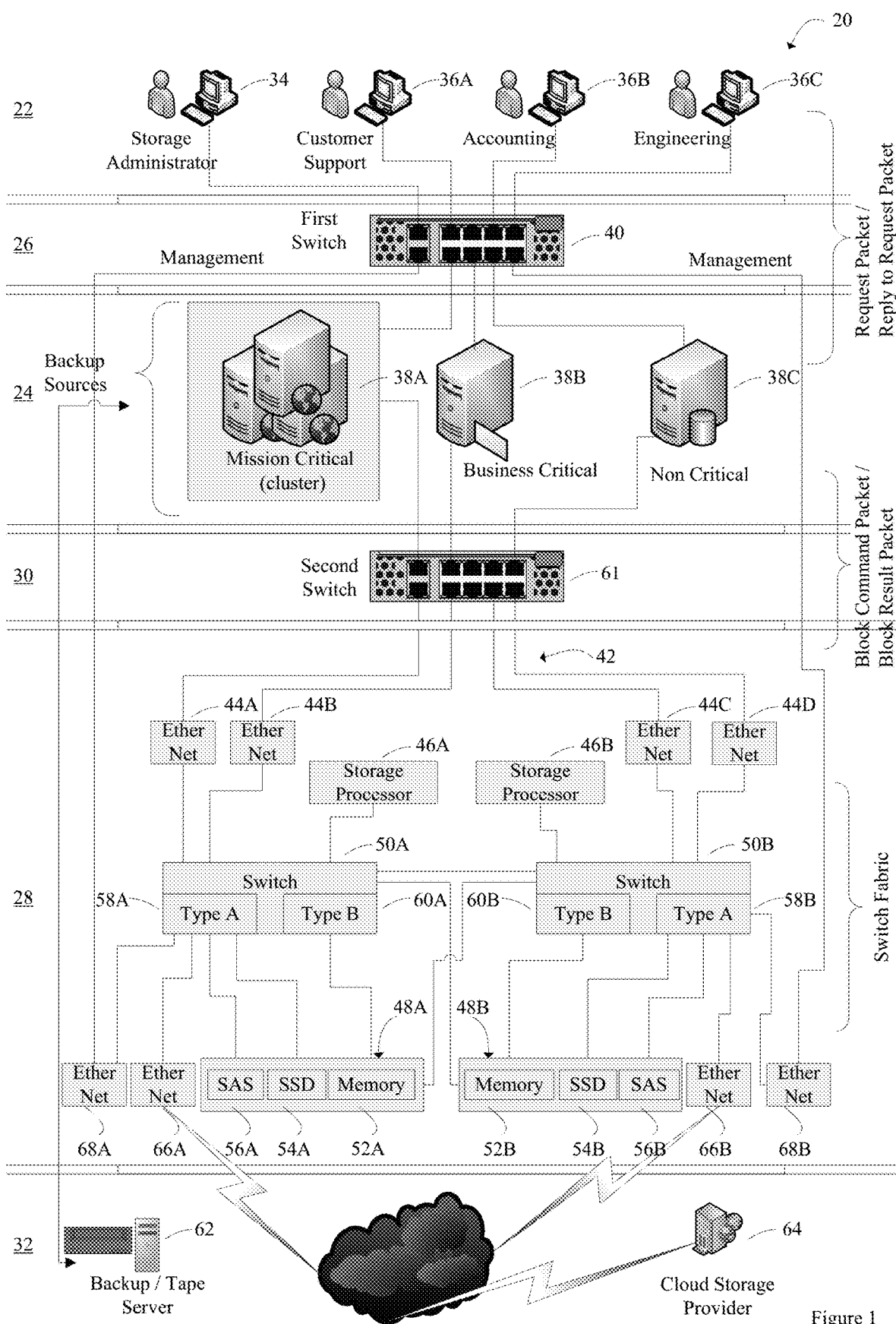
FIG. 1 illustrates an embodiment of a networked computer system that includes an embodiment of a primary data storage system.

With reference to FIG. 1, an embodiment of a networked computer system that includes an embodiment of a primary data storage system is illustrated. The networked computer system, hereinafter referred to as system 20, includes a user level 22, an initiator level 24, a first switch level 26 that facilitates communication between the user level 22 and the initiator level 24, a primary data storage level 28, a second switch level 30 that facilitates communications between the initiator level 24 and the primary data storage level 28, and a secondary data storage level 32.

User Level. The user level 22 includes at least one user computer that is capable of being used in a manner that interacts with the primary data storage level 28. A user computer is capable of requesting that: (a) data associated with the user computer be sent to the primary data storage level 28 for storage and (b) data stored in the primary data storage level 28 be retrieved and provided to the user computer. At least one user computer associated with the user level is a storage administrator computer 34 that provides a storage administrator or system administrator with the ability to define the manner in which the data storage provided by the primary data storage level 28 is utilized. As illustrated in FIG. 1, the user level 22 typically includes a plurality of user computers with at least one of the plurality of user computers being associated with a storage administrator and the other user computers being associated with other entities. For the purpose of illustration, the user level 22 includes user computers 36A-36C respectively associated with a customer support department, an accounting department, and an engineering department.

Initiator Level. The initiator level 24 includes at least one initiator that operates to translate a request from a user computer into one or more block command packets. A request from a user computer is in the form of a request packet that conforms to a packet protocol such as TCP, IP, Web, DB, and FileShare. A block command packet conforms to a block protocol that includes block commands for data storage devices that operate on one or more blocks of data. Examples of block protocols are the Internet Small Computer System Interface protocol (iSCSI), the Fiber Channel protocol (FC), TCP, and IP. Examples of block commands include: (a) a block write command that directs a data storage device to write one or more blocks of data to storage media associated with the device and (b) a block read command that directs a data storage device to read one or more blocks of data from a storage media associated with the device. A block of data is a fixed and predetermined number of contiguous bytes of data that is or will be resident on some kind of storage media. Typical block sizes are 512, 1024, 2048, and 4096 bytes. For example, a request from a user computer to read a large file of data resident at the primary data storage level 28 is likely to be translated by an initiator into multiple block command packets that each relate to one or more blocks of data that is/are part of the requested file.

The initiator also operates to translate a block result packet, a packet that is received by the initiator and provides the result or a portion of the result of the execution of a block command associated with a block command packet, into a reply to request packet. The initiator provides the reply to the request packet to the appropriate user computer.

As illustrated in FIG. 1, the initiator level 24 commonly includes a plurality of initiators with each of the initiators capable of: (a) processing request packets from each of the user computers to generate block command packets and (b) processing block result packets to produce reply to request packets that are provided to the appropriate user computers. For the purpose of illustration, the initiator level includes initiators 38A-38C.

An initiator may comprise a cluster of two or more computers that each endeavors to process a request from a user computer and that provide redundancy in the event that one or more of the computers fail. Typically, an initiator that is designated to process high priority or critical requests comprises multiple computers, thereby providing redundancy should any one of the computers fail.

First Switch Level. The first switch level 26 provides the ability for one or more user computers at the user level 22 to communicate with one or more initiators at the initiator level 24. More specifically, the first switch level 26 operates so as to receive a request packet from a user computer, process the request packet to determine which initiator should receive the request packet, and routes the request packet to the appropriate initiator. Conversely, the first switch level also operates to receive a reply to request packet from the initiator level 24, process the reply to request packet to determine which user computer should receive the reply to request packet, and routes the reply to request packet to the appropriate user computer.

The first switch level 26 can include a single switch that connects one or more user computers to one or more initiators or multiple switches that each connects one or more user computers to one or more initiators. For the purpose of illustration, the first switch level 26 includes a switch 40 that is capable of establishing communication paths between the user computers 34 and 36A-36C and the initiators 38A-38C.

Primary Data Storage Level. The primary data storage level 28 (or primary data storage system 28) operates to receive a block command packet from an initiator, attempt to execute the block command contained in the block command packet, produce a block result packet that contains the result of the attempted execution or execution of the block command, and provide the block result packet to the initiator that sent the related block command packet to the primary data storage system 28.

Typical block commands include a write command and a read command. In the case of a write command, the primary data storage system 28 attempts to write one or more blocks of data to a data store (sometimes referred to simply as a "store") associated with the primary data storage system 28. With respect to a read command, the primary data storage system 28 attempts to read one or more blocks of data from a data store associated with the primary data storage system 28 and provide the read data to the initiator.

The primary data storage system 28 includes at least one storage processor and at least one data store. The primary data storage system 28 also includes at least one switch when the at least one storage processor and the at least one data store associated with the at least one storage processor will accommodate two or more independent communication paths between the at least one storage processor and the at least one data store.

A storage processor includes an application memory and a processor for executing code resident in the application memory to process a block command packet. In one embodiment, the processor and the application memory are embodied in a SuperMicro Superserver 6036ST.

A data store is (a) a single data storage device or element or (b) a combination of data storage devices or elements. Examples of a single data storage element that can each be a data store include a CPU bus memory, a disk drive with a magnetic/optical disk, a solid state drive, and a tape drive with a tape. An example of a combination of data storage devices or elements that are configured to operate as a single data store is a group of disk drives configured as a Redundant Array of Independent Drives or RAID.

A data store can be characterized by the attributes of path redundancy, data redundancy, and persistence.

The path redundancy attribute is a measure of the number of redundant and independent paths that are available for writing data to and/or reading data from a data store. As such, the value of the path redundancy attribute is the number of independent paths (i.e., the independent I/O ports associated with the data store) less one. The value of the path redundancy attribute is one or greater when there are at least two independent paths available for writing data to and/or reading data from the data store. If there is only one independent path available for writing data to and/or reading from a data store, the path redundancy is zero.

The data redundancy attribute is a measure of the number of failures of elements in a data store that can be tolerated without data loss. As such, the value of the data redundancy attribute is the number of elements in the data store less the number of elements that can fail before there is data loss. For example, if a data store comprises two disk drives (elements) with the data on one disk drive mirroring the data on the other disk drive, the value of the data redundancy attribute is one because the failure of one disk drive means that the data can still be recovered but the failure of both disk drives would mean that there would be data loss. As another example, the value of the data redundancy attribute of a RAID-6 data store comprises six disk drives (elements) is two because the two of the disk drives (elements) can fail and the data can still be recovered but the failure of three or more disk drives (elements) would preclude the recovery of the data.

The persistence attribute is an indication of: (a) the presence of data on a data store for a substantial period of time without power being applied to the data store or (b) data remaining on a data store for a substantial period of time due to the presence of a primary power source and an independent backup power source that operates in the event of the failure of the primary power source. For example, if a data store is a single magnetic disk drive, the persistence attribute is "positive" because data will remain on the magnetic disk drive for a substantial period of time in the absence of power being applied to the drive. In contrast, a data store that is volatile memory without battery backup has a persistence attribute that is "negative" because data established in the memory will not remain in the memory in the absence of power being applied to the memory.

A data store also provides at least one of a number of possible combinations of read and write operations, including read-only, read and write, write-only, and write-once-read-many (WORM).

The switch facilitates communications between each of the storage processors or a subset of all of the storage processors associated with the primary data storage level 28 and each port of all of the data stores associated with the primary data storage system 28 or a subset thereof.

In many situations, redundancy that allows the primary data storage system 28 to continue operation in the event of a predetermined level of failure of a storage processor, an element of a data store, and or a switch is desired. This redundancy refers to path redundancy in which there are at least two separate and independent paths extending at least part of the way between an I/O interface of the primary data storage system 28, the interface that initially receives a block command packet from an initiator and from which a block result packet is transmitted to an initiator, and a data store.

To provide one embodiment of path redundancy, the primary data storage system 28 includes: (a) an I/O interface 42 comprises network cards 44A-44D, (b) first and second storage processors 46A, 46B, (c) first and second data store systems 48A, 48B, and (d) first and second switches 50A, 50B. It should be appreciated that storage processors 46A, 46B could each be a single processor or multiple processors operating cohesively.

The network cards 44A-44D (sometimes referred to as "Ethernet cards") of the I/O interface 42 are each addressable by one or more of whatever initiators are operative at the initiator level 24. In the illustrated embodiment, each of the network cards 44A-44D is an Ethernet card that is appropriate for use when all of the initiators that are active at the initiator level 24 are conducting communications with the primary data storage system 28 pursuant to the Ethernet protocol. Other cards can be employed if a different protocol, such as Fibre Channel, is used by the initiators.

The first and second data store systems 48A, 48B each comprises a portion of a data store, a portion of each of multiple data stores, a data store, multiple data stores, or combinations thereof.

The first and second switches 50A, 50B each provide at least a portion of the ability to connect (a) one or more of the network cards 44A-44D to a selected one of the storage processors 46A, 46B, (b) first and second storage processors 46A, 46B to one another, and (c) a selected one of the storage processors 46A, 46B to a selected one of the first and second data store systems 48A, 48B. The ability of switch 50A to establish a connection to a store in the data store system 48B depends on the store having at least one of two input/output ports available for establishing a connection with the switch. Similarly, the ability of switch 50B to establish a connection to a store in the data store system 48A depends on the store having one or at least two input/output ports available for establishing a connection with the switch.

The path redundancy that is provided by the embodiment of the primary data storage system 28 shown in FIG. 1 contemplates the failure of: (a) one or more but less than all of the Ethernet cards 44A-44D, (b) one of the first and second storage processors 46A, 46B, (c) one of the first and second switches 50A, 50B, and/or (d) a data store associated with one of the first and second data store systems 48A, 48B.

To elaborate, partial path redundancy is provided by rendering at least two of the network cards 44A-44D with the same initiator. If one of the at least two Ethernet cards fails, the other operative Ethernet card(s) provide(s) path redundancy for the initiator.

Partial path redundancy is provided by the two storage processors 46A, 46B. If one of the first and second storage processors 46A, 46B fails, the other storage processor can be utilized to provide the path redundancy between the I/O interface 42 and a data store. In this regard, the non-failing storage processor may use one or both of the switches 50A, 50B. For example, if the storage processor 46A is exclusively responsible for communications conducted over Ethernet card 44A, storage processor 46A needs to process a command propagated over Ethernet card 44A and associated exclusively with the first data store system 48A, and storage processor 46A fails, the storage processor 46B can utilize both the first and second switches 50A, 50B to complete a communication path between the Ethernet card 44A and the first data store system 48A, i.e., the storage processor 46B utilizes the first and second switches 50A, 50B to communicate with both the Ethernet card 44A and the first data store system 48A.

Partial path redundancy is provided by the first and second switches 50A, 50B. If one of the first and second switches 50A, 50B fails, the other switch can be utilized to provide the necessary path redundancy. This path redundancy is dependent upon the non-failing switch having: (a) access to a portion of the data store that provides data redundancy relative to the portion of the data store that is no longer accessible due to the failure of the other switch and (b) access to an Ethernet card that can be addressed by the same initiator as the Ethernet card(s) that is/are no longer available due to the failure of the other switch. For example, if Ethernet cards 44A and 44C are each addressable by the same initiator, the data store systems 48A and 48B each include an element that together define a data store in which one element mirrors the other element, and switch 50A fails, the switch 50B can be utilized to establish the necessary communication between the Ethernet card 44C and the element in data store system 48B.

Additionally, in many situations, multiple data stores that have different storage characteristics (e.g., speed, capacity, redundancy and/or reliability) are desired. In this regard, the first data store system 48A comprises: (a) a first data store that is a first CPU bus memory 52A (sometimes referred to as memory store 52A) and is relatively fast but with relatively low capacity and no redundancy, (b) a second data store that is a first solid state disk or drive (SSD) 54A with less speed but greater capacity relative to the first CPU bus memory 52A and no redundancy, and (c) a third data store in the form of a first RAID disk array 56A with less speed and greater capacity than the first solid state disk 54A and redundancy. CPU bus memory is memory that is accessible to a processor of a storage processor via the processor's address bus, available for use by the processor, useable by the processor in processing a block command packet, and does not contain any portion of the application program that is executed or could be executed in the processing of a block command packet. In contrast, the processor accesses the first SSD 54A and the first RAID disk array 56A via an expansion bus (e.g., PCIe). Relatedly, stores having similar characteristics are typically configured within a primary data storage system so as to constitute a tier.

It should be appreciated that the first data store system 48A may comprise other combinations of partial data stores and/or data stores. For instance, the first data store system 48A could include a first disk drive and the second data store system 48B could include a second disk drive, the first and second disk drives together forming a data store in which the first and second disk drives mirror one another to provide data redundancy. In the illustrated embodiment, the second data store system 48B includes data stores in the forms of a second CPU bus memory 52B (sometimes referred to as memory store 52B), a second SSD 54B, a second RAID disk array 56B. It should be appreciated that the second data store system 48B can also include other combinations of data stores and partial data stores.

In a data store system that includes CPU bus memory and non-CPU bus data storage, the switch that is used to establish connections between the processor of a storage processor and the data store system comprises a type A switch that establishes connections with the non-CPU bus data storage and a type B switch that establishes connections with the CPU bus memory.

Because the first and second data store systems 48A, 48B respectively include CPU bus memories 52A, 52B, the first and second switches 50A, 50B respectively include type B switches 60A, 60B that respectively allow the processors of the storage processors 46A, 46B to establish communication paths with the CPU bus memories 52A, 52B. A type B switch comprises the hardware, software, and/or firmware associated with a storage processor that allow the processor to access the memory locations on the CPU memory bus associated with the CPU bus memory.

Further, because the first and second data store systems 48A, 48B respectively include non-CPU bus data storage in the form of SSD and SAS devices, the first and second switches 50A, 50B respectively include type A switches 58A, 58B that respectively allow the processors of the storage processors 46A, 46B to establish communication paths with the non-CPU bus data stores. A type A switch comprises the hardware, software, and/or firmware associated with an expansion bus that allows the processor to access the data on the non-CPU bus data storages.

Second Switch Level. The second switch level 30 provides the ability for each of the initiators associated with the initiator level 24 to communicate with at least one network card associated with the primary data storage system 28, the at least one network card being associated with at least one storage processor of the primary data storage system 28. More specifically, the second switch level 30 operates to receive a block command packet from an initiator and process the block command packet so as to route the packet to the address that is associated with a particular network card. Conversely, the second switch level 30 also operates to receive a block result packet from the primary data storage system 28 and process the block result packet so as to route the packet to the appropriate initiator.

The second switch level 30 can include a single switch that selectively connects one or more initiators to one or more network cards or multiple switches that each selectively connects one or more initiators to one or more network cards. For the purpose of illustration, the second switch level 30 includes switch 61 that is capable of selectively establishing a communication path between each of the initiators 38A-38C and each of the network cards 44A-44D.

Secondary Data Storage Level. The secondary data storage level 32 provides secondary storage of data, i.e., storage that is not constantly available for use by one or more user computers when the system 20 is in a normal/acceptable operating mode. In contrast, primary data storage is substantially constantly available for use by one or more user computers when the system 20 is in a normal/acceptable operating mode. The secondary data storage level 32 can include many different types of data storage, including tape drives, robotic data storage systems that employ robots to move storage media between players/recorders and storage locations, "cloud" storage etc. It should be appreciated that these types of data storage and other types of data storage that are largely used as secondary data storage can, in appropriate circumstances, become primary storage.

The secondary data storage level 32 includes a backup/tape server 62 that communicates with one or more of the initiators at the initiator level 24 in response to a request packet issued by a user computer at the user level 22.

The secondary data storage level 32 also includes a cloud storage provider 64 that is accessible to the primary data storage system 28. In the illustrated embodiment, the cloud storage provider 64 can be a part of a data store, part of multiple data stores, a data store, multiple data stores, or combinations thereof that is respectively accessible to the storage processors 46A, 46B via network cards 66A, 66B (which are Ethernet cards in the illustrated embodiment) and the type A switches 58A, 58B respectively associated with switches 50A, 50B.

System Administrator Communication Path. The system administrator computer 34 communicates with the primary data storage system 28 and, more specifically, the storage processor(s) in the primary data storage system 28 to define the manner in which the data storage provided by the primary data storage system 28 can be utilized. The communication path between the system administrator computer 34 and a storage processor in the primary data storage system 28 is from the system administrator computer 34 to the switch 40 and from the switch 40 to a network card. The network card and the storage processor can be connected to one another via the switch in the primary data storage system 28 that services the network cards associated with the initiators.

In the illustrated embodiment, the system administrator computer 34 respectively communicates with the storage processors 46A, 46B via network cards 68A, 68B and switches 50A, 50B.

It should be appreciated that the administrator computer 34 can also communicate with the storage processors 46A, 46B via one or more paths that include the first switch level 26, the initiator level 24, and the second switch level 30.

Primary Data Storage Level Communications

The primary data storage system 28 receives and processes two types of communications. The first type of communications is administrator command packets related communications. Administrator command packets are processed using a management stack. The second type of communications is block command packets that relate to the writing of data to a data store or the reading of data from a data store. Block command packets are processed using an IO stack.

Figure 2:
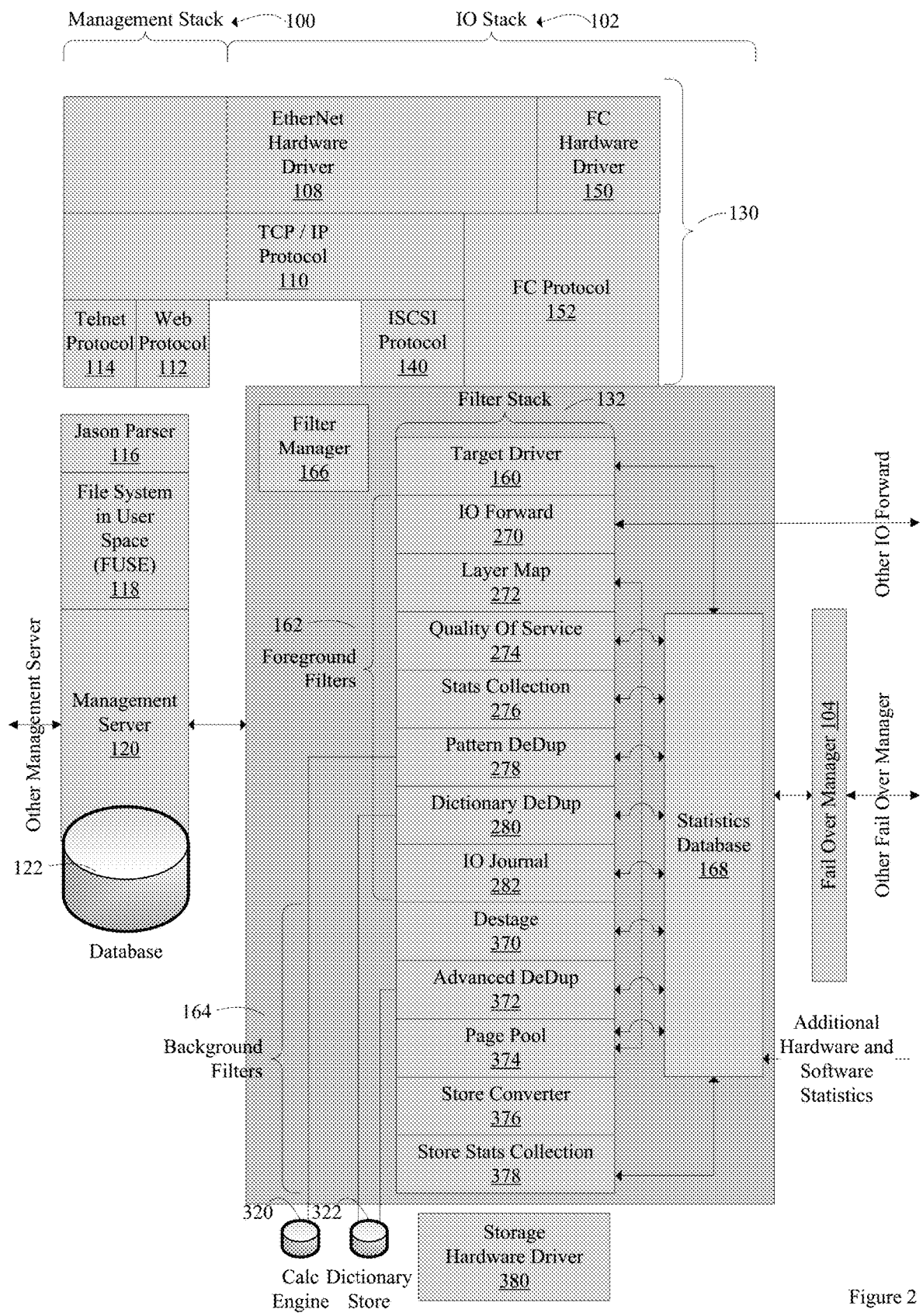
FIG. 2 is a block diagram of the management stack that processes administrator related communications, an I/O stack that processes communications relating to data storage, and fail-over stack that facilitates the transfer of responsibility for a volume between storage processors associated with the embodiment of the primary data storage system shown in FIG. 1.

With reference to FIG. 2, the administrator command packets are processed using a management stack 100. There is a management stack 100 associated with each storage processor at the primary data storage system 28. The management stack 100 is embodied in software that is executed by the storage processor. Generally, the management stack 100 operates to receive an administrator command packet that relates to the primary data storage system 28, processes the administrator command packet, and provides a reply packet, if appropriate. The receiving, processing, and replying of an administrator command packet by the management stack 100 involves interaction with other software elements and hardware elements within the primary data storage system 28. Among the software elements with which the management stack interacts are: an IO stack and, if there is another storage processor, a fail-over manager and a second management stack. An example of a hardware element that interacts with the management stack 100 is a network card. In addition, the management stack 100 operates to conduct communications with any other storage processors at the primary data storage system 28.

With continuing reference to FIG. 2, the block command packets are processed by an IO stack 102. An IO stack 102 is associated with each storage processor at the primary data storage system 28. Generally, the IO stack 102 operates to receive a block command packet that relates to the primary data storage system 28, processes the block command packet, and provides a result packet if appropriate. The process of receiving, processing, and replying of a block command packet by the IO stack 102 involves interaction with other software elements and hardware elements within the primary data storage system 28. Among the software elements with which the IO stack 102 interacts are: the management stack 100 and, if there is another storage processor, the fail-over manager associated with the other storage processor. An example of a hardware element that interacts with the IO stack 102 is a network card.

The IO stack 102 also communicates with a fail-over manager 104. If there is more than one storage processor at the primary data storage level 28, there is a fail-over manager 104 associated with each storage processor. Generally, the fail-over manager 104 operates to: (a) initiate a request from the "home" storage processor (i.e., the storage processor with which the fail-over manager is associated) to a "foreign" storage processor (i.e., a storage processor other than the "home" storage processor) to transfer responsibility for a logical unit number (LUN) or volume to the "foreign" storage processor and (b) facilitate the processing of a request from a "foreign" storage processor to transfer responsibility for a volume to the "home" storage processor. A LUN or volume is a unit of storage within the data store(s) provided by the primary data storage system 28. A volume typically is a portion of a data store but can be a portion of each of multiple data stores, a data store, multiple data stores, or combinations thereof.

Management Stack

The management stack 100 operates to: (a) receive an administrator command packet (b) communicate with the block processing stack to the extent necessary to process an administrator command packet, and (c) transmit a reply packet directed to the administrator computer 34 to the extent the processing of an administrator command packet requires a reply. Examples of administrator command packets include packets that relate to the creation of a LUN/volume within the primary data storage system 28, the assignment of Quality-of-Service (QoS) goals for a LUN/volume, the association of a LUN/volume with an initiator, the configuration of a network card (i.e., the assigning of an address to the Ethernet card so that the card is available to one or more initiators), requesting of data/information on the operation of a LUN/volume, the destruction of a LUN, and maintenance operations.

The management stack 100 conducts communications with the IO stack 102 that relate to a volume(s) for which the IO stack 102 is responsible. Among the communications with the IO stack 102 are communications that involve the creation of a volume, the assignment of QoS goals to a volume, the association of a volume with an initiator, the configuration of an network card, the acquisition of data/information relating to a volume or volumes for which the IO stack 102 is responsible, and the destruction of a volume.

The management stack 100 is also capable of communicating with a fail-over manager 104 via the IO stack 102. For example, if an administrator wants to temporarily disable the IO stack 102 to update the IO stack 102 but does not want to disable one or more of the volumes for which the IO stack 102 is responsible, an administrator command packet can be issued to implement an administrator fail-over in which the management stack 100 communicates with the fail-over manager 104 via the IO stack 102 to transfer responsibility for the relevant volumes to another storage processor in the primary data storage system 28.

The management stack 100 is also capable of communicating with the management stacks associated with other storage processors at the primary data storage system 28 to facilitate coordination between the storage processors. For example, the management stack 100 communicates volume creation/destruction, changes in QoS for a volume, network card address changes, administrator identification and password changes, and the like to the management stacks associated with other storage processors in the system.

The management stack 100 comprises: (a) an Ethernet hardware driver 108, a TCP/IP protocol processor 110, a Web protocol processor 112 and/or a Telnet protocol processor 114, a JavaScript Object Notation (JSON) or Jason parser 116, a Filesystem in Userspace (FUSE) 118, a management server 120, and a management database 122.

The Ethernet hardware driver 108 controls an Ethernet card so as to produce the electrical signals needed to receive a message, such as an administrator command packet, and transmit a message, such as reply packet. The TCP/IP protocol processor 110 at the TCP level manages the reassembly (if needed) of two or more packets received by an Ethernet card into the original message (e.g., an administrator command packet) and the disassembly (if needed) of a message into two or more packets for transmission (e.g., a reply to an administrator command).

The TCP/IP protocol processor 110 at the IP level assures the addressing of packets associated with a message. With respect to received packets, the IP level confirms that each of the received packets does, in fact, belong to the IP address associated with the Ethernet card. With respect to packets that are to be transmitted, the IP level assures that the each packet is appropriately addressed so that the packet gets to the desired destination. With respect to a received message, the TCP level also recognizes the packet as requiring further routing through the management stack 100, i.e., to the Web protocol processor 112 or Telnet protocol processor 114. The TCP/IP protocol processor 110 also performs other processing in accordance with the protocols, e.g., ordering packets, checksum etc.

The Web protocol processor 112 is used when the administrator computer 34 is employing a browser to interact with the management stack of the primary data storage system 28. The Web protocol processor 112 includes a Hyper Text Transport Protocol (HTTP) daemon that receives a message (e.g., an administrator command packet) and processes the message by passing the message on to the JSON parser 116. Subsequently, the daemon is informed by the JSON parser 116 of any reply to the message and passes the reply (Web pages etc.) on up to the TCP/IP protocol processor 110 for further processing.

As an alternative to the Web protocol processor 112, a Telnet protocol processor 114 can be utilized. The Telnet protocol processor 114 includes a daemon that receives a message (e.g., an administrator command packet) and processes the message by passing the message on to the JSON parser 116. Subsequently, the daemon is informed by the JSON parser 116 of any reply to the message and passes the reply on up to the TCP/IP protocol processor 110 for further processing.

The JSON parser 116 serves as a translator between the Web protocol processor 112 (and Telnet protocol processor 114 or most other similar types of protocol processors) and the FUSE 118 and management server 120. More specifically, the JSON parser 116 operates to translate between "Web language" and JSON language. Consequently, the Jason parser 116 translates an administrator command packet received from the Web protocol processor 112 into JSON language. Conversely, the Jason parser 116 translates a reply to an administrator command from JSON language into Web language for passing back up the management stack. The translation of "Web" language" into JSON language produces a file call, i.e., a request relating to a particular file.

The FUSE 118 is a loadable kernel module for Unix-like operating systems that allows the creation of a file system in a userspace program. The FUSE 118 serves as an application program interface (API) to the file system in the management server 120, a portion of the userspace program. More specifically, the FUSE 118 operates to receive a file call from the JSON parser 116, convey the file call to the management server 120, receive any reply to the file call generated by the management server 120, and convey any reply to the JSON parser 116 for further conveyance up the management stack. The context of the file call indicates the file within the management server that is to be executed, e.g., a volume creation or a volume destruction.

The management server 120 operates to: (a) receive a file call from the FUSE 118 that is representative of an administrator command embodied in an administrator command packet, (b) execute the file that is the subject of the file call, and (c) communicate the result of the executed file to the FUSE 118 for further conveyance up the management stack, typically this results in the administrator computer 34 being provided with a new or updated Web page with an update as to the status of the execution of the administrator command, e.g., the command executed or the command failed to execute.

The file that is the subject of the file call can result in the management server 120 communicating with the IO stack 102, the fail-over manager 104, the management database 122, and/or another storage processor. For example, if the goal of the file to be executed is the creation of a volume, in executing the file, the management server 120 will communicate with the IO stack 102, the fail-over manager 104, the management database 122, and other storage processors. As another example, if the goal of the file to be executed is to provide the administrator computer 34 with statistics relating to a particular volume, in executing the relevant file, the management server 120 will communicate with the IO stack 102 to obtain the necessary statistics on the particular volume.

The management server 120, in addition to processing administrator command packets that propagate down the management stack, also processes commands or requests for information from management servers associated with other storage processors. For instance, a "foreign" management server that is associated with a different storage processor than the management server 120 may have processed an administrator command packet setting forth a new administrator id/password. The foreign management server would update its management database and forward a command to the management server 120 to update the management database 122 with the new administrator id/password.

The management database 122 has three portions: (a) a local object portion to which only the management server 120 can read/write, (b) a shared object portion to which the management server 120 can read/write but can only be read by another management server, and (c) a shared object to which the management server 120 can read/write and to which another management server can read/write. An example of a shared object to which the management server 120 can read/write but that can only be read by another management server is information that is specific to the storage processor with which the management server 120 is associated, e.g., CPU usage or CPU temperature. An example of a shared object to which both the management server 120 and another management server can read/write is an administrator id/password.

IO Stack.

FIG. 2 illustrates the IO stack 102, i.e., a group of processes that are executed by each storage processor associated with the primary storage level 28 in processing a block command packet relating to a particular block of data or multiple blocks of contiguous data.

Generally, the IO stack 102 comprises network protocol processors 130 (sometimes referred to as "network processors") that conduct the processing needed to conduct communications with other elements in a computer network according to various network protocols and a filter stack 132 that process block commands so as to read data from and write data to a data store associated with the primary data storage system 28.

Network Protocol Processors.

iSCSI. A SCSI block command can be conveyed to the primary data storage system 28 over an Ethernet and according to Internet protocols, i.e., according to iSCSI protocols. The SCSI block command is embedded in a block command packet that conforms to the iSCSI protocols. In such a situation, the network protocol processors 130 includes the Ethernet hardware driver 108, the TCP/IP protocol processor 110, and an iSCSI protocol processor 140 for processing the block command packet with the SCSI block command. Generally, the Ethernet hardware driver 108 and the TCP/IP protocol processor 110 operate as previously described with respect to the management stack 100. In this instance, however, the TCP layer of the TCP/IP protocol processor 110 recognizes that the received packet as a block command packet and not an administrator command packet. Moreover, the TCP layer recognizes the block command packet as having an iSCSI block command. As such, the block command packet is routed by the TCP/IP protocol processor 110 to the iSCSI protocol processor 140 for further processing. The iSCSI protocol processor 140 operates to assure that the iSCSI portion of a received block command is in conformance with the iSCSI standard. If the iSCSI portion of a block command packet is in conformance, the block command is passed on to the filter stack 132. The Ethernet hardware driver 108, TCP/IP protocol processor 110, iSCSI protocol processor 140, also process any result packet (i.e., a packet that conveys the result of the execution of a SCSI block command or failure to execute a SCSI block command) for forwarding to the initiator that originated the block command packet.

FibreChannel. A SCSI block command can also be conveyed over a Fibre Channel (FC) network and according to Fibre Channel protocols. The SCSI block command is embedded in a block command packet that conforms to the FC protocol. In such a situation, the network protocol processors 130 include a FC hardware driver 150 and a FC protocol processor 152. The FC hardware driver 150 operates to control a Fibre Channel card (which replaces the Ethernet card, e.g., Ethernet cards 44A-44D) so as to produce the electrical signals needed to receive a block command packet that conforms to the FC protocols and transmit a result packet to the initiator that originated a block command packet. The FC protocol processor 152 (a) manages the reassembly (if needed) of two or more packets received by a Fibre Channel card into the original block command packet and the disassembly (if needed) of a result packet into two or more packets for transmission, and (b) assures the addressing of packets associated with a received block command packet and associated with a reply packet.

Fibre Channel over Ethernet (FCoE). A SCSI block command can also be conveyed over an Ethernet and according to Fibre Channel protocols. The SCSI block command is embedded in a block command packet that conforms to the Ethernet and FC protocol. In such a situation, the network processors 130 include the Ethernet hardware driver 108 and the FC protocol processor 152.

It should be appreciated that the primary data storage system 28 operates to process block commands, i.e., commands that relate to the reading of a block data from or writing of a block data to a storage medium. As such, the primary data storage system 28 can be adapted to operate with block commands other that SCSI commands.

Further, the primary data storage system 28 can be adapted to process block commands regardless of the type of network used to convey the block command to the primary data storage system 28 or to transmit the reply to a block command from the primary data storage system 28. As such, the primary data storage system 28 can be adapted to operate with networks other than Ethernet and FC networks.

Moreover, the primary data storage system 28 can be adapted to operate on block commands that are conveyed over a network according to protocols other than Ethernet, TCP/IP or FC.

Filter Stack.

The filter stack 132 comprises a target driver filter 160, a group of foreground filters 162, and a group of background filters 164. Associated with the filter stack 132 are a filter manager 166 and a statistics database 168. Operations that involve executing or attempting to execute a SCSI block command flow "down" the stack, i.e. in the direction going from the target driver filter 160 and toward the group of background filters 164. In contrast, operations that involve generating or providing the result of the execution or attempted execution of a SCSI block command flow "up" the stack. Consequently, a filter involved in executing or attempting to execute a SCSI block command may also be involved in generating or providing the result of the execution or attempted execution of the SCSI block command.

Generally, the target driver filter 160 processes block command packet to generate an input/output block (IOB) that is used by the other filters to store data/information relating to the processing of a block command. As such, the IOB facilitates the communication of data/information between filters. The IOB that is initially generated by the target driver filter 160 flows down the filter stack 132 and is on occasion referred to as command IOB. After there is a result relating to a SCSI block command associated with an (execution or failure to execute), the IOB flows up the stack and is on occasion referred to as a result IOB. The target driver filter 160 also operates to generate a result packet from a received result IOB and passes the result packet on up the stack to the network processors 130.

Generally, the group of foreground filters 162 process a command IOB to: (a) cause whatever write/read related operation is required of a block command to occur and (b) cause one or more tasks needed to accomplish the read/write operation to occur in a fashion that endeavors to meet QoS goals. The foreground filters 162 also process a result IOB as needed and provide the result IOB to the target driver filter 160.

Generally, the group of background filters 164 cause one or more tasks related to administrator defined QoS goals to occur and that, if performed in the foreground process, would significantly impact the ability to meet QoS goals.

Generally, the filter manager 166 operates to create (associate) the filter stack 132 with a volume (an identifiable unit of data storage), destroy (disassociate) a volume from the filter stack 132, and cooperates with the fail-over manager 104 and/or management server 120 to implement various volume related functions (e.g., using the management server 120 to inform "foreign" storage processors of the creation of a new volume).

The statistics database 168 receives statistical data relating to a volume from one or more filters in the filter stack 132, stores the statistical data, consolidates statistical data based upon data provided by a filter, stores calculated statistical data, and provides the stored statistical data to one or more filters in the filter stack 132 and to the management server 120.

Generally, the filter manager 166 operates to create (associate) the filter stack 132 with a volume (an identifiable unit of data storage), destroy (disassociate) a volume from the filter stack 132, and cooperates with the fail-over manager 104 and/or management server 120 to implement various volume related functions (e.g., using the management server 120 to inform "foreign" storage processors of the creation of a new volume). To elaborate with respect to the creation of a volume, the filter manager 166 receives a message from the Management Server 120 instructing filter manager 166 to create a new volume with a specific filter stack configuration. The filter manager 166 instantiates the filters and places them in the correct hierarchy based on the storage administrator request. For example, with respect to FIG. 2, the filter manager creates an instance of target driver 160 and IO forward filter 270 and ensures that target driver 160 sends IOBs "down" the stack to the IO Forward filter 270. Similarly, filter manager 166 creates, configures, and connects the rest of the filter stack 132. To elaborate with respect to the deletion of a volume, the filter manager 166 unlinks the connections and removes each of the filters in the stack.

Statistics Database. The statistics database 168 receives data from various hardware and software elements within the system and provides data to many of the elements within the system that use the data in making one or more decisions relating to a data storage operation. Due to the extensive use of the statistics database 168 throughout the system, a description of the database 168 is provided prior to the descriptions of the various IO filters, many of which make use of the database. Initially, it should be appreciated that the structure of the statistics database 168 can vary based upon the hardware and software elements present in the system. Further, the statistics database can store data that is derived from data provided by a single element or from data provided by multiple elements. Consequently, the statistics database 168 can be quite extensive.

With reference to FIG. 2A, an example of a portion of a statistics database 258 is described to facilitate the understanding of the use of the database 168 by various filters. With respect to the example of a portion of the statistics database 258, it should be appreciated that a portion of the database relates to hardware. In this case, the portion that relates to hardware includes statistics relating to a CPU, a Solid-State Disk (SSD), and an Ethernet card. A portion of the example of a portion of the statistics database 258 relates to volume related data. In this case, the portion that relates to volume data includes statistics directed to three different criticalities, a volume, and an initiator. With respect to the hardware and volume statistics, statistics relating to throughput, queue depth, latency, and use count are provided. The use count with the "second" resolution corresponds to IOPS. The use count with respect to resolutions of greater duration is IOPS scaled to the resolutions of the greater duration. Additionally, with respect to each of throughput, queue depth, latency, and use count, statistics are provided in terms of both reads and writes. Further, it should be appreciated that the example of a portion of a statistics data includes current statistical data and historical statistical data. The current statistical data has a resolution of "second." The historical statistical data has resolutions great than "second" and include resolutions of "minute", "hour", and "day". It should be appreciated that only one resolution of current statistical data and one resolution of historical statistical data can be utilized, provided the resolution associated with the historical statistical data is for a greater period of time than the resolution associated with the current statistical data. It should also be appreciated that resolutions other than those shown can be utilized. It should also be appreciated that a more complete example of the statistics database would likely include statistical data relating to additional volumes and additional hardware components (e.g. SAS, additional CPUs, etc.).

Target Driver Filter. The operation of the target driver filter 160 is described with respect to the processing of a type of block command packet, known as an iSCSI encapsulation packet 180 (sometimes referred to as "command packet") that includes a SCSI command, to generate an IOB 182. To elaborate, the command packet 180 is a packet that encapsulates a SCSI block command and other information, is received at one of the Ethernet cards 44A-44D, and processed by the Ethernet hardware driver 108, TCP/IP protocol processor 110, and iSCSI protocol processor 140 prior to being provided to the target driver filter 160. It should be appreciated that the target driver filter 160 can be adapted to operate with block commands other than SCSI block commands, networks other than the Ethernet, and network protocols other than TCP/IP.

The IOB 182 is a data structure that stores data/information associated with the processing of the SCSI block command. More specifically, the IOB 182 provides multiple fields for holding data/information relating to the processing of the SCSI block command. The target driver filter 160 builds the IOB 182 and populates certain fields of the IOB with data/information from the command packet 180. The IOB 182 is then provided to each of the other filters in the filter stack 132 that is involved in the executing or attempting to execute the SCSI command (i.e., going down the stack). Each of these other filters can, if needed, read data/information from one or more fields in the IOB 182 and, if needed, write data/information to one or more fields in the IOB 182. After the SCSI command is executed (i.e., data is written to or read from a data store) or fails to execute, the IOB 182 is then provided to each of the filters in the filter stack 132 that is involved in providing the result of the of the processing of the SCSI command (i.e., going up the stack). Ultimately, the IOB 182 is provided to the target driver filter 160 which uses the IOB 182 to create an iSCSI encapsulation packet that includes the result of the processing of the SCSI command, i.e., a result packet. The result packet is then provided to the network processors 130 for additional processing and transmission of the results packet towards the initiator that originated the command packet.

iSCSI Encapsulation Packet with SCSI Command. The command packet 180 comprises an Ethernet field 184, an IP field 186, a TCP field 188, and an iSCSI field 190. The iSCSI field 190, in turn, comprises a basic header segment 192, an additional header segment 194, a header digest 196, a data segment 198, and a data digest 200. The basic header segment comprises an Opcode field 202, a DataSegLen field 204, a LUN field 206, and a SCSI command data block 208. The data digest 200 includes a data cyclic-redundancy-check (CRC) field 210.

IOB. The IOB 182 comprises an Initiator ID field 220, a VolID field 222, a PageMode field 224, an LBA/PageNum field 226, a SectorCount/PageOffset field 228, a Command field 230, an ErrorCode field 232, an ErrorOffset field 234, a NumberOfDataSegments field 236, DataSegmentVector field 238, a DataCRCVector field 240, a LayerId field 242, a QoS attributes field 244, a StoreID field 246, a StoreLBA field 248, an In Time Stamp field 250, an Issuer stack field 252, and an XtraContext field 254. The QoS attributes field 244 comprises a criticality field 260A, AllowedStores field 260B, AllowedLatency 260C, ProjectedImpact 260D, and ImpactArray 260E. The Impact Array 260E includes impacts for each of the physical components of the primary data storage system (e.g., CPU, memory, SAS, SSD, and Ethernet) and the software components (e.g., volume, criticality, and initiator), It should be appreciated that the AllowedLatency 260C and the In Time Stamp field 250 are used in a "headroom" evaluation (i.e., an evaluation as to the amount of time available to perform an operation) in such a way that as filters higher in the stack consume time operating on an IOB, the filters lower in the stack have less "headroom" to operate on the IOB.

After the target driver filter 160 receives the command packet 180, the target driver filter 160 builds the IOB 182 and populates certain fields of the IOB 182 with values from or derived from the command packet 180. It should be appreciated that a value associated with a field is sometimes referred to simply by the field name.

Specifically, the target driver filter 160 uses data/information in the TCP field 188 of the command packet 180 to lookup the value in a TCP session table associated with an earlier login phase for the Initiator ID field 220 of the IOB 182.

The target driver filter 160 uses data/information in the LUN field 206 of the command packet 180 to derive a value for the VolID field 222 of the IOB 182, i.e., the volume within the primary data storage system 28 to which the SCSI block command relates. The value in the VolID field 222 reflects the priority (e.g., mission critical, business critical, non-critical) that the administrator has associated with the data blocks that are associated with volume.

If the value in the PageMode field 224 is not automatically established as "off" when the IOB 182 is first established, the target driver filter 160 sets the value of the PageMode field 224 to "off" to indicate that the IOB 182 initially relates to a block or blocks of data within a volume and not to a block or blocks of data within a page, a larger unit of memory than a block. Moreover, the "off" value in the PageMode field 224 also indicates that the values established or to be established in the LBA/PageNum field 226 and SectorCount/PageOffset field 228 are LBA and Sector-Count values and not PageNum and PageOffset values.

The target driver filter 160 uses data/information in the SCSI Command Data Block field 208 to populate the command field 230 with the SCSI command (e.g., a block read command or a block write command), the LBA/PageNum field 226 with the address of the first logical block address within the volume to which the SCSI command relates, and the SectorCount/PageOffset field 228 with the number of sectors (or blocks) beginning at the specified LBA to which the SCSI command relates. Sometimes a block read command is referred to as a read block command. Similarly, sometimes a block write command is referred to as a write block command.

If the values of the ErrorCode field 232 and ErrorOffset field 234 are not automatically set to "null" or irrelevant values when the IOB 182 is first established, the target driver filter 160 establishes such values in these fields. The ErrorCode field 232 holds an error code value that is subsequently established by a filter in the filter stack 132 and indicative of a type of error encountered in the processing of the SCSI command or in the returning of the result of the processing of the SCSI command. The ErrorOffset 234 field holds an offset value that further defines the type of error identified in the ErrorCode field 232.

If the SCSI command is a write command, the target driver filter 160 uses the data segment field 198 to establish values in the NumberOfDataSegments field 236 and the DataSegmentVector field 238. To elaborate, in the case of a write command, the target driver filter 160 places the data (sometimes referred to as "write data") in the Data Segment field 198 into memory (e.g., memory store 52A or 52B). In placing the data in the Data Segment field 198 into memory, the data from the Data Segment field 198 may be broken into two or more non-contiguous segments. The target driver filter 160 places the number of data segments that are established in memory in the NumberOfDataSegments field 236 and the address and length of each of the segments established in memory in the DataSegmentVector field 238. If there is more than one segment established in memory, the target driver filter 160 calculates a cyclic redundancy check (CRC) or possibly another form of hash for each of the segments and places each of the CRC values in the DataCRCVector field 240. If there is only one segment established in memory (i.e., all of the data in the Data Segment field 198 was copied into a single segment in memory), the target driver filter 160 copies the value that is in the Data CRC field 210 to the DataCRCVector field 240. It should be appreciated that a data verification techniques other that CRC can be employed in place of CRC.

After the DataCRCVector field 240 has been populated, the target driver filter 160 calculates a CRC on the data in the Data Segment 198 and compares the calculated CRC to the CRC value (if present) in the Data CRC field 210. If there is a difference between the calculated CRC and the CRC in the field 210, then the data in the Data Segment 198 has somehow been corrupted. In this case, the processing of the SCSI command is aborted and the target driver filter 160 prepares a result packet indicating that the command failed to execute. The result packet is passed on to the network processors 130 for processing and transmission to the initiator.

If the SCSI command is a read command, the target driver filter 160 populates the NumberOfDataSegments field 236, the DataSegmentVector field 238, and the DataCRCVector fields with "null" or irrelevant values. When a filter that is capable of satisfying the read, the filter will place the data (sometimes referred to as "read data") into memory (e.g., memory store 52A or 52B) and populates the NumberOfDataSegments field 236 and the DataSegmentVector field 238 with the count and address of the read data blocks in memory.

If the values of the LayerID field 242, QoS Attributes field 244, StoreID field 246, StoreLBA field 248, IssuerStack field 252, and XtraContextStack field 254 are not automatically set to "null" or irrelevant values when the IOB 182 is first established, the target driver filter 160 establishes such values in these fields.

The target driver filter 160 places an "In" time in In Time Stamp field 250 that reflects the point in time when or about when the target driver filter 160 passes the IOB 182 to the next filter in the filter stack 132.

The IssuerStack field 252 is used by a filter in the filter stack 132 that is operating on a command IOB (i.e., when the flow of the IOB is down the filter stack 132) to indicate that the filter needs to do additional processing when the result IOB is propagating up the stack (i.e., when a result of the execution of the SCSI command or failure to execute the SCSI is being prepared). The XtraContextStack field 254 is a field that a filter can use to store additional context information when the filter has indicated in the IssuerStack field 252 that the filter needs to do additional processing when the IOB is propagating up the stack. Because several filters can indicate a need to do additional processing when a result IOB is propagating up the stack, the IssuerStack field 252 has a stack structure in which each filter that needs to do additional processing "pushes" down an indication of the need to do additional processing onto the "stack." As a result IOB propagates up the stack, a filter that "pushed" down an indication of a need to do additional processing "pops" off or removes the indication from the IssuerStack field 252 after the additional processing of the IOB is completed by the filter. The XtraContext Stack field 254 also has a push/pop structure that functions in a substantially similar way to the IssuerStack field 252.

Once the building of the IOB 182 is complete and no errors were encountered in the building of the IOB 182 that caused the processing of the SCSI command to be aborted, the target driver filter 160 (a) communicates with the statistics database 168 so as to cause a "pending OOB" statistic to be incremented, (b) populates the IssuerStack field 252 and XtraContextStack 254 fields as needed.

Later, when a result IOB 182 is propagating up the filter stack 132 and reaches the target driver filter 160, the current time is obtained, the "In" time stored in the In Time Stamp field 250 is obtained, and the total latency associated with the processing of the IOB is calculated, i.e., the elapsed time between when the "In" time value was obtained by the target driver filter 160 and the when the current time was obtained. The target driver filter 160 updates initiator and volume tables in the statistics database 168 with the total latency value. It should be appreciated that other tables or statistics in the statistics database 168 may also be updated. Additionally, the target driver 160 builds the result packet and provides the result packet to the network processors 130 for further processing and communication to the initiator.

Foreground Filters

The foreground filters 162 include an I/O forward filter 270, a layer map filter 272, a quality-of-service (QoS) filter 274, statistics collection filter 276, a pattern de-duplication filter 278, a dictionary de-duplication filter 280, and an I/O journal filter 282.

I/O Forward Filter. An initiator can send a command packet to the primary data storage system 28 that relates to a volume for which the storage processor that initially starts processing the IOB relating to the command packet is not responsible. The I/O forward filter 270 operates to identify this situation and forward the IOB to the storage processor that is responsible for the volume.

Figure 4:
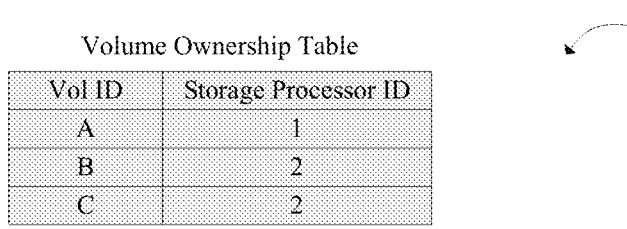
FIG. 4 illustrates an example of a volume ownership table.

By way of background, when an administrator computer 34 communicates with one of the storage processors 46A, 46B via the management stack 100 to request the creation of a volume, the filter manager 166 associated with the storage processor creates the volume and updates a volume ownership table to indicate that the particular storage processor and no other storage processor in the primary data storage system 28 is responsible for the volume. With reference to FIG. 4, an example of a volume ownership table 286 is illustrated. Additionally, the filter manager 166 indicates to the fail-over manager 104 that the volume ownership table has changed. In response, the fail-over manager 104 communicates that there has been a change in the volume ownership table to the fail-over manager associated with each of the other storage processors in the primary data storage system 28. There are a number of other situations that cause a change in the volume ownership table and the change to be communicated to the other fail-over managers. For instance, the destruction of a volume causes such a change in a volume ownership table. Another situation that causes a change in the volume ownership table is a fail-over, i.e., a situation in which the storage processor that is responsible for a volume cannot adequately service the volume and responsibility for the volume is transferred to another storage processor. In any event, the volume ownership table identifies the volume(s) for which each storage processor in the primary data storage system 28 is responsible.

The I/O forward filter 270 obtains the volume id to which the SCSI command relates from the VolID field 222 of the command IOB and uses the volume id to determine, using the volume ownership table, if the "home" storage processor (i.e., the storage processor that is executing the I/O forward filter) is the storage processor that is responsible for the identified volume. If the volume is a volume for which the "home" storage processor is responsible, the IOB is passed on to the layer map filter 272. If, however, the volume is not a volume for which the "home" storage processor is responsible, the I/O forward filter 270 forwards the IOB to the I/O forward filter associated with the "foreign" storage processor that the volume ownership table indicates is the "owner" storage processor of the volume. In the illustrated embodiment, the forwarding of the IOB involves the use of the switches 50A, 50B. When a result IOB subsequently reaches the I/O forward filter of the foreign/owner storage processor, the result IOB is forwarded back to the I/O forward filter 270 of the "home" storage processor. The "home" storage processor passes the result back up the stack so that the result can be placed in a result packet and sent to the originating initiator.

Layer Map Filter. By way of background, the primary data storage system 28 provides the ability to take a "snapshot" of a volume at a particular point in time. The snapshot function is implemented using layers. The top layer of a layer stack is read-write and associated with a particular volume. Lower layers in a layer stack are read only and can be associated with multiple volumes. A particular volume can have several layers, each created at a different point in time. Each layer, other than the original or "0" layer, has a pointer that links the layer to the next most recently created layer for the volume. Each layer, other than the "0" layer, identifies the blocks in the volume that have been written since the creation of the prior layer. When a snapshot command is executed with respect to a volume, a new layer is created for the volume, the new layer is assigned a unique layer id, a volume information table is updated so that the layer id of the new layer is associated with a volume, and a logical block address offset that is specified by an administrator is also associated with the volume. The blocks identified in the new layer can be both written and read until such time as an even newer layer is created. As such, the new layer is considered a read/write layer. Relatedly, the creation of the new layer prevents the blocks identified in the prior layer from being written. As such, the prior layer is considered a read-only layer. Because the execution of the snapshot command creates a new layer that is a read/write layer and causes the prior layer to transition from a read/write layer to a read-only layer, the prior layer is the snapshot of the volume at the time of the creation of the new layer.

Figure 5:
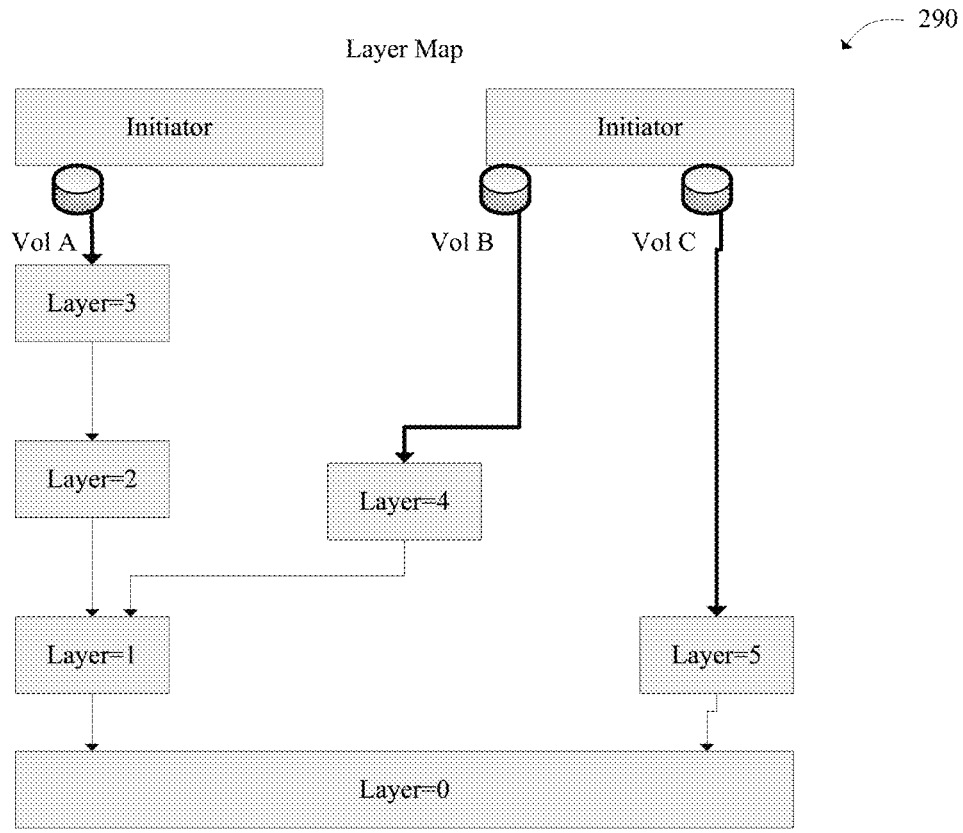
FIG. 5 illustrates an example of a layer map and a volume information table.

FIG. 5 is an example of a layer map 290 and an associated volume information table 292. The layer map 290 identifies volumes A, B, C with volume A associated with one initiator and volumes B and C associated with another initiator. Further, layers 1, 2, and 3 have been established with respect to volume A, with layer 3 being the newest layer relating to volume A. Layers 4 and 1 have been established with respect to volume B. Layer 5 has been established with respect to volume C. Layer 5 essentially represents the creation of volume C. The creation of layer 3 caused the volume information table 292 to be updated to reflect that the newest layer associated with volume A is layer 3. Further, the snapshot command that caused the creation of layer 3 specified an LBA offset of zero, which is also reflected in the volume information table 292. Lastly, the creation of layer 3 in response to the snapshot command also created a snapshot of volume A that is reflected in layers 0, 1, 2 as of the time layer 3 was created. The creation of layer 4 caused the volume information table 292 to be updated to show layer 4 as being the newest layer associated with volume B and to reflect a specified LBA offset of zero. The creation of layer 4 also created a snapshot of volume B that is reflected in layers 1 and 0, with layer 1 being shared with volume A. The creation of layer 5 caused the volume information table 292 to be updated to indicate that layer 5 is the newest layer associated with volume C and to show a specified LBA offset of zero.

Figure 8:
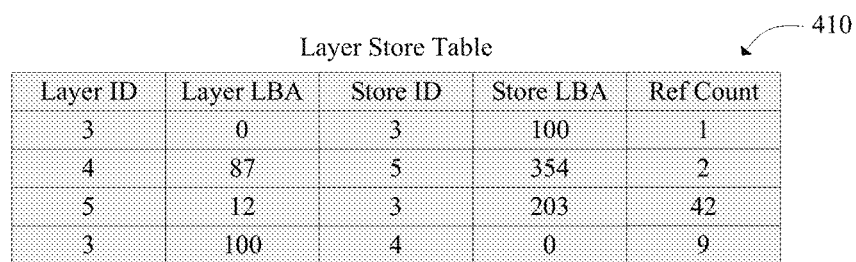
FIG. 8 illustrates an example of a layer store table.

The layer map filter 272 receives the IOB provided by the I/O forward filter 270 and processes the IOB to determine a layer id (LID) and a layer logical block address (LLBA) for the related SCSI command. More specifically, the layer map filter 272 uses the volume id specified in the VolID field 222 to index into the current volume information table 292 to determine the newest LID associated with the volume and LBA offset associated with the volume. The layer map filter 272 populates the LayerID field 242 with the LID retrieved from the volume information table. If the offset retrieved from the volume information table is non-zero, the layer map filter 272 revises the LBA in the LBA/PageNum field 226 to reflect the LLBA, which is the current LBA value plus/minus the retrieved offset value. The layer map filter 272 uses the LID and LBA to index into a layer-store table (e.g., FIG. 8) and retrieve the StoreID and StoreLBA values to populate the StoreId field 246 and StoreLBA field 248 of the IOB.

Quality of Service (QoS) Filter. The quality-of-service (QoS) filter 274 generally provides predictable data storage performance to one or more initiators that utilize a shared data storage system (i.e., the primary data storage system) with multiple volumes. The desired performance of a particular volume (criticality) is established by the administrator using the administrator computer 34 to communicate with the management stack 100. When the administrator uses the administrator computer 34 to create a volume, the administrator also uses the administrator computer 34 to associate a criticality with the volume. The management stack 100 maintains a table/tables that identifies each of the initiators that the primary data storage system 28 will service and the criticality associated with each of the volumes that have been created. The "criticality" associated with a volume is reflected in certain performance or quality of service goals. As such, a volume that has "highly critical" criticality necessarily has relatively high performance goals. A volume with "non-critical" criticality has relatively lower performance goals. The group of attributes that is used to reflect performance goals of the primary data storage system 28 with respect to a volume includes, allowed stores, latency, throughput, and input/out operations per second (IOPS). An allowed store is a store that a volume is allowed to use during the processing, storing, or retrieving of data for a command packet/IOB. Latency is a measure of the elapsed time between when the filter stack 132 begins the processing of command packet/IOB and when the filter stack 132 finishes preparing a reply packet/IOB. Throughput is a measure of the number of bytes prepared for transfer (read/write) per unit of time within the filter stack 132 with respect to a volume. IOPS is a measure of the number of IOBs processed within the filter stack 132 per unit of time with respect to a volume. The specification of a criticality for a volume is embodied in a goal with respect to each of these attributes. It should be appreciated that a greater number, lesser number, and/or different attributes may be appropriate in certain situations. It should also be appreciated that two volumes with the same criticality can have the same or different quality of service or performance goals.

It should be appreciated that the performance of a data store in the primary data storage system 28 can also be characterized in terms of latency, throughput, and IOPS. Further, this "store performance" of a data store is or may be relevant to whether the performance goals with respect to a volume are being met. As such, the production of statistics relating to the "store performance" of data stores in the primary data storage system 28 are produced and available for use in assessing performance with respect to a volume. Further, other hardware and software in the primary data storage system 28 are also be characterized and monitored for use in assessing performance with respect to a volume.

Generally, the QoS filter 274 operates to sort IOBs that are associated with different volumes having different criticalities (i.e., different performance goals) so as to try to meet the goals of each volume. More specifically, the QoS filter 274 receives an IOB from the layer map filter 272 and processes the IOB to perform: (a) a first sort of the IOB according to the volume ID, i.e., according to the criticality associated with the volume, (b) a second sort of the IOB according to the projected impact of the processing of the IOB on the data storage system at the primary data storage system 28, the projected impact taking into account certain metrics/statistics relating to the operation of the primary data storage system 28, and (c) a third sort of the IOB into an IOB execution stack based upon the criticality associated with the volume identified in the IOB (first sort), the projected impact (second sort), past usage of the primary data storage system 28 as reflected in certain metrics/statistics, the current state of the primary data storage system 28 including the state of each of the stores, each of the switches, each of the storage processors, and each of the network cards (e.g., Ethernet, FC, or other network cards) as reflected in certain metrics/statistics.

Figure 6:
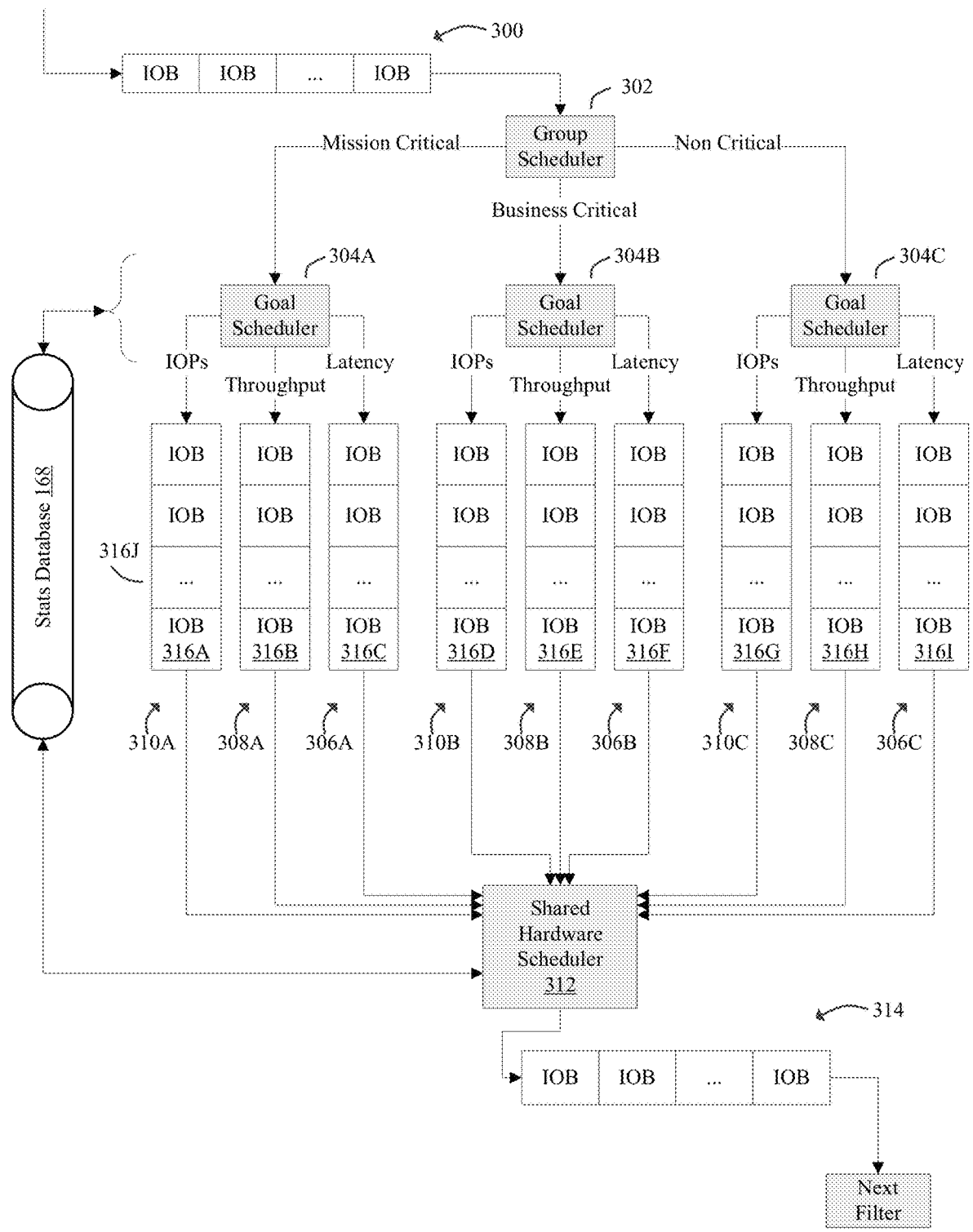
FIG. 6 illustrates an example of the operation of the QoS filter of the I/O stack shown in FIG. 2 for a primary data storage system that services three initiators, each having a different criticality and different performance goals.

FIG. 6 is an example of the operation of the QoS filter 274 with respect to three volumes, each with a different criticality. The first volume has a "mission critical" criticality; the second volume has a "business critical" criticality that is less than "mission critical" criticality; and a third volume has a "non-critical" criticality that is less than "business critical" criticality. As such, there are different performance goals associated with each of the volumes in terms of latency, throughput, and IOPS. Further, one or more of the initiators 38A-38C is sending block command packets to the primary data storage system 28 that relate to the three volumes. Each of the block command packets being processed to generate an IOB, such as IOB 182.

The QoS filter 274 places each IOB that is received from the layer map filter 272 into first-in-first-out input queue 300. The QoS filter 274 processes each of the IOBs in the queue 300 in the order that the IOB was received in the queue 300. The following describes the further processing of the IOB 182 by the QoS filter 274.

The QoS filter 274 includes a group scheduler 302 that sorts IOBs according to the criticality associated with the volume to which an IOB relates. To elaborate with respect to IOB 182, the group scheduler 302 uses the volume id in the VolID field 222 as an index into a volume information table (e.g. volume information table 292) that indicates the criticality value associated with that volume. The QoS filter 274 places the criticality value (e.g., a whole number in the range of 1-3) in the Criticality field 260A of the QoS attributes field 244 of the IOB 182. As such, the IOB 182 now has an indication of the criticality of the SCSI command associated with the IOB. Further, the QoS filter 274 uses the criticality value to sort the IOB 182 into one of the three goal schedulers 304A-304C. In this example, because there are three possible criticality values, there are three goal schedulers 304A-304C. It should, however, be appreciated that there can be as few as two possible criticality values and more than three possible criticality values. Further, there is a goal scheduler associated with each possible criticality value. Similarly, the QoS filter 274 uses the volume id specified in the VolID field 222 to index into the volume information table 292 to populate the QoS attributes, AllowedStores 260B, and AllowedLatency 260C fields with the Allowed Stores, and Allowed Latency values retrieved from the volume information table 292. Consequently, the IOB 182 now has an indication of the stores that may be used to service the IOB and the amount of time that can be used to service the IOB.

Each of the goal schedulers 304A-304C processes an IOB received from the group scheduler 302 to assess the IOB as to the projected impact of the execution of the SCSI command. In this regard, each IOB is assessed as to whether execution of the SCSI command is likely to primarily affect latency, throughput, or IOPS. The assessment takes into account metrics/statistics obtained from the statistics database 168. These metrics/statistics include volume related statistics. For example, statistics relating specifically to the volume with which the IOB is associated, statistics relating to "criticality," i.e., statistics relating to a number of volumes that have the same "criticality", and statistics relating an initiator, i.e., statistics relating to a number of volumes associated with a specific initiator can be used. The statistics can include any number of factors, including throughput, queue depth, latency, and use count for these volume related statistics. However, currently it is believed that at least latency statistics are needed. Further, these factors can further include read and write related versions of each of throughput, queue depth, latency, and use count. Moreover, these factors can include current and historical statistics. Current statistics being those statistics associated with the shortest period of time (or shortest resolution) and historical statistics being statistics associated with a greater period or periods of time relative to the shortest period of time. See, example of a portion of a statistics database 258. The use of statistics relating to "criticality" and/or historical statistics facilitates the identification of imbalances and the like in the processing of IOB associated with volumes having the same criticality. For example, if the processing of IOBS associated with one volume has placed another volume with the same criticality increasingly behind its quality of service goals, the statistical data provides a basis for identifying this issue and taking action to bring the lagging volume back towards its quality of service goals.

The assessment results in the IOB being placed in one of a latency queue, throughput queue, and IOPS queue associated with the goal scheduler. With reference to FIG. 6, because there are three goal schedulers 304A-304C, there are three FIFO latency queues 306A-306C, three FIFO throughput queues 308A-308C, and three FIFO IOPS queues 310A-310C. Further, the goal scheduler also stores the result of the assessment in the IOB ProjectedImpact 260D field of the QoS Attributes 244. Consequently, the IOB 182 now has an indication of the projected impact of the execution of the command associated with the IOB, in addition to an indication of the criticality of the IOB provided by the group scheduler 302. It should be appreciated that it is also possible to change the order of the group scheduler and the goal scheduler such that the goal scheduler occurs first and the group scheduler occurs second.

With continuing reference to FIG. 6, the QoS filter 274 includes a shared hardware scheduler 312 that assesses the IOBs that are the next in line to be processed in each of the latency, throughput, and IOPS queues (the IOBs that are at the "bottom" of each of the queues) to determine which IOB will be placed in or merged into an FIFO execution queue 314, i.e., a queue that defines the order in which the IOBS received at the input queue 300 are to be executed. The assessment of each of the IOBs takes into account the criticality and projected impact of the execution of the command associated with the IOB that is set forth in the QoS attributes field of each IOB and metrics/statistics obtained from the statistics database 168. These statistics include hardware related statistics. For example, statistics relating the CPU, Ethernet cards, and stores (e.g., SSD) can be employed. These factors can include throughput, queue depth, latency, use count. Further, current and/or historical versions and/or read and/or write versions of these factors can be used. It should be appreciated that the comparison of the IOBs from the goal scheduler output queues to one another are comparisons of different volumes that have different criticalities and different quality of service goals (IOPs, throughput, and latency). For example, if the next selected IOB is throughput related the shared hardware scheduler 312 will use information in the statistics database 168 to determine a store that has available bandwidth to process the command and send the IOB down the stack "tagged" with that store as the destination.

Once the shared hardware scheduler 312 makes a determination as to the next IOB that is to be placed in the execution queue 314, the IOB is "popped" off the queue with which it is associated and the IOB that was behind the "popped" IOB takes the place of the "popped" IOB of the queue. The shared hardware scheduler 312 makes its next assessment with respect to the "new" IOB on the queue from which the IOB was "popped" and the "old" IOBs that were associated with the other queues. For example, with respect to FIG. 6, at a given point in time, each of IOBs 316A-316I is the next in line to be "popped" from their respective queues. The shared hardware scheduler 312 evaluates each of these IOBs to determine which one of IOBs 316A-316I is the next to be placed in the execution queue 314. If, for example, the shared hardware scheduler 312 decided that IOB 316A was the next to be placed in the execution queue 314, the next evaluation by the shared hardware scheduler 312 would be with respect to IOBs 316B-316I and IOB 316J, which has taken the place of IOB 316A at the head of the IOPS queue 310A. Before an IOB is placed in the execution queue 314, the related IOB is updated so as to "push" an indication onto the IssuerStack field 252 that the QoS filter 274 needs to do additional processing on the IOB when the IOB is propagating up the filter stack 132.

It should be appreciated that FIG. 6 shows a specific implementation of the QoS filter 274. The QoS filter 274 is more generally characterized as producing a sum of weighted factor values for an IOB that indicate or signify the rank of the IOB relative to other IOBS being processed. In this regard, the factors can include the volume and hardware related throughput, queue depth, latency, use count, the noted current-historical-read-write versions thereof. The values for these factors are obtained from the IOB and the statistics database. The weighted coefficients associated with each factor being dynamically adjustable to reflect the changing priorities with respect to the volumes and hardware due to what is typically a changing workload being placed on the system.

Later, when the IOB 182 is propagating up the filter stack 132 and reaches the QoS filter 274, the QoS filter 274, informs the shared hardware scheduler 312 that the queues should be re-evaluated.

The following Table 1 is a pseudo-code description of the operation of the QoS filter 274.

TABLE 1

Pseudo code for Quality of Service

```
/* C- pseudo code for Quality of Service -(274)*/
QualityOfServiceEngine = 274 MaxCriticality=3 MaxProjectedImpact=3
/**************************/ main( ) { Initialize( )
    SharedHardwareSchedInitialize( ) GoalSchedInitialize( )
    ContextStart(SharedHardwareSchedMain) for (ACriticality = 0 ; ACriticality <
```

TABLE 1-continued

Pseudo code for Quality of Service

```
   MaxCriticality; ACriticality ++ ) {
      ContextStart(GoalSchedMain, ACriticality) }
      GroupSchedMain( ) }
/* C- pseudo code for Quality of Service (274) -- Group Scheduler -
302 *//**************************/ GroupSchedMain( ) { while ( true ) {
      Iob = ReceiveIob( ) Criticality = GetCriticality(Iob.VolID) Iob.QosAttributes.Criticality =
      Criticality GoalSchedulerInsert(Criticality, Iob) } /* while forever */ }
/* C- pseudo code for Quality of Service (274) -- Goal Scheduler
304 */ GoalSchedulerInputQueue[MaxCriticality] /****************************/
GoalSchedInitialize(GoalNumber) {
   for (ACriticality = 0 ; ACriticality < MaxCriticality;
ACriticality ++ ) { GoalSchedulerInputQueue[ACriticality].Initialize( );
} } /****************************/ GoalSchedulerInsert(Criticality, Iob) {
   GoalSchedulerInputQueue[Criticality].Append(Iob) }
/****************************/ SourceiOB=0 SourceVolumeSec=1
SourceVolumeMinute=2 SourceinitiatorSec=1 SourceinitiatorMinute=2
SourceCriticalitySec=3 SourceCriticalityMinute=4 SourceSystemSec=5
SourceSystemMinute=6 MaxSource=6 GoalSchedMain(MyCriticality) {
   /* Used to choose an impact on a per Iob basis */
   IOPsConst[MaxSource] IOPsMultiplier[MaxSource] LatencyConst[MaxSource]
   LatencyMultiplier[MaxSource] ThroughputConst[MaxSource]
   ThroughputMultiplier[MaxSource]
   /* Used to adjust the factors between Iob Processing */ IOPsAlpha[MaxSource]
   IOPsBeta[MaxSource] IOPsDelta[MaxSource] IOPsGamma[MaxSource]
   LatencyAlpha[MaxSource] LatencyBeta[MaxSource] LatencyDelta[MaxSource]
   LatencyGamma[MaxSource] ThroughputAlpha[MaxSource] ThroughputBeta[MaxSource]
ThroughputDelta[MaxSource] ThroughputGamma[MaxSource] while ( true ) { Iob =
GoalSchedulerInputQueue[MyCriticality].GetFirst( )
   VolumeStats = Stats.GetVolumeMetrics(Iob.VolID) InitiatorStats =
   Stats.GetInitiatorMetrics(Iob.InitiatorID) CriticalityStats =
   Stats.GetCriticalityMetrics(MyCriticality)
/* Calculate a weighted sum related to */ /* a projection of the IOPs impact */
IOPsImpactWeight = IOPsConst[SourceIOB] + Iob.SectorCount *
      IOPsMultiplier[SourceIOB] + IOPsConst[SourceVolumeSec] +
      VolumeStats.IOPs[Sec] * IOPsMultiplier[SourceVolumeSec] +
   IOPsConst[SourceVolumeMinute] + VolumeStats.IOPs[Minute] *
      IOPsMultiplier[SourceVolumeMinute] + IOPsConst[SourceInitiatorSec] +
      InitiatorStats.IOPs[Sec] *
      IOPsMultiplier[SourceInitiatorSec] + IOPsConst[SourceVolumeMinute] +
      InitiatorStats.IOPs[Minute] *
      IOPsMultiplier[SourceVolumeMinute] +IOPsConst[SourceCriticalitySec] +
      CriticalityStats.IOPs[Sec] *
      IOPsMultiplier[SourceCriticalitySec] + IOPsConst[SourceCriticalityMinute] +
      CriticalityStats.IOPs[Minute] * IOPsMultiplier[SourceCriticalityMinute] + /*
      Calculate a weighted sum related to */ /* a projection of the Latency impact */
      LatencyImpactWeight = IOPsConst[SourceIOB] + Iob.GetCurrentLatency( ) *
      IOPsMultiplier[SourceIOB] +
   LatencyConst[SourceIOB] + IoB.InTimeStamp *
      LatencyMultiplier[SourceIOB] + LatencyConst[SourceVolumeSec] +
      VolumeStats.Latency[Sec] * LatencyMultiplier[SourceVolumeSec] +
      LatencyConst[SourceVolumeMinute] + VolumeStats.Latency[Minute] *
      LatencyMultiplier[SourceVolumeMinute] + LatencyConst[SourceInitiatorSec] +
      InitiatorStats.Latency[Sec]
* LatencyMultiplier[SourceInitiatorSec] + LatencyConst[SourceVolumeMinute] +
InitiatorStats.Latency[Minute] *
         LatencyMultiplier[SourceVolumeMinute] +
      LatencyConst[SourceCriticalitySec] + CriticalityStats.Latency[Sec] *
      LatencyMultiplier[SourceCriticalitySec] + LatencyConst[SourceCriticalityMinute] +
         CriticalityStats.Latency[Minute) *
         LatencyMultiplier[SourceCriticalityMinute] +
/* Calculate a weighted sum related to */ /* a projection of the Throughput impact */
ThroughputImpactWeight = ThroughputConst[SourceIOB] + (IoB.SectorCount I 100) *
      ThroughputMultiplier[SourceIOB] + ThroughputConst[SourceVolumeSec] +
      VolumeStats.Throughput[Sec] * ThroughputMultiplier[SourceVolumeSec] +
   ThroughputConst[SourceVolumeMinute] +
      VolumeStats.Throughput[Minute] *
         ThroughputMultiplier[SourceVolumeMinute] +
   ThroughputConst[SourceInitiatorSec] +
      InitiatorStats.Throughput[Sec] *
         ThroughputMultiplier[SourceInitiatorSec] +
   ThroughputConst[SourceVolumeMinute] +
      InitiatorStats.Throughput[Minute] *
         ThroughputMultiplier[SourceVolumeMinute] +
   ThroughputConst[SourceCriticalitySec] +
      CriticalityStats.Throughput[Sec] *
         ThroughputMultiplier[SourceCriticalitySec] +
   ThroughputConst[SourceCriticalityMinute] +
      CriticalityStats.Throughput[Minute] *
```

TABLE 1-continued

Pseudo code for Quality of Service

```
           ThroughputMultiplier[SourceCriticalityMinute] +
/* Adjust the coefficients for the next use of the weighted sum */ if (IOPsImpactWeight >
MAX(LatencyImpactWeight, ThroughputImpactWeight) { Iob.AllowedStores I= SSD I
MEMORY ChosenImpact = IOPs for (ASource = 0 ; ASource < MaxSource ; ASource ++) {
IOPsConst[ASource] = IOPsConst[ASource] *
           IOPsAlpha[ASource] + IOPsBeta[ASource];
      IOPsMultiplier[ASource] = IOPsMultiplier[ASource] *
           IIOPsDelta[ASource] + IOPsGamma[ASource]; } }
    if (LatencyImpactWeight > MAX(IOPsImpactWeight, ThroughputImpactWeight) {
Iob.AllowedStores |= SSD | MEMORY
ChosenImpact = Latency for (ASource = 0 ; ASource < MaxSource ; ASource ++) {
LatencyConst[ASource] = LatencyConst[ASource] *
      LatencyAlpha[ASource] + LatencyBeta[ASource];
      LatencyMultiplier[ASource] = LatencyMultiplier[ASource] *
    LatencyDelta[ASource] + LatencyGamma[ASource]; } }
    if (ThroughputImpactWeight > MAX(IOPsImpactWeight, LatencyImpactWeight) {
Iob.AllowedStores |= SAS ChosenImpact = Throughput for (ASource = 0 ; ASource <
MaxSource ; ASource ++) {
           ThroughputConst[ASource] = ThroughputConst[ASource] *
              ThroughputAlpha[ASource] + ThroughputBeta[ASource];
           ThroughputMultiplier[ASource]=ThroughputMultiplier[ASource]*
              ThroughputDelta[ASource] + ThroughputGamma[ASource]; } }
              Iob.UpdateQos(ChosenImpact, IOPsImpactWeight, LatencyImpactWeight,
              ThroughputImpactWeight)
    Stats.Update(Iob, ChosenImpact) SharedHardwareSchedulerInsert(Criticality, ChosenImpact,
    Iob)
} /* while forever */ } /* C- pseudo code for Quality of Service (274) -- Shared Hardware
    Scheduler - 312 */
SharedHardwareSchedulerInputQueue[MaxCriticality][MaxProjectedImpact ] ImpactIOPs=0
ImpactLatency=1
SharedHardwareSchedInitialize( ) { for (ACriticality = 0 ; ACriticality < MaxCriticality;
ACriticality ++ ) for (AImpact = 0 ; AImpact < MaxProjectedImpact; AImpact ++ )
SharedHardwareSchedulerInputQueue[ACriticality][AImpact].Initialize( ); } } }
/***************************/ SharedHardwareSchedulerInsert(Criticality, Impact, Iob) {
   SharedHardwareSchedulerInputQueue[Criticality][Impact].Append(Iob) }
   /***************************/ SharedHardwareSchedMain( ) { for (ACriticality in
   MissionCritical, BusinessCritical, NonCritical) { for (AImpact in IOPs, Throughput,
   Latency) { for (AComponent in SAS, SSD, Memory, Ethernet) { /* load the start values for
   the coefficients */ LoadCoefecientsArray(Coefecients, ACriticality, AImpact, Acomponent) /*
   load the start values for the feedback */ LoadAdjustmentArray(Adjustment, ACriticality,
   AImpact, Acomponent)} /* for all components */ } /* for all impacts */ } /* for all
   criticalities */ while ( true ) { DominateWeight = 0 DominateFactor = 0
   BestCriticality = UnknownCriticality BestImpact = UnknownImpact TimeNow = time( )
   for (ACriticality in MissionCritical, BusinessCritical, NonCritical) { for (AImpact in IOPs,
   Throughput, Latency) { PossibleIob =
   SharedHardwareSchedulerInputQueue[ACriticality][AImpact].Peek( ) IobDominateImpact =
   PossibleIob.GetQosAttributes(ChosenImpact)
        WeightForIob = PossibleIob.GetDominateValue( )
        /* Start the Weight based on what we already know about the IOB */ ThisWeight =
       PossibleIob.GetQosAttributes(CurrentWeight) *
   PossibleIob.GetLatency(TimeNow) WeightForIob += ThisWeigh tif (ThisWeight >
   DominateWeight) DominateWeight = ThisWeight DominateFactor = Latency BestCriticality =
   ACriticality BestImpact = AImpact } /* calculate a weighted sum related to */ /* statistics and
   metrics of the system and hardware */ for (AComponent in SAS, SSD, Memory, Ethernet) {
   ComponentStats = Stats.GetMetrics(AComponent) for (AResolution in Second, Minute, Hour,
   Day) { ThisWeight =
      Coefecients[ACriticality][AComponent][AResolution] *
      PossibleIob.QosAttributes.Impact[IobDominateImpact] *
                  ComponentStats.GetHeadRoom(ACriticality, PossibleIob,
      DominateImpact, AResolution)
           WeightForIob += ThisWeight if (ThisWeight > DominateWeight)
           DominateWeight ThisWeight DominateFactor AComponent BestCriticality =
           ACriticality BestImpact = AImpact
      } } /* all resolutions */ } /* all components */ }} /* found the Iob that should be
           processed, remove it and send it for processing */ Iob =
SharedHardwareSchedulerInputQueue[BestCriticality][BestImpact].Pop( )
NextFilterProcess(Iob) /* Adjust the coefficients for the next weighted sum calculation * / for
(ACriticality in MissionCritical, BusinessCritical, NonCritical) { for (AComponent in SAS,
SSD, Memory, Ethernet) { for (AResolution in Second, Minute, Hour, Day) { if
(ACriticality == BestCriticality ) { ACriticality[ACriticality][AComponent][AResolution] -=
Adjustment[ACriticality][AComponent][AResolution]; } else {
Coefecients[ACriticality][AComponent][AResolution] +=
Adjustment[ACriticality][AComponent][AResolution];
      } } /* all resolutions */ } /* for all components */ } /* while forever */ }
```

Statistics Filter. Generally, the statistics filter 276 operates to collect certain initiator and volume related data/statistical information for each IOB passed to the statistics filter 276 from the QoS filter 274 when the IOB is going down the filter stack 132. To elaborate with respect to IOB 182, the statistics filter 276 processes the IOB 182 to obtain the initiator id from the InitiatorID field 220, the volume id from the VolID field 222, the sector count from the SectorCount/PageOffset field 228, and the "In" time stamp value from the In Time Stamp field 250. The statistics filter 276 also obtains the current time from the operating system. The statistics filter 276 uses the value of the "In" Time Stamp and the current time to calculate the latency that the IOB has experienced between when the "In" Time Stamp value was established in the target driver filter 160 and when the current time is obtained by the statistics filter 276 (hereinafter referred to as "first latency"). The statistics filter 276 communicates with the statistics database 168 so as to: (a) update a table for the initiator that is maintained in the database to reflect that an IOB associated with the initiator will be processed that has the sector size obtained from the IOB and that the IOB has experienced the calculated first latency and (b) update a table for the volume that is maintained in the database to reflect that an IOB associated with the volume will be processed that has the sector size obtained from the IOB and that the IOB has experienced the calculated first latency.

The statistic filter 276 also pushes an indication onto the IssuerStack field 252 of the IOB 182 that the statistics filter 276 needs to do additional processing when the IOB is propagating up the filter stack 132. Further, the statistic filter 276 also pushes the current time onto the XtraContextStack field 254.

Later, when the IOB 182 is propagating up the filter stack 132 and reaches the statistics filter 276, the statistics filter 276 obtains the time from the XtraContextStack field 254 (which is no longer the current time), obtains the "new" current time, and calculates a second latency, i.e., the elapsed time between when the time value was obtained that was pushed onto the XtraContextStack field 254 and the IOB was propagating down the filter stack 132 and the when the "new" current time was obtained. The statistics filter 276 updates the initiator and volume tables in the statistics database 168 with the second latency value. Further, the statistics filter 276 uses the values from the ImpactArray 260E to update the statistics database 168. When updating the database it may be necessary to update multiple rows of data, (e.g. when updating the CPU statistics it may be required to update the row for Second, Minute, Hour, and Day).

Pattern De-Duplication Filter. Generally, the pattern de-duplication filter 278 operates to preserve storage capacity and reduce turnaround time to the initiator at the primary data storage system 28 by preventing a block(s) of identical data that are frequently written to the primary data storage system 28 from being written multiple times with each such writing of the block(s) of data consuming additional storage capacity and time. More specifically, the pattern de-duplication filter 278 operates to identify a block(s) of data that have a pattern which can be readily calculated. Characteristic of a pattern is that the values of each byte of data in a block can be calculated. For example, if the values of the bytes of data in a block represent a triangle wave with known characteristics (period, amplitude, phase, sampling frequency etc.), the value of each of the bytes in the block is susceptible to calculation. A pattern that can be "readily" calculated is a pattern that can be calculated or retrieved and the IOB completely processed (i.e., a result packet is prepared) within the latency associated with the volume. It should be appreciated that, for a given latency, the number of patterns that can be readily calculated increases with increasing processing speed.

Initially, with respect to an IOB associated with a SCSI write-related command, the pattern de-duplication filter 278 makes a "headroom" calculation to determine if there is sufficient time available to perform the operations associated with pattern deduplication, which includes the time needed to identify a calculation engine that may be able to calculate a pattern associated with the write data and the time needed to determine if there is a match between the write data and the data produced by the selected calculation engine. In this regard, there needs to be sufficient time to conduct these operations within whatever time remains in the allowed latency 260C.

Generally, the pattern de-duplication filter 278 assesses data in the first block of data associated with each IOB having a SCSI write-related command to determine if a known calculable pattern of data is present. If all of the data in the first data block has a known calculable pattern, the pattern de-duplication filter 278 proceeds to assess the second and any additional blocks of data associated with the IOB. If all of the data in all of the blocks of data associated with the IOB have a known calculable pattern, there are two possibilities.

First, if the current values in the StoreID field 246 and the StoreLBA field 248 of the IOB are not currently identified as being the values of the StoreID and the StoreLBA associated with the pattern, the current values in the StoreID field 246 and StoreLBA field 248 in the IOB are updated. The current values in the StoreID and StoreLBA fields were established in the layer map filter 272. A portion of the application memory that is dedicated to storing a particular pattern calculator is identified as a calculation engine 320. Although only one calculation engine 320 is shown in FIG. 2, there is a calculation engine for each pattern calculator. Because the current values in the StoreID field 246 and the StoreLBA field 248 do not point to the calculation engine 320, the values in the StoreID field 246 and the StoreLBA field 248 need to be updated to point to the calculation engine. Once the values for StoreID field 246 and StoreLBA field 248 have been updated, the pattern de-duplication filter 278 updates the command field 230 of the IOB so as to reflect that a de-dup write needs to be done and passes the IOB down the filter stack 132.

Second, if the current values in the StoreID field 246 and the StoreLBA field 248 of the IOB are currently identified as being the values of the StoreID and the StoreLBA associated with the pattern, the values in the StoreID field 246 and StoreLBA field 248 in the current IOB are not modified. The values in the StoreID and StoreLBA fields were established in the layer map filter 272 and respectively point to the relevant calculation engine for calculating the pattern. Because the pattern of the blocks of data has not changed from the prior IOB with the same values in the VolId field 222 and the LBA/PageNum field 226, the pattern de-duplication filter 278 places a "success" code in the error code field 232 and causes the IOB to start propagating up the filter stack 132, thereby indicating that the SCSI write command of the IOB has been completed.

If the data in any block(s) of data associated with the IOB do not have a known calculable pattern, the pattern de-duplication filter 278 determines the pattern de-duplication is not possible and passes the IOB on to the dictionary de-duplication filter 280.

While the assessment of the first block of data associated with the IOB could be done with respect to each known calculable pattern, the pattern de-duplication filter 278 avoids doing so by making an initial comparison of two bytes in a block of data and using the result of the comparison for concluding that the data in the block: (a) potentially has one of the known calculable patterns or (b) does not possess one of the known calculable patterns. This two byte comparison is a form of a "hash" calculation. It should be appreciated that methods other than the noted two byte comparison (a form of hash) can be applied (e.g. CRC or hash) as long as the methods can make the determination within the latency constraint, i.e., the allowed latency set forth in volume information table 292. If the comparison indicates that the data in the block potentially has one of the known calculable patterns, the pattern de-duplication filter 278 proceeds to assess the data in the block to determine whether the data in the block actually does have the identified, known calculable pattern.

More specifically, the pattern de-duplication filter 278 utilizes the pattern calculator to calculate the value that a byte(s) of the pattern should have if present in the data block and compare each such value to the actual value associated with the byte(s) in the data block. Generally, it is desirable to utilize a calculator that is efficient, i.e., makes a determination of whether or not the pattern is present in the data more quickly rather than less quickly so as to make the determination within the latency constraint, i.e., the allowed latency set forth in volume information table 292. Further, the comparison is done in the fastest data store available, typically memory store 52A and 52B.

For example, if the pattern is a triangle wave and there is an even number of cycles of the triangle wave in a block of data, a relatively efficient calculator for determining if this wave pattern is present in a block would: (a) with respect to the potential first cycle of the wave pattern in the block, use the pattern calculator to calculate a first value for the wave pattern and compare that value to the two bytes in the data that should have the calculated value if a first cycle of the triangle wave is present in the block and (b) repeat this calculation and comparison to the values associated with different bytes in the data block until the presence of the first cycle of a triangle wave in the data is either confirmed or disaffirmed. If a first cycle of the triangle wave is not present, the pattern de-duplication filter 278 passes the IOB on to the dictionary de-duplication filter 280. If the presence of a first cycle of the triangle wave in the data is confirmed, the calculator proceeds to compare the data associated with the first cycle of the triangle wave to the data in the block that might be the second cycle of the triangle wave to either confirm or disaffirm the presence of the second cycle of the triangle wave. If the second cycle of the triangle wave is not present, the pattern de-duplication filter 278 passes the IOB on to the dictionary de-duplication filter 280. If the presence of the second cycle of the triangle wave is confirmed, the calculator proceeds to compare the data associated with the first and second cycles of the triangle wave to the data in the block that might be the third and fourth cycles of the triangle wave. This process of comparing groups of bytes that increase in number by a factor of two with each comparison continues until either the presence of the pattern in all of the blocks associated with IOB is confirmed or disaffirmed.

Read De-Duplication Operation. Generally, the pattern de-duplication filter 278 operates on an IOB having a SCSI read-related command to determine if the data at the identified volume id and LBA is data that has been previously de-duplicated in the processing of an IOB with a SCSI write-related command. More specifically, the pattern de-duplication filter 278 obtains the value in the StoreID field 246. If the value in the StoreID matches a StoreID assigned to a calculator engine (e.g., engine 320), the pattern de-duplication filter 278 concludes that the read-related command in the IOB relates to pattern data that has been de-duplicated. Further, the de-duplication filter 278 obtains the value in the StoreLBA field 248 to identify the vector into the calculator for calculating the particular pattern and uses the calculator to create the block(s) of patterned data in the memory store (e.g., CPU bus memory 52A or CPU bus memory 52B), if the block(s) of patterned data do not already exist in the memory store. The pattern de-duplication filter 278 then updates the value in the DataSegmentVector field to point to the address in the memory store (e.g., CPU bus memory 52A or 52B) that has the copy of the calculated pattern. Further, the pattern de-duplication filter 278 places a "success" code in the error field 232 and causes the IOB to start propagating up the filter stack 132, thereby indicating that the SCSI read-related command of the IOB has been completed. If the value in the StoreID does not match a StoreID assigned to a calculator engine, the IOB is passed down the filter stack 132 for further processing.

The following Table 2 is a pseudo-code description of the pattern deduplication filter 278.

TABLE 2

Pseudo code for Pattern DeDup

```
/***************************************************
**/
/* C- pseudo code for Pattern DeDup (278) */
/***************************************************
**/
PatternDeDupEngine = 278
IdentifyingOffset = 14
IdentifyingValueA = 4
IdentifyingValueB] = 234
/*************************/
main( ) {
   Initialize( )
   while ( true ) {
      Iob = ReceiveIob( )
      if (ProcessIOB ( Iob ) == true) {
         ReturnResult(Iob, true)
      } else {
         NextFilterProcess(Iob)
      }
   } /* while forever */
}
/*************************/
boolean Initialize( ) {
   for EngineIdx = 0 ; EngineIdx < 255; EngineIdx ++ {
      EngineRoutine[EngineIdx] = NULL
      IdentifyingValue[EngineIdx] = 0
   }
   EngineRoutine[IdentifyingValueA] = ProcessWriteHitA
   EngineRoutine[IdentifyingValueB] = ProcessWriteHitB
}
/*************************/
boolean ProcessIOB( Iob )
{
/* Execute the write determination processor */
   if (Iob.command == Write) {
      return(IOBWrite( Iob ))
   } else {
/* Execute the read determination processor */
      if (Iob.command == Read) {
         return(IOBRead( Iob ))
      } else {
         /* not a Write or a Read, do not process it */
         return(false)
      }
   }
}
```

TABLE 2-continued

Pseudo code for Pattern DeDup

```
}
/*****************************/
boolean IOBWrite( Iob )
{
/* Execute the headroom processor to determine if the system has */
/* available resources to execute the */
/* pattern deduplication processor */
    if (QOSHeadRoomProcessor(Iob.QosAttributes, MEMORY | CPU) ==
true)
    {
    /* Execute the hash processor */
        EngineChoice = DetermineEngineCandidate(Iob)
        if (EngineRoutine[EngineChoice] != NULL) {
            return(EngineRoutine[EngineChoice]( Iob ))
        } else {
            return(false)
        }
    } else {
        return(false)
    }
}
/*****************************/
number DetermineEngineCandidate( Iob )
{
    FastValue =
        Iob.DataSegmentVector[0].Byte[IdentifyingOffset] –
        Iob.DataSegmentVector[0].Byte[IdentifyingOffset + 1])
    return(FastValue)
}
/*****************************/
boolean ProcessWriteHitA( Iob )
{
    RegenerateContext.InitialVector =
Iob.DataSegmentVector[0].Buffer[0] /* the all "ones", or "zeroes"
Engine */
    RegenerateContext.SequenceOffset = 0
    RegenerateContext.bytenum = 0
/* Execute the compare processor for EngineA */
    for dataseg in Iob.DataSegmentVector {
        for bytenum = 0 ; bytenum < dataseg.Bytes ; bytenum ++ {
            if (dataseg.Buffer[bytenum] != GenByteA( Iob.StoreLBA,
RegenerateContext)) {
                return(false)
            }
            RegenerateContext.bytenum ++
        }
    }
    Iob.StoreID = CalcStoreEngineA
    Iob.StoreLBA = RegenerateContext.InitialVector
    LayerMapSaveStoreInfo( Iob )
    return(true)
}
/*****************************/
number GenByteA( StoreLBA, bytenum , RegenerateContext)
{
    return( RegenerateContext.InitialVector )
}
/*****************************/
boolean ProcessWriteHitB( Iob )
{
    RegenerateContext.InitialVector = 73 /* sin phase */
    RegenerateContext.SequenceOffset = 24 /* sin period */
    RegenerateContext.bytenum = 0
/* Execute the compare processor for EngineB */
    for dataseg in Iob.DataSegmentVector {
        for bytenum = 0 ; bytenum < dataseg.Bytes ; bytenum ++ {
            if (dataseg.Buffer[bytenum] != GenByteB( Iob.StoreLBA,
RegenerateContext)) {
                return(false)
            }
            RegenerateContext.bytenum ++
        }
    }
    Iob.StoreID = CalcStoreEngineB
    Iob.StoreLBA = RegenerateContext.InitialVector
    LayerMapSaveStoreInfo( Iob )
    return(true)
}
```

TABLE 2-continued

Pseudo code for Pattern DeDup

```
/*****************************/
number GenByteB( StoreLBA, bytenum , RegenerateContext)
{
    return( (sin(RegenerateContext.InitialVector, StoreLBA)))
}
/*****************************/
boolean IOBRead( Iob )
{
    if (Iob.StoreID == CalcStoreEngineA) {
        return(ProcessReadHitA( Iob ))
    } else {
        if (Iob.StoreID == CalcStoreEngineB) {
            return(ProcessReadHitB( Iob ))
        } else {
            return(false)
        }
    }
}
/*****************************/
boolean ProcessReadHitA( Iob, RegenerateContext )
{
    RegenerateContext.InitialVector = 32
    RegenerateContext.SequenceOffset = 12
    RegenerateContext.bytenum = 0
/* Execute the data creation processor for EngineA */
    for dataseg in Iob.DataSegmentVector {
        for bytenum = 0 ; bytenum < dataseg.Bytes ; bytenum ++ {
            dataseg.Buffer[bytenum] = GenByteA( Iob.StoreLBA,
RegenerateContext)
            RegenerateContext.bytenum ++
        }
    }
}
/*****************************/
boolean ProcessReadHitB( Iob, RegenerateContext )
{
    RegenerateContext.InitialVector = 73 /* sin phase */
    RegenerateContext.SequenceOffset = 24 /* sin period */
    RegenerateContext.bytenum = 0
/* Execute the data creation processor for EngineB */
    for dataseg in Iob.DataSegmentVector {
        for bytenum = 0 ; bytenum < dataseg.Bytes ; bytenum ++ {
            dataseg.Buffer[bytenum] = GenByteB( Iob.StoreLBA,
RegenerateContext)
            RegenerateContext.bytenum ++
        }
    }
}
```

Dictionary De-Duplication Filter. Generally, the dictionary de-duplication filter 280 operates to preserve storage capacity and reduce turnaround time to the initiator at the primary data storage system 28 by preventing blocks of data associated with an IOB that constitute a page (a predefined number of contiguous blocks of data) that are commonly written to the primary data storage system 28 and do not have a readily calculable pattern from being written multiple times such that each writing of the page consumes additional storage capacity and time.

By way of background, the dictionary de-duplication filter 280 has access to a dictionary table that is capable of holding a limited and predetermined number of entries. Each non-null entry in the dictionary table relates to a page of data identified by an advanced de-duplication filter, one of the background filters 164, as being one of the most common pages of data being written to storage. More specifically, each non-null entry in the dictionary table for a "dictionary" page has StoreID and StoreLBA values for a copy of a "dictionary" page that is on a dictionary store 322. Because the dictionary de-duplication filter 280 is one filter of the group of foreground filters and speed of execution is a priority in the foreground, the dictionary store 322 that holds the copy of the "dictionary" page is typically a high-speed store, like memory store 52A or memory store 52B. The entry in the dictionary table also identifies a portion of data in the relevant "dictionary" page (e.g., the second 64-bytes of data in the page) that is unique relative to all of the other non-null entries in the dictionary table. While it is feasible to use different identifying portions of a "dictionary" page for each entry (e.g., one entry has the first 64-bytes of a first "dictionary" page and another entry has the second 64-bytes of a second "dictionary" page) as long as the data in each of the portions is unique, the use of the same identifying portion of data from each of the "dictionary" pages facilitates the assessment of whether the page associated with an IOB can be de-duplicated. This is a form of hash, other forms of hash are also feasible. Consequently, each non-null entry in the dictionary table relates to the same identifying portion of a "dictionary" page (e.g., the second 64-bytes) as the other entries in the dictionary table. Further, the data in the identifying portion relating to a single "dictionary" page is unique relative to all the other non-null entries in the dictionary table. Because the most commonly written pages can change over time and the dictionary table has a limited and predetermined number of entries, the advanced de-duplication filter can change the entries in the dictionary table. In this regard, a change to the table may require that a different identifying portion of the pages to which the entries in the table relate be used to preserve the uniqueness of each entry in the table. The identifying portion of each of the dictionary pages that is unique is maintained by the advanced de-duplication filter and available to the dictionary de-duplication filter 280. The advanced de-duplication filter also ensures that a copy of each of the common pages that is identified in dictionary table is in the dictionary store 322.

Initially, with respect to an IOB associated with a SCSI write-related command, the dictionary de-duplication filter 280 makes a "headroom" calculation to determine if there is sufficient time available to perform the operations associated with dictionary deduplication, which includes the time needed to identify a dictionary entry that may correspond to the write data and the time needed to determine if there is a match between the write data and the data in the dictionary entry. In this regard, there needs to be sufficient time to conduct these operations within whatever time remains in the allowed latency 260C.

In processing an IOB with a write-related command that relates to a block(s) of data, the dictionary de-duplication filter 280 determines if the write command relates to a page. This determination is made by obtaining the sector count value in the SectorCount/PageOffset field 228 in the IOB. If the value is not equal to the number of blocks in a page, the dictionary de-duplication filter 280 passes the IOB on down the filter stack 132. If, however, the value is equal to the number of blocks in a page, the dictionary de-duplication filter 280 obtains the same portion of the page associated with the IOB that is associated with the identifying portion in each entry in the dictionary table and compares this portion of the page to each identifying portion in the dictionary table. If there is no match (i.e., the IOB relates to a page that is not common enough to justify an entry in the dictionary table), the dictionary de-duplication filter 280 passes the IOB on down the filter stack 132. If there is a match, then there is a possibility that the page associated with the IOB is a match with the "dictionary" page to which the entry in the dictionary table relates. To determine whether there is such a match, the dictionary de-duplication filter 280 compares the page associated with the IOB to the copy of the "dictionary" page that is located at the StoreID and StoreLBA of the dictionary store 322 set forth in the dictionary table. The data associated with the write IOB and the dictionary page is in memory store 52A or 52B, the fastest type of store in the illustrated system. As such, the comparison occurs more quickly than if the comparison was done in some other store in the system. If there is no match, the dictionary de-duplication filter 280 passes the IOB down the filter stack 132. If there is a match, there are two possibilities.

First, if the current values in the StoreID field 246 and the StoreLBA field 248 of the IOB are not currently identified as being the values of the StoreID and the StoreLBA associated with the copy of the "dictionary page" in the dictionary store 322, the current values in the StoreID field 246 and Store-LBA field 248 in the IOB are updated. The current values in the StoreID and StoreLBA fields were established in the layer map filter 272. Once the values for StoreID field 246 and StoreLBA field 248 have been updated, the dictionary de-duplication filter 280 updates the command field 230 of the IOB so as to reflect that a de-dup write needs to be done and passes the IOB down the filter stack 132.

Second, if the current values in the StoreID field 246 and the StoreLBA field 248 of the IOB are currently identified as being the values of the StoreID and the StoreLBA associated with the copy of the "dictionary page" in the dictionary store 322, the current values in the StoreID field 246 and Store-LBA field 248 in the IOB are not updated. The current values in the StoreID and StoreLBA fields were established in the layer map filter 272. The dictionary de-duplication filter 280 places a "success" code in the error field 232 and causes the IOB to start propagating up the filter stack 132, thereby indicating that the SCSI write command of the IOB has been completed. For example, the primary data storage system 28 has previously persisted the same data at the same layer and same LBA and therefore does not need to make any changes due to this IOB.

Read De-Duplication Operation. Generally, the dictionary de-duplication filter 280 operates on an IOB having a SCSI read-related command that need not relate to a page to determine if the data associated with the identified volume id and LBA is data that has been previously de-duplicated in the processing of an IOB with a SCSI write-related command relating to the same volume id and LBA. More specifically, the dictionary de-duplication filter 280 obtains the value in the StoreID field 246 and determines if the value is currently associated with the dictionary store 322. If the value is currently associated with the dictionary store 322, the dictionary de-duplication filter 280 then updates the value in the DataSegmentVector field to point to the address in the memory store (e.g., memory store 52A or 52B) that has the copy of the dictionary page and, more specifically, to point the first block of the page that has the first block to which the SCSI read command relates. Further, the dictionary de-duplication filter 280 places a "success" code in the error field 232 and causes the IOB to start propagating up the filter stack 132, thereby indicating that the SCSI read-related command of the IOB has been completed. If the value in the StoreID field 246 is not currently associated with the dictionary store 322, the IOB is passed down the filter stack 132 for further processing.

The following Table 3 is a pseudo-code description of the dictionary deduplication filter 280.

TABLE 3

Pseudo-code for Dictionary DeDup

```
/***************************************************************
**/
/* C- pseudo code for Dictionary DeDup (280) */
/***************************************************************
**/
MemoryStoreID = 52A
IdentifyingOffset = 0
DictionaryMax = 5
DictionaryActive = 0
DataBuffer[DictionaryMax] = 0, 0, 0, 0, 0
StoreID[DictionaryMax] = 0, 0, 0, 0, 0
StoreLba[DictionaryMax] = 0, 0, 0, 0, 0
HitCount[DictionaryMax] = 0, 0, 0, 0, 0
/**************************/
main( ) {
  Initialize( )
  while ( true ) {
    Iob = ReceiveIob( )
    if (ProcessIOB ( Iob ) == true) {
      ReturnResult(Iob, true)
    } else {
      NextFilterProcess(Iob)
    }
  } /* while forever */
}
/**************************/
boolean Initialize( ) {
  TmpDataBuffer = ""
  TmpStoreID = 0
  TmpStoreLba = 0
  TmpHitCount = 0
  for BufIdx = 0 ; BufIdx < DictionaryMax ; BufIdx ++ {
    LoadLastKnownMap ( BufIdx, TmpStoreID, TmpStoreLba,
    TmpHitCount)
    if ( TmpStoreID > 0 ) {
      StoreRead( TmpDataBuffer, TmpStoreID, TmpStoreLba)
      InsertBuffer( TmpDataBuffer, TmpStoreID, TmpStoreLba,
TmpHitCount )
    }
  }
}
/**************************/
boolean InsertBuffer( NewDataBuffer, NewStoreID, NewStoreLba,
NewHitCount ) {
  OffsetIsUnique = true
  InsertSuccess = false
  for TestOffset = 0 ; TestOffset < 512 ; TestOffset ++ {
    OffsetIsUnique = true
    for BufIdx = 0 ; BufIdx < DictionaryMax ; BufIdx ++ {
      if (DataBuffer[BufIdx][TestOffset] ==
NewDataBuffer[TestOffset] ) {
        OffsetIsUnique = false
        break;
      }
    }
    if (OffsetIsUnique == true) {
      /* buffer insert Found a uniq identifying offset */
      if (DictionaryActive == DictionaryMax) {
        /* need to replace */
        /* find the best replacement location */
        MinHit = -1
        MinHitIdx = -1
        for BufIdx = 0 ; BufIdx < (DictionaryActive - 1) ; BufIdx ++
{
          if (HitCount[BufIdx] < HitCount[BufIdx + 1]) {
            MinHit = HitCount[BufIdx]
            MinHitIdx = BufIdx
          }
        }
        /* replacement index found */
        memcpy(DataBuffer[MinHitIdx], NewDataBuffer)
        StoreID[MinHitIdx] = NewStoreID
        StoreLba[MinHitIdx] = NewStoreLba
        HitCount[MinHitIdx] = NewHitCount
      } else {
        /* add at end of list*/
        memcpy(DataBuffer[DictionaryActive], NewDataBuffer)
        StoreID[DictionaryActive] = NewStoreID
        StoreLba[DictionaryActive] = NewStoreLba
        HitCount[DictionaryActive] = NewHitCount
        DictionaryActive ++
      }
      IdentifyingOffset = TestOffset
      InsertSuccess = true
      break;
    }
  }
  return(InsertSuccess)
}
/**************************/
boolean ProcessIOB( Iob )
{
  /* Execute the write determination processor */
  if (Iob.command == Write) {
    return(IOBWrite( Iob ))
  } else {
  /* Execute the read determination processor */
    if (Iob.command == Read) {
      return(IOBRead( Iob ))
    } else {
      /* not a Write or a Read, do not process it */
      return(false)
    }
  }
}
/**************************/
boolean IOBWrite( Iob )
{
  /* Execute the headroom processor to determine if the system has */
  /* available resources to execute the */
  /* dictionary duplication processor */
  if (QOSHeadRoomProcessor(Iob.QosAttributes, MEMORY | CPU) ==
true)
  {
  /* Execute the hash processor for Dictionay Deduplication */
    PossibleBuffer = IsPossible( Iob.DataSegmentVector )
    if ( PossibleBuffer >= 0 ) {
  /* Execute the compare processor for Dictionay Deduplication */
      if (CmpBuffer( Iob, DataBuffer[PossibleBuffer] ) == true) {
        Iob.StoreID = StoreID[PossibleBuffer]
        Iob.StoreLBA = StoreLba[PossibleBuffer]
        HitCount[PossibleBuffer] ++
        LayerMapSaveStoreInfo( Iob )
        return(true)
      }
    }
  }
  return(false)
}
/**************************/
number IsPossible( DataSegmentVector )
{
  for BufIdx = 0 ; BufIdx < DictionaryActive ; BufIdx ++ {
    if (DataSegmentVector[0].Buffer[IdentifyingOffset] ==
DataBuffer[BufIdx][IdentifyingOffset] ) {
      return(BufIdx)
    }
  }
  return(-1)
}
/**************************/
boolean CmpBuffer( Iob, SourceDataBuffer )
{
  DatBufByte = 0
  for dataseg in Iob.DataSegmentVector {
    for bytenum = 0 ; bytenum < dataseg.Bytes ; bytenum ++ {
      if (dataseg.Buffer[bytenum] != SourceDataBuffer[DatBufByte]) {
        return(false)
      }
      DatBufByte ++
    }
  }
  return(true)
}
/**************************/
boolean IOBRead( Iob )
```

TABLE 3-continued

Pseudo-code for Dictionary DeDup

```
{
  for BufIdx = 0 ; BufIdx < DictionaryActive ; BufIdx ++ {
    if (( Iob.StoreID == StoreID[BufIdx] ) && ( Iob.StoreLBA ==
StoreLBA[BufIdx] )) {
      CopyBuffer( Iob, DataBuffer[BufIdx] )
      HitCount[BufIdx] ++
      return(true)
    }
  }
  return(false)
}
/***************************/
boolean CopyBuffer( Iob, SourceDataBuffer )
{
  DatBufByte = 0
  for dataseg in Iob.DataSegmentVector {
    for bytenum = 0 ; bytenum < dataseg.Bytes ; bytenum ++ {
      if (dataseg.Buffer[bytenum] != SourceDataBuffer[DatBufByte]) {
        return(false)
      }
      DatBufByte ++
    }
  }
  return(true)
}
/***************************/
boolean DictionaryDeDupUpdateList( CandidateStoreID,
CandidateStoreLba, CandidateHitCount ) {
  CandidateDataBuffer = ""
  if (DictionaryActive < DictionaryMax) {
    StoreRead( CandidateDataBuffer, CandidateStoreID,
CandidateStoreLba)
    InsertBuffer( CandidateDataBuffer, CandidateStoreID,
CandidateStoreLba, CandidateHitCount )
  } else {
    MinHit = -1
    for BufIdx = 0 ; BufIdx < (DictionaryActive - 1) ; BufIdx ++ {
      if (HitCount[BufIdx] < HitCount[BufIdx + 1]) {
        MinHit = HitCount[BufIdx]
        MinHitIdx = BufIdx
      }
    }
    if (MinHit < CandidateHitCount)
      StoreRead( CandidateDataBuffer, CandidateStoreID,
CandidateStoreLba)
      InsertBuffer( CandidateDataBuffer, CandidateStoreID,
CandidateStoreLba, CandidateHitCount )
  }
}
```

I/O Journal Filter. Generally, the I/O journal filter 282 operates with respect to IOBs in the execution queue 314 that have SCSI write-related commands (de-dup write and write) that have not been fully addressed by an intervening filter to move the actual data that is associated with the IOBs and currently resident in a non-redundant and/or non-persistent data store or other information that allows the data to be reproduced to a redundant and persistent data store (i.e., a journal store). Further, because the I/O journal filter is part of the foreground filters 162, the I/O journal filter 282 endeavors to do so in a timely fashion. Because the actual data associated with an IOB or other information that allows the actual data associated with the IOB to be reproduced is moved to a redundant and persistent data store, the I/O journal filter 282 also causes each such IOB to begin propagating up the filter stack 132, thereby acknowledging completion of the write-related command. There are two characteristics of the I/O journal filter 282 that each contribute to the timely processing. The first characteristic is that each write to the redundant and persistent store is the writing of a page, which comprises a large number of blocks. As such, for a given number of data blocks, the writing of pages requires fewer writes relative to an approach in which there is a separate write operation for each block. The second characteristic is that the writes are done to locations in the redundant and persistent store that have increasing/decreasing addresses. For example, a number of page writes could be done to locations 1, 5, 20, and 200 on the store. This avoids the time overhead associated with writing to locations that are unordered (e.g., locations 1, 200, 20, and 5).

Figure 7:
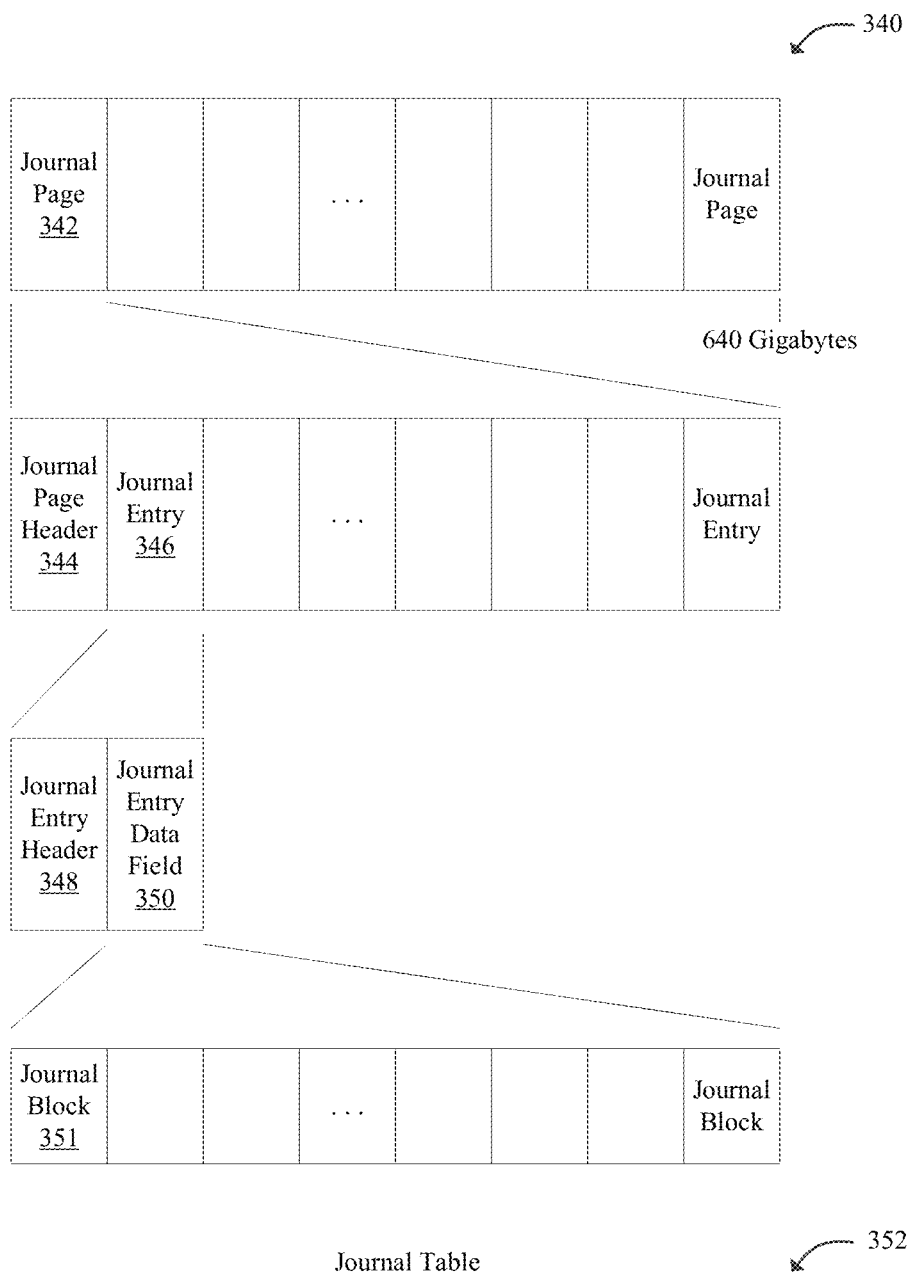
FIG. 7 illustrates an example of a journal and related journal table.

With reference to FIG. 7, the I/O journal filter 282 in one embodiment operates on a journal store that is implemented in a redundant fashion between the SSDs 54A, 54B, both of which also exhibit persistence. It should be appreciated that, while redundant and persistent stores are commonly utilized, other types of stores that do not exhibit redundancy or persistency can also be employed. Each of the SSDs 54A, 54B, has a copy of a journal 340, a data storage space of known length or capacity that stores the data associated with the IOBs and related metadata. Redundancy is provided by each of the SSDs 54A, 54B having a copy of the journal 340. For convenience, the operation of the I/O journal filter 282 is described with respect to a single copy of the journal 340, which may be referred as the journal 340, with the understanding that changes to one copy of the journal are also made to the other copy of the journal.

In the illustrated embodiment, the journal 340 has a data storage space of 640-Gigabytes. The storage space is divided into a plurality of 2-Megabyte journal page (JP) 342. Each journal page 342 has a journal page header 344 that identifies the journal page within the journal 340. The remainder of a journal page is available to be populated with a plurality of journal entries. A journal entry (JE) 346 comprises a journal entry header (JEH) 348 that stores metadata related to the journal entry and a journal entry data field 350 capable of storing 4-kbytes of actual data associated with an IOB or other information that allows the actual data associated with the IOB to be reproduced. The journal entry data field 350 is further divided into 8 512-byte journal block 351.

The journal entry header 348 is populated with the value for the layer LBA that is present in the LBA/PageNum field 226 of the IOB that provided the first 512-byte block in the journal entry data field and the values in the LayerID, StoreID, and StoreLBA fields of the same IOB. A one byte bit-mask is also present in the journal entry header 348 and is used to identify the 512-byte blocks that are in the journal entry data field 350. For example, if the LBA is 20 and the bit-mask is set to "10001000", LBAs 20 and 24 are present in the journal entry data field 350.

Associated with the journal 340 is a journal table that maps the values in the LayerID and LayerLBA fields of the IOB or journal entry header 348 to a particular journal page and journal entry. With reference to FIG. 7, an example of a journal table 352 is illustrated.

With the foregoing background in mind, the I/O journal filter 282 identifies IOBs in the execution queue 314 that have pending SCSI write-related commands (de-dup write and write), i.e., SCSI write-related commands that have not been fully addressed by an intervening filter. The I/O journal filter 282 also identifies the currently active journal page and journal entry, i.e., the location in the journal 340 that is to be next in line to be populated with write-related data. For example, the currently active journal page could be journal page number "20" and the currently active journal entry could be journal entry "7". The currently active journal entry either has no data in the journal entry data field or there is data in at least the first 512-byte journal block and one or more of the immediately following 512-byte journal blocks but not in all of the 512-byte journal blocks.

A "working" copy of the currently active journal page is located in the application memory of a storage processor. With respect to the "working" copy of the currently active journal page, the I/O journal filter 282 further determines if the first 512-byte block of the current journal entry has been written. If this is not the case, the I/O journal filter 282 writes the next 512-byte block associated with an IOB into the first 512-byte block of the journal entry data field. If the IOB includes additional 512-byte blocks, these additional blocks (up to seven blocks) are also sequentially written into the current journal entry data field of the working copy. The I/O journal filter 282 also writes the values from the LayerID field 242, LBA/PageNum field 226, StoreID field 246, and StoreLBA field 248 into the journal entry header and sets the value in the bit-mask of the journal entry header to reflect the blocks that have been or will be loaded into the journal entry data field. For example, if the IOB includes five blocks of data, the I/O journal filter 282 would write the first of the five blocks of data into the first block of the journal data entry field and the other four blocks into the immediately following four blocks of the journal data entry field and establish the journal header data based on the first block of data moved into the journal data entry. In this example, the bit-mask would be set to "11111000".

If the first 512-byte block of the currently active journal entry has been written, the I/O journal filter 282 uses the value of the layer ID in the journal entry header, the value of the LBA in the journal entry header, and the bit-mask in the journal entry header to determine the values for the LayerID and the layer LBA that should go in the next available 512-byte block of the journal entry data field. For instance, if the first block in the journal entry data field contained data relating to a layer id of 0 and a layer LBA of 20 and the next available block was the second block in the journal entry data field, the I/O journal filter 282 would conclude that the block of data for layer id 0 and layer LBA 21 should go in the second block in the journal entry data field. The calculated values for the layer id and layer LBA are compared to the actual layer id and layer LBA values associated with next block of data associated with the IOB. If there is a match, the next block of data associated with the IOB is written into the next available 512-byte block of the journal entry data field and the bit-mask is appropriately updated. To continue with the example, if the 512-byte block of the IOB journal had a layer id of 0 and layer LBA of 21, the I/O journal filter 282 establishes the 512-byte block of the IOB in the second 512-block of the journal entry data field. If there is not a match and the currently active journal entry is not the last journal entry for the currently active journal page, the currently active journal entry is incremented and the 512-byte block associated with the IOB is written in the first block of the new active journal entry. If there is not a match and the currently active journal entry is the last journal entry for the currently active page (i.e., the working copy of the currently active journal page is finished), the working copy of the active journal page is written to the actual journal 340 in the redundant and persistent store and a working copy of the next journal page is established in application memory.

If any write IOB has consumed, released, or modified a JE, the I/O journal filter 282 will update the journal table 352. Specifically, the I/O journal filter 282 obtains the value from the LayerID field 242 and the layer LBA value from the LBA/PageNum field 226. The I/O journal filter 282 determines if there is an entry in the journal table (e.g., journal table 352) that has the layer id and the layer LBA. If there is such an entry, the I/O journal filter 282 updates the journal page and journal entry fields with the currently active journal page and currently active journal entry. If there is not an entry, the I/O journal filter 282 creates an entry in the table and enters the layer ID, layer LBA, journal page, and journal entry values.

Generally, the I/O journal filter 282 operates with respect to IOBs in the execution queue 314 that have SCSI read-related commands (read) that have not been fully addressed by an intervening filter. More specifically, the I/O journal filter 282 obtains the value from the LayerID field 242 and the layer LBA value from the LBA/PageNum field 226. The I/O journal filter 282 determines if there is an entry in the journal table (e.g. journal table 352) that has the layer id and the layer LBA. If there is such an entry, the block(s) of data that are the subject of the read command are located in the journal at the journal page and journal entry specified for the entry in the journal table that has the noted layer id and layer LBA. The I/O journal 282 proceeds to the specified journal entry, retrieves the LBA from the journal entry header, determines the difference between the requested layer LBA and the journal entry LBA to identify which of the 512-byte journal block(s) needs to be read. The I/O journal 282 causes the relevant block(s) to then be read into memory store (e.g., memory store 52A or 52B) updates the DataSegmentVector field 238 to point to the location in memory store that contains the read blocks. The I/O journal filter 282 places a "success" code in the error field 232 of the IOB and causes the IOB to start propagating up the filter stack 132, thereby indicating that the SCSI read command of the IOB has been completed. If there is no entry in the journal table for the specified layer id and layer LBA, the block(s) that are the subject of the SCSI read-related command are not in the journal 340. In this case, the I/O journal filter 282 passes the IOB on down the filter stack 132.

While the operation of the I/O journal filter 282 has been described with respect to 512-byte blocks and 2-megabyte pages, it should be appreciated that different block sizes can be employed in an effort to match the characteristics of the data to the characteristics of one of the stores among a group of stores in a data store system, the stores having different characteristics from one another. For example, the sizes of the blocks, data journal entry fields, and journal page can each be varied to achieve this goal.

Background Filters

Generally, the group of background filters 164 operates to place data on a data store with performance characteristics that are commensurate with the use of the data. For example, if a particular unit of data is frequently read and/or written, the group of background filters endeavor to place such data on a store with a high-performance characteristics (e.g., low latency, high throughput, and high IOPS). Conversely, if a particular unit of data is infrequently read and/or written, the group of background filters endeavors to place such data on a store with lower relative performance characteristics. Moreover, to the extent that placing a unit of data requires moving the data from one store to another store, the group of background filters 164 operates to move the unit of data in a manner that is speedy, conserves storage capacity, and has a relatively small impact on the processing of IOBs directly related to an initiator. The group of background filters operates at the lowest criticality within the primary data storage system 28 or with an allowed latency that is significantly greater than the latency allowed in the foreground filters.

The background filters 164 operate in two contexts. The first context involves the potential writing of data that is on one store to another store. In the background filters 164, such potential movements are accomplished using a super IOB that has a write-related SCSI block command and facilitates communications between the filters. A super IOB is identical in form to IOB 182, except that the value of the PageMode field 224 is set to "on", which means that the values in the LBA/PageNum field 226 and the SectorCount/PageOffset field 228 now relate to pages and not blocks. The second context involves the processing of an IOB that has a SCSI read-related command that has not yet been fully addressed by any of the filters in the filter stack 132 that have previously processed the IOB.

Operation of the background filters 164 with respect to operations that involve a super IOB is invoked by the I/O journal filter 282 indicating that a portion of the journal 340 is "dirty", i.e., has not been processed to determine whether data in the journal should be moved to a different store. The actual percentage of the journal that is "dirty" is compared to a predetermined threshold value. If the actual percentage is less than the threshold percentage, operation of the background filters 164 is not invoked with respect to super IOBs. If the actual percentage of the journal that is "dirty" has a triggering relationship with respect to the threshold percentage (equals or exceeds, or only exceeds), operation of the background filters 164 is invoked for super IOBs. With respect to operations that involve an IOB with a SCSI read-related command, the presence of the IOB in the execution queue 314 is detected and the operation of the background filters 164 is invoked.

The background filters 164 include a destage filter 370, advanced deduplication filter 372, page pool filter 374, store converter filter 376, and store statistics collection filter 378.

De-State Filter. Generally, the destage filter 370 operates to move data between tiers of data stores with different characteristics and move the data so that the characteristics of the data reflect the characteristics of the store. In this regard, when the destage filter 370 is invoked because the percentage of the journal that is "dirty" has met some criteria, the destage filter 370 operates to determine if one or more pages of contiguous data blocks can be assembled from data blocks that typically are scattered throughout the journal. The destage filter 370 also makes a determination as to what should happen to any data blocks that cannot be assembled into a page.

If such a page can be assembled, the destage filter 370 generates a super IOB and passes the super IOB down the filter stack 132. The destage filter 370 further assesses whether each of the blocks that formed the page should, in addition to being the subject of the super IOB that will ultimately result in the blocks being written to another store, be persisted in the journal (i.e., whether a block is being read frequently enough to justify leaving the block in the journal). If two or more blocks are to be persisted in the journal, the destage filter 370 further assesses whether these blocks should remain in their current locations in the journal or be "compacted", i.e., consolidated into one or more consecutive journal entries. It should be appreciated that data for any specific layer and layer LBA may persist in multiple stores or tiers simultaneously.

With respect to a data block or blocks that are in the journal and that cannot be assembled into a page, the destage filter 370 operates to assess whether each such block has been resident in the journal for a period of time that exceeds a predefined threshold. If the threshold is exceeded, the destage filter 370 generates an IOB (not a super IOB) for the data block or group of contiguous blocks that is less than a page and passes the IOB down the filter stack 132. Further, the destage filter 370 assesses whether the block(s) should be persisted in the journal (i.e., whether the block(s) is being read frequently enough to justify leaving the block in the journal). If two or more blocks are to be persisted in the journal, the destage filter 370 further assesses whether the blocks should remain in their current locations in the journal or be "compacted", i.e., consolidated into one or more consecutive journal entries. If the threshold is not exceeded, the destage filter 370 assesses whether the two or more blocks of data that are logically contiguous blocks that are separated from one another in journal but can be compacted into a single journal entry or journal page. If not, the blocks remain in their current locations in the journal.

With the foregoing background in mind, the destage filter 370 determines if a page(s) can be assembled from the data blocks currently residing in the journal 340. In this regard, the destage filter 370 makes a working copy of the current journal table (e.g. journal table 352) and sorts the entries in the copy of the journal table by layer id and layer LBA. The destage filter 370 analyzes the sorted journal table and, if necessary, the bit-masks in the headers of one or more journal entry headers 348 to determine if there is a layer with enough consecutive layer LBAs of the data block size to equal a page. For example, if the block size is 512-bytes and the page size is 2-megabytes, 4096 consecutive blocks of data are required to assemble a page. If there are enough consecutive blocks of data to assemble a page, the destage filter 370 assembles a working page in a memory store (memory store 52A or 52B). A super IOB is generated and the IOB is passed down the filter stack 132.

After the destage filter 370 assembles a page, the destage filter 370 builds a super IOB 182 and populates certain fields of the IOB 182 with values from or derived from the journal 340. Specifically, the destage filter 370 sets the command field 230 to block write command. If the data is a full page, then the destage filter 370 sets the PageMode field 224 of the IOB 182 as "on" to indicate that the IOB 182 initially relates to a page and not a block or blocks of data. Moreover, the "on" value in the PageMode field 224 also indicates that the values established or to be established in the LBA/PageNum field 226 and Sector Count/PageOffset field 228 are Page-Num and PageOffset values and not LBA and SectorCount values. The destage filter 370 uses data in the journal entry headers 348 to populate the LBA/PageNum field 226, Count/PageOffset field 228, LayerID field 242, StoreID field 246, and StoreLBA field 248. The destage filter 370 uses data in the journal entry headers 348 to establish values in the NumberOfDataSegments field 236 and the DataSegmentVector field 238. To elaborate, the destage filter 370 places the data from the journal blocks 351 into the memory store (e.g., memory store 52A or 52B). The destage filter 370 places the number of data segments that are established in the memory store into the NumberOfDataSegments field 236 and the address and length of each of the segments established in the memory into the DataSegmentVector field 238. The destage filter 370 calculates a cyclic redundancy check (CRC) for each of the segments and places each of the CRC values in the DataCRCVector field 240. It should be appreciated that a data verification techniques other that CRC can be employed in place of CRC. The value of the QoS Attributes field 244 is set to 0 or "lowest priority". If the values of the InitiatorID field 220, VolID field 222 Error-Code field 232, ErrorOffset field 234, IssuerStack field 252, and XtraContextStack field 254 are not automatically set to "null" or irrelevant values when the IOB 182 is first established, the destage filter 370 establishes such values in these fields.

The destage filter 370 also pushes an indication onto the IssuerStack field 252 of the IOB 182 that the destage filter 370 needs to do additional processing when the IOB is propagating up the filter stack 132.

The destage filter 370 also updates a cache entry (CE) in a cache table for each journal entry that contributed one or more blocks to the page to indicate that the data associated with the journal entry is being destaged, i.e., is now the subject of a super IOB that will result in the data being written to a different data store. More specifically, a state bit mask in the CE is updated to indicate that the data associated with the journal entry is being destaged.

With respect to each of the data blocks that formed a page that is to be destaged, the destage filter 370 makes a determination of whether or not to persist the data block on the journal 340. In this regard, the destage filter 370 obtains statistical data from the statistics database 168 for the layer ID and layer LBA associated with the block. If the statistical data indicates that the data block is not being frequently read, the destage filter 370 removes the entry for the layer ID and layer LBA in the journal table (e.g., journal table 352) and updates the state bit mask in the related CE to indicate that the data block has been evicted from the journal 340. This effectively frees up the JE for the data block for use by the I/O journal filter 282. If the statistical data indicates that the data block is being frequently read, the destage filter 370 makes a determination as to whether to leave the data block in its current location or compact the data block with other data blocks that are being persisted. To make this determination, the destage filter 370 assesses whether the journal page that contains the data block is sparsely populated or not. If the journal page is sparsely populated and there is at least one other data block associated with another sparsely populated journal page, the destage filter 370 compacts the two data blocks into one journal page, thereby freeing up one journal page for use by the I/O journal filter 282. If the journal page is not sparsely populated, the data block is allowed to remain in its current location in the journal 340.

If the destage filter 370 determines that: (a) a page could not be assembled from the data blocks resident in the journal 340 when the destage filter 370 began processing the journal 340 ("unpageable data blocks") or (b) the journal had data blocks that could be assembled into a page ("pageable data blocks") and unpageable data blocks, the destage filter 370 processes each of the unpageable data blocks in the journal to assess how long the data block has been resident in the journal 340. In this regard, the destage filter 370 obtains the current time, obtains the "write" time from a time stamp field in the CE for the layer ID and the layer LBA that relates to the data block to determine when the data block was written into the journal 340, and determines the difference between the current time and the "write" time.

If the time difference exceeds a threshold, the destage filter 370 creates an IOB (not a super IOB) for the data block and any contiguous data blocks in a similar fashion to that noted for the super IOB but with a PageMode value set to "off" and passes the IOB on down the filter stack 132. Additionally, the destage filter 370 makes a determination of whether or not to persist the data block on the journal 340. In this regard, the destage filter 370 obtains statistical data from the statistics database 168 for the layer ID and layer LBA associated with the block. If the statistical data indicates that the data block is not being frequently read, the destage filter 370 removes the entry for the layer ID and layer LBA in the journal table (e.g., journal table 352) and updates the state bit mask in the related CE to indicate that the data block has been evicted from the journal 340. This effectively frees up the JE for the data block for use by the I/O journal filter 282. If the statistical data indicates that the data block is being frequently read, the destage filter 370 makes a determination as to whether to leave the data block in its current location or compact the data block with other data blocks that are being persisted. To make this determination, the destage filter 370 assesses whether the journal page that contains the data block is sparsely populated or not. If the journal page is sparsely populated and there is at least one other data block associated with another sparsely populated journal page, the destage filter 370 compacts the two data blocks into one journal page, thereby freeing up one journal page for use by the I/O journal filter 282. If the journal page is not sparsely populated, the data block is allowed to remain in its current location in the journal 340.

If the difference between the write time and the current time does not exceed a threshold, the destage filter 370 makes a determination as to whether to leave the data block in its current location or compact the data block with other data blocks that are being persisted. To make this determination, the destage filter 370 assesses whether the journal page that contains the data block is sparsely populated or not. If the journal page is sparsely populated and there is at least one other data block associated with another sparsely populated journal page, the destage filter 370 compacts the two data blocks into one journal page, thereby freeing up one journal page for use by the I/O journal filter 282. If the journal page is not sparsely populated, the data block is allowed to remain in its current location in the journal 340.

The destage filter 370 queries the statistics database 168 to determine if the system has sufficient resources to process the destage. If the system does have sufficient resources, the destage filter 370 places an "In" time in the In Time Stamp field 250 that reflects the point in time when or about when the destage filter 370 passes the IOB 182 on down the filter stack 132. If the system does not have resources to process the destage IOB, then the destage filter pauses and then tries the stats database query again.

Later, when a result IOB 182 is propagating up the filter stack 132 and reaches the destage filter 370, the current time is obtained, the "In" time stored in the In Time Stamp field 250 is obtained, and the total latency associated with the processing of the IOB is calculated, i.e., the elapsed time between when the "In" time value was obtained by the destage filter 370 and the when the current time was obtained. The destage filter 370 updates layer tables in the statistics database 168 with the total latency value. Additionally, the destage filter 370 updates all CEs that correspond to the result IOB setting the bitmask state to destage complete.

When the destage filter 370 is invoked because there is an IOB with a SCSI read-related command, the destage filter 370 passes the IOB on down the filter stack 132.

Advanced De-Duplication Filter. Generally, the advanced de-duplication filter 372 operates to preserve storage capacity at the primary data storage system 28 by preventing blocks of data associated with a super IOB that are commonly written to the primary data storage system 28 and do not have a readily calculable pattern from being written multiple times such that each writing of the page consumes additional storage capacity.

By way of background, the advanced de-duplication filter 372 maintains a super dictionary table that is capable of holding a number of entries that is greater than the number of entries that the dictionary table associated with the dictionary deduplication filter 280 utilizes. Each non-null entry in the super dictionary table includes, for a page associated with a super IOB, a value for each of a cyclic redundancy check (CRC) for the page, a layer ID, PageNum, a StoreID, and StoreLBA. The CRC is a number that is calculated using the data in a page and representative of the data in a page but not necessarily a unique number relative to the data in the page, i.e., there is the possibility that two pages with different data have the same CRC. Nonetheless, if two pages of data do have the same CRC, there is a distinct possibility that the two pages do have the same data. It should be appreciated that hashes, checksums, and the like can be used in lieu of a CRC to identify pages that have potentially identical data.

With respect to the processing of a super IOB relating to a write, the advanced deduplication filter 372 calculates a CRC for the page located in a memory store (memory store 52A or 52B) due to the operation of the destage filter 370. The advanced deduplication filter 372 enters the calculated CRC value and the values from the LayerID field 242, LBA/PageNum field 226, StoreID field 246, and StoreLBA field 248 in the super dictionary table. The advanced deduplication filter 372 determines if there is another entry in the super dictionary table that has the same CRC value, the same value for the StoreID, and the value for the StoreID corresponds to a memory store. Two entries in the super dictionary table with the same CRC value are potentially identical pages. Two entries in the super dictionary table that also each has a value for the StoreID that corresponds to a memory store (which is a high speed memory) can be compared to one another very quickly. The data associated with the write IOB and the dictionary entry is in memory store 52A or 52B, the fastest type of store in the illustrated system. If there is another entry in the super dictionary table that has the same CRC value and a value for the StoreID that corresponds to a memory store, the advanced deduplication filter compares the two pages to one another. If the two pages are identical, the advanced deduplication filter 372 changes the value in the command field 230 of the super IOB from a write to a de-dup write, adjusts the values in the StoreID field 246 and StoreLBA field 248, and passes the super IOB on down the filter stack 132.

Further, the advanced deduplication filter 372 increments a page counter that is used to determine whether the identical page is being written commonly or frequently enough to warrant identifying the page as being appropriate for use in the dictionary table used by the dictionary deduplication filter 280 in the group of foreground filters 162. If the page satisfies the test for inclusion in the dictionary table, the advanced deduplication filter obtains the portion of the page (e.g., the second 64-bytes in the page) that is associated with each of the non-null entries in the dictionary table. If the portion of the page is unique relative to each of the portions of the pages associated with the other entries, the page is added to the dictionary table. Further, if the dictionary table is full, the entry with the oldest access time (obtained from the statistics database 168) is deleted to make room for the new entry. If the portion of the page is not unique relative to each of the portions of the pages associated with the other entries in the dictionary table, the advanced deduplication filter 372 operates to identify a portion of each of the pages in the dictionary table that is unique and updates the entire dictionary table accordingly. If a portion of each of the pages in the dictionary table that is unique cannot be identified, the page is not added to the dictionary table.

If the two pages are not identical, the advanced deduplication filter 372 proceeds to assess the impact of considering whether other entries in the super dictionary table having the same CRC are duplicates of the page associated with the super IOB. Specifically, the advanced deduplication filter 372 queries the statistics database 168 to determine if the QoS goals are currently being achieved or nearly achieved (a "headroom" calculation). If the impact is acceptable, the advanced deduplication filter 372 causes the page that is at the location identified by the values in the StoreID and StoreLBA fields in the super dictionary table to be read into a memory store for comparison to the page associated with the super IOB currently in the memory store. Since the page associated with the super IOB and the potentially identical page are now both in memory, the comparison proceeds in substantially the same fashion as described above when the two pages were both in memory store when the processing of the super IOB by the advanced deduplication filter 372 began. If the impact is not acceptable, the advanced deduplication filter 372 passes the super IOB on down the filter stack 132. If there is no entry in the super dictionary table that has the same CRC, the advanced deduplication filter 372 passes the super IOB on down the filter stack 132.

With respect to an IOB with a SCSI write-related command that does not relate to a page, the advanced deduplication filter 372 deletes the entry in the super dictionary table that has the layer ID and the PageNum values set forth in the IOB. The entry is deleted because the write command associated with the IOB will be subsequently executed and likely change the CRC for the page with which the data block(s) that are the subject of the write command are associated. As such, the current CRC for the page will no longer be valid and useable for assessing whether there is a page that is the subject of a super IOB should be deduplicated. Further, the advanced deduplication filter 372 passes the IOB on down the filter stack 132.

Read De-Duplication Operation. Generally, the advanced deduplication filter 372 operates on an IOB having a SCSI read-related command that need not relate to a page to determine if the data associated with the identified layer id and LBA is data that has been previously de-duplicated in the processing of an IOB with a SCSI write-related command relating to the same layer id and LBA. More specifically, the advanced deduplication filter 372 obtains the value in the StoreID field 246 and determines if the value is currently associated with the dictionary store 322. If the value is currently associated with the dictionary store 322, the advanced deduplication filter 372 then places the data from the dictionary store 322 into the memory store (e.g., memory store 52A or 52B). The advanced deduplication filter 372 places the number of data segments that are established in the memory store into the NumberOfDataSegments field 236 and the address and length of each of the segments established in the memory into the DataSegmentVector field 238. Further, the advanced deduplication filter 372 updates the value in the DataSegmentVector field to point to the address in the memory store (e.g., memory store 52A or 52B) that has the copy of the dictionary page and, more specifically, to point the first block of the page that has the first block to which the SCSI read command relates. Further, the advanced deduplication filter 372 places a "success" code in the error field 232 and causes the IOB to start propagating up the filter stack 132, thereby indicating that the SCSI read-related command of the IOB has been completed. If the value in the StoreID field 246 is not currently associated with the dictionary store 322, the IOB is passed down the filter stack 132 for further processing.

The following Table 4 is a pseudo-code description of the advanced deduplication filter 372.

TABLE 4

Pseudo-code for Advanced Deduplication

```
/******************************************************************
**/
/* C- pseudo code for Advanced DeDup (372) */
/******************************************************************
**/
AdvancedDeDupEngine = 372
CandidateInfo {
    number CheckSum
    number LocationStore = {MEM, SSD, SAS}
    number LocationLBA = {MEM, SSD, SAS}
    number HitCount = 0
}
CandidatesMax = 255
Candidates[CandidatesMax] = { }, { }
/**************************/
main( ) {
    Initialize( )
    while ( true ) {
        Iob = ReceiveIob( )
        if (ProcessIOB ( Iob ) == true) {
            ReturnResult(Iob, true)
        } else {
            NextFilterProcess(Iob)
        }
    } /* while forever */
}
/**************************/
boolean Initialize( ) {
    for CandidateIdx = 0 ; CandidateIdx < CheckSumsMax ; CandidateIdx ++
    {
        LoadCandidateList( CandidateIdx )
    }
}
/**************************/
boolean ProcessIOB( Iob )
{
/* Execute the write determination processor */
    if (Iob.command == Write) {
        return(IOBWrite( Iob ))
    } else {
/* Execute the read determination processor */
        if (Iob.command == Read) {
            return(IOBRead( Iob ))
        } else {
            /* not a Write or a Read, do not process it */
            return(false)
        }
    }
}
/**************************/
boolean IOBWrite( Iob )
{
    if (AdvDedupWrite ( Iob ) == true ) {
        if ( UpdatePatternDedupNeeded( Iob ))
    }
}
/**************************/
boolean IOBWrite( Iob )
{
    CandidateList = Candidates[Iob.DATACRCVector]
    for OneCandidate in CandidateList {
        if ( OneCandidate->LocationStore == MEM ) {
/* Execute the headroom processor to determine if the system has */
/* available resources to execute the */
/* advanced deduplication processor using memory store */
            if (QOSHeadRoomProcessor(Iob.QosAttributes, MEMORY) ==
                true) {
/* Execute the compare processor for Advanced Deduplication */
                if (CmpCandidate( Iob, OneCandidate ) ) {
                    Iob.StoreID = OneCandidate->LocationStore
                    Iob.StoreLBA = OneCandidate->LocationLBA
                    OneCandidate->HitCount ++;
                    DictionaryDeDupUpdateList( OneCandidate->LocationStore, OneCandidate->LocationLBA, OneCandidate->HitCount )
                    return(true)
                }
            }
        }
```

TABLE 4-continued

Pseudo-code for Advanced Deduplication

```
        }
        if ( OneCandidate->LocationStore == SSD) {
/* Execute the headroom processor to determine if the system has */
/* available resources to execute the */
/* advanced deduplication processor using SSD store */
            if (QOSHeadRoomProcessor(Iob.QosAttributes, SSD) == true) {
/* Execute the compare processor for Advanced Deduplication */
                if (CmpCandidate( Iob, OneCandidate ) ) {
                    Iob.StoreID = OneCandidate->LocationStore
                    Iob.StoreLBA = OneCandidate->LocationLBA
                    OneCandidate->HitCount ++;
                    DictionaryDeDupUpdateList( OneCandidate->LocationStore, OneCandidate->LocationLBA, OneCandidate->HitCount )
                    return(true)
                }
            }
        }
        if ( OneCandidate->LocationStore == SAS) {
/* Execute the headroom processor to determine if the system has */
/* available resources to execute the */
/* advanced deduplication processor using SAS store */
            if (QOSHeadRoomProcessor(Iob.QosAttributes, SAS) == true) {
/* Execute the compare processor for Advanced Deduplication */
                if (CmpCandidate( Iob, OneCandidate ) ) {
                    Iob.StoreID = OneCandidate->LocationStore
                    Iob.StoreLBA = OneCandidate->LocationLBA
                    OneCandidate->HitCount ++;
                    DictionaryDeDupUpdateList( OneCandidate->LocationStore, OneCandidate->LocationLBA, OneCandidate->HitCount )
                    return(true)
                }
            }
        }
    }
    return(false)
}
/**************************/
boolean CmpCandidate( Iob, TestCandidate )
{
    if ( TestCandidate->LocationStore == MEM ) {
        TestBuffer = MemroyGetDataBuffer(TestCandidate->LocationLBA)
        CmpBuffer ( Iob, TestBuffer )
    }
    if ( TestCandidate->LocationStore == SSD ) {
        TestBuffer = SSDGetDataBuffer(TestCandidate->LocationLBA)
        CmpBuffer ( Iob, TestBuffer )
    }
    if ( TestCandidate->LocationStore == SAS ) {
        TestBuffer = SAS(TestCandidate->LocationLBA)
        CmpBuffer ( Iob, TestBuffer )
    }
}
/**************************/
boolean CmpBuffer( Iob, DataBuffer )
{
    DatBufByte = 0
    for dataseg in Iob.DataSegmentVector {
        for bytenum = 0 ; bytenum < dataseg.Bytes ; bytenum ++ {
            if (dataseg.Buffer[bytenum] != DataBuffer[DatBufByte]) {
                return(false)
            }
            DatBufByte ++
        }
    }
    return(true)
}
/**************************/
boolean IOBRead( Iob )
{
    return(false)
}
```

Page Pool Filter. Generally, the page pool filter 374 operates to allocate storage space on the stores associated with the primary data storage system 28 other than a store that is non-persistent and any portion of a store that is not dedicated to a journal as needed. More specifically, the page pool filter 374 maintains a store map for each store for which the filter can allocate storage that identifies all of the storage pages on the store and indicates whether or not each such storage page has been allocated. Additionally, the page pool filter 374 maintains a layer-store table 410 with each entry in the table mapping a layer ID and layer LBA to a StoreID and StoreLBA. The table also indicates whether the data at a particular StoreID and StoreLBA is shared by more than one layer ID, layer LBA. This indication is referred to as a ref-count, with a ref-count of 1 indicating that the data at the location specified by the StoreID and StoreLBA is only associated with one layer ID, layer LBA. A ref-count that is greater than 1 indicates that the data at the location specified by the StoreID and Store LBA is associated with more than one layer ID, layerLBA.

With the foregoing background in mind, the page pool filter 374 operates on a received IOB to determine if the received IOB is an IOB or a super IOB. More specifically, the page pool filter 374 obtains the value in the PageMode field 224 of the received IOB. If the value is "yes", the received IOB is a super IOB, i.e., embodies a write-related command that involves a page of data.

With respect to a super IOB, the page pool filter 374 determines whether the command in the command field 230 is a write command or a dedup write command. If the command is a write command, the page pool filter 374 obtains the values in the LayerID field 242 and the LBA/PageNum field 226 and determines whether there is an entry in the layer-store table 410. If there is no entry in the layer-store table 410 with the specified layer ID and layer LBA values, the page of data for the specified layer ID and layer LBA has not been previously written to any of the stores for which the page pool filter 374 allocates space. In this case, the page pool filter 374 interrogates the store map(s) to identify a page of space on the related store to which the page of data can be efficiently written. With respect to an identified page, the page pool filter 374 determines the values for the StoreID and StoreLBA. The page pool filter 374 allocates the page to the layer ID and layer LBA. In this regard, the page pool filter 374 updates the layer-store table to include an entry with the values for the layer ID, layer LBA, StoreID and StoreLBA and stores the updated store map. Further, the page pool filter 374 sets the ref-count field in the entry to 1 to indicate that the data to be established beginning at the location specified by the StoreID and StoreLBA values is currently associated with only one layer ID and layer LBA. The page pool filter 374 updates the StoreID field 246 and StoreLBA field 248 in the IOB with the StoreID and StoreLBA values of the allocated storage. The updated super IOB is then passed down the filter stack 132.

If there is an entry in the layer-store table 410 with the specified layer ID and layer LBA values, data associated with the specified layer ID and layer LBA has been previously written to a store. With respect to such data, the page pool filter 374 determines if the data is shared, i.e., associated with another layer ID and layer LBA values. In this regard, the page pool filter 374 determines if the ref-count field in the entry in the layer-store table 410 for the layer ID and layer LBA in the super IOB is 1. If the ref-count is 1, the data at the location specified by the StoreID and StoreLBA values in the table is not shared. In this case, the values for the StoreID and StoreLBA in the table are respectively loaded into the StoreID field 246 and StoreLBA field 248. The updated super IOB is then passed on down the filter stack 132.

If the ref-count is greater than 1, the data at the location specified by the StoreID and StoreLBA for the entry in the layer-store table 410 is shared with at least one other layer ID and layer LBA. In this case, because the data at the location is shared and the IOB involves the writing of data that is different than the data currently at the location, the page pool filter 374 must allocate new space on a store for the page of data associated with the super IOB. In this regard, the page pool filter 374 proceeds substantially as noted with respect to the situation in which there was no entry in the layer-store table 410 with the specified layer ID and layer LBA values. Further, the page pool filter 374 also decrements the ref-counts.

If the command in the command field 230 of the super IOB is a dedup write, the page pool filter 374 establishes a new entry in the layer-store table 410 and populates the entry with the values from the LayerID field 242, LBA/PageNum field 226, StoreID field 246, and the StoreLBA field 248 from the super IOB. In this instance, the values in the StoreID field 246 and the StoreLBA field 248 were previously established by the advanced deduplication filter 372. Further, the page pool filter 374 identifies the other entries in the layer-store table 410 that have the same value for the StoreID and StoreLBA. With respect to each of these entries in the layer-store table 410 the ref-count value is incremented. The page pool filter 374 also establishes this incremented ref-count value in the new entry in the layer-store filter. The processing with respect to this super IOB is now complete. Consequently, the page pool filter 374 places a "success" code in the error code field 232 and causes the IOB to start propagating up the filter stack 132.

If the received IOB is not a super IOB, the page pool filter 374 determines whether the command in the command field 230 is a write command or a read command. If the command is a write command, the page pool filter 374 obtains the values in the LayerID field 242 and the LBA/PageNum field 226 and determines whether there is an entry in the layer-store table 410. If there is no entry in the layer-store table 410 with the specified layer ID and layer LBA values, the block(s) of data for the specified layer ID and layer LBA has not been previously written to any of the stores for which the page pool filter 374 allocates space. In this case, the page pool filter 374 interrogates the store map(s) to identify a page of space on the related store to which the block(s) of data can be efficiently written. With respect to an identified page, the page pool filter 374 determines the values for the StoreID and StoreLBA. The page pool filter 374 allocates the page to the layer ID and layer LBA. In this regard, the page pool filter 374 updates the layer-store table 410 to include an entry with the values for the layer ID, layer LBA, StoreID and StoreLBA and stores the updated store map. Further, the page pool filter 374 sets the ref-count field in the entry to 1 to indicate that the data to be established beginning at the location specified by the StoreID and StoreLBA values is currently associated with only one layer ID and layer LBA. The page pool filter 374 updates the StoreID field 246 and StoreLBA field 248 in the IOB with the StoreID and StoreLBA values of the allocated storage. The update IOB is then passed down the filter stack 132.

If there is an entry in the layer-store table 410 with the specified layer ID and layer LBA values, data associated with the specified layer ID and layer LBA has been previously written to a store. With respect to such data, the page pool filter 374 determines if the data is shared, i.e., associated with another layer ID and layer LBA. In this regard, the page pool filter 374 determines if the ref-count field in the entry in the layer-store table 410 for the layer ID and layer LBA in the IOB is 1. If the ref-count is 1, the data at the location specified by the StoreID and StoreLBA values in the layer-store table 410 is not shared. In this case, the values for the StoreID and StoreLBA in the layer-store table 410 are respectively loaded into the StoreID field 246 and StoreLBA field 248. The super IOB is then passed on down the filter stack 132.

If the ref-count is greater than 1, the data at the location specified by the StoreID and StoreLBA for the entry in the layer-store table 410 is shared with at least one other layer ID and layer LBA. In this case, because the data at the location is shared and the IOB involves the writing of data that is different than the data currently at the location, the page pool filter 374 must allocate new space on a store for the page of data associated with the super IOB. Moreover, because the writing to the store is page-based and not block-based at this point and the IOB relates to a block(s) and not a page, the page pool filter 374 must build the page that is to be written to the newly allocated space. Consequently, the page pool filter 374 reads the page that is at the location specified by the current StoreID and StoreLBA in the layer-store table 410 into a memory store (e.g., memory stores 52A or 52B) and modifies the page to include the block(s) that are associated with the IOB. The page pool filter 374 establishes a new entry in the layer-store table 410 and enters the values from the LayerID field 242 and LBA/PageNum field 226 of the IOB into the new entry in the table. Further, the StoreID and StoreLBA values for the newly allocated space are also placed in the new entry. The ref-count for the new entry is set to 1 to indicate that the page is not shared with any other layer ID and layer LBA. The page pool filter 374 updates the values of the StoreID field 246 and the StoreLBA field 248 in the IOB to reflect the StoreID and StoreLBA for the newly allocated space. Further, the page pool filter 374 updates the DataSegmentVector 238 in the IOB to indicate the location of the modified page in the memory store. The updated IOB is then passed down the filter stack 132.

If the command is a read command, the page pool filter 374 uses the values from the LayerID field 242 and the LBA/PageNum field 226 to identify the entry in the layer-store table 410 that relates to the data that is to be read. In this regard, the value in the LBA/PageNum field 226 relates to an LBA and not a page. The page pool filter 374 accomplishes the conversion by masking off certain bits of the LBA value. The layer ID and PageNum values are then used to identify the entry in the layer-store table 410 relating to the data that is the subject of the read command. The page pool filter 374 retrieves the values for the StoreID and StoreLBA associated with the entry in the layer-store table 410 and loads these values into the StoreID field 246 and StoreLBA fields 248 of the IOB. The updated IOB is then passed down the filter stack 132.

Store Converter Filter. Generally, the store converter filter 376 processes super IOBs and IOBs so as to generate an element specific IOB(s), i.e., the command(s) that are needed to actually perform the read or write of the data associated with the super IOB or IOB. To elaborate, a particular store has data transfer requirements, a data redundancy attribute, and a path redundancy attribute. The store converter filter 376 processes super IOBs and IOBs to produce the element specific IOB(s) with the command(s) to the store that satisfy the data transfer requirements of the store, preserve the data redundancy attribute of the store, and preserve the path redundancy attribute of the store.

Write Data Transfer—Size. With respect to super IOBs and IOBs that have SCSI write-related commands, the store converter filter 376 interrogates a store table to obtain the size of a write-related data transfer that the store accommodates. If the size of the data transfer accommodated by the store is equal to a page, the store converter filter 376 generates the element specific IOB with the command(s) necessary to write the page of data associated with the super IOB to the store.

With respect to a super IOB with a write-related command, if the size of the data transfer accommodated by the store is greater than a page, the store converter filter 376 generates the element specific IOB(s) with the command(s) necessary to: (a) read the current greater portion of data that is on the store and that includes the location at which the page is to be written, (b) modify the read current greater portion of data to include the page of data associated with the super IOB, and (c) write the modified greater portion of data to the store. For example, if the store requires that write data transfers be done in 4-megabyte chunks, the store converter filter 376 generates the commands necessary to: (a) read the current 4-megabyte chunk of data on the store that includes the location at which the page associated with the super IOB is to be written, (b) modify the read 4-megabyte chunk to include the page associated with the super IOB, and (c) write the modified 4-megabyte chunk to the store.

Conversely, if the size of data transfer accommodated by the store is less than a page, the store converter filter 376 divides the page of data associated with the super IOB into whatever size chunks of data are required by the store and generates the element specific IOB(s) with the command(s) for transferring these chunks of data to the store. For instance, if a store requires that data to be written in 512-byte chunks, the store converter filter 376 divides the 2-megabyte page associated with the super IOB into 4096 512-byte chunks and generates the command(s) for writing each of the 4096 512-byte chunks to the store.

If the size of data transfer accommodated by a store is greater than a page but not a whole number multiple of a page, the store converter filter 376: (a) divides the page into one or more chunks of the size required by the store and generates the command(s) for writing each of these chunks to the store and (b) with respect to the remaining data that is less than the size of data transfer accommodated by the store, produces the read, modify, write commands previously described for writing the data to the store.

With respect to an IOB with a SCSI write-related command, the store converter filter 376 operates in substantially the same fashion as noted with respect to a super IOB, except that the size of the block or blocks of data that are the subject of the IOB rather than a page are compared to the size of the data transfer accommodated by the store.

Write—Data Redundancy. The store converter filter 376 also interrogates the store table to determine the value of the data redundancy attribute associated with the store, performs any calculations that are associated with satisfying this attribute for the store, and generates or modifies the element specific IOB so as to implement the data redundancy. For example, if a store comprises a RAID-6 element, the store converter filter 376 engages in the parity calculations that are needed for use with a store that includes such an element and modifies the element specific IOB accordingly. As another example, if the store includes two elements that are mirrored to provide data redundancy, the store converter filter 376 modifies the element specific IOB to include the command(s) needed for implementing the mirroring.

Write—Path Redundancy. The store converter filter 376 further interrogates the store table to determine the value of the path redundancy attribute associated with the store. In addition, the store converter filter 376 interrogates a configuration table for the primary data storage system 28 that provides the physical layout of the level and the characteristics of the various elements at the level. For example, the configuration table identifies each store, the number of I/O ports associated with each store, the status of the ports, identifies the switches in the store and the status of the switches etc. The store converter filter 376 generates or modifies the element specific IOB to provide the necessary information for routing the data from its current location in the primary data storage system 28 (e.g., the memory store) to the store.

Write—Element Specific IOB. With respect to either an IOB or a super IOB with a SCSI write-related command, once the assembly of the element specific IOB is complete, the store converter filter 376 pushes an indication onto the IssuerStack field 252 that the store converter filter 376 needs to conduct further processing of the super IOB or IOB after the execution or attempted execution of the commands in the element specific IOB is complete. The store converter filter 376 passes the element specific IOB on down the filter stack 132.

Read Data Transfer—Size. With respect to an IOB with a SCSI read-related command, the store converter filter 376 interrogates a store table to obtain the size of a read-related data transfer that the store accommodates. If the size of the read data transfer accommodated by the store is equal to the size of the data that is the subject of the IOB, the store converter filter 376 generates the element specific IOB with the command(s) necessary to read the data associated with the IOB from the store.

If the size of a data transfer accommodated by the store is greater than size of the data that is the subject of the IOB, the store converter filter 376 generates the element specific IOB with the command(s) necessary to read the current greater portion of data that is on the store and that includes the location with the data that is the subject of the IOB into the memory store. The store converter filter 376 then updates the value in the DataSegmentVector field to point to the address in the memory store (e.g., memory store 52A or 52B) that has the copy of the page and, more specifically, to point the first block of the page that has the first block to which the SCSI read command relates.

If the size of data transfer accommodated by the store is less than the size of the data associated with the IOB, the store converter filter 376 determines the number of data transfers that will be necessary to transfer data of the size specified in the IOB and generates the element specific IOB(s) with the command(s) for conducting the calculated number of reads from the store.

If the size of a data transfer accommodated by a store is less than the size of the data associated with the IOB but not a whole number multiple of a size of the data, the store converter filter 376: (a) determines the number of data transfers that will be necessary to transfer data of the size specified in the IOB and generates the element specific IOB(s) with the command(s) for conducting the calculated number of reads from the store and (b) with respect to the remaining data that is less than the size of data transfer accommodated by the store, generates or modifies the element specific IOB to include the command(s) necessary to read the portion of data that is on the store that is of a greater size than the remaining data but includes the location with the remaining data.

Read—Data and Path Redundancy. The store converter filter 376 accesses a hardware state table to determine which path(s) and element(s) to which the element specific IOB should be sent.

Read—Element Specific IOB. With respect to either an IOB or a super IOB with a SCSI read-related command, once the assembly of the element specific IOB is complete, the store converter filter 376 pushes an indication onto the IssuerStack field 252 that the store converter filter 376 needs to conduct further processing of the super IOB or IOB after the execution or attempted execution of the commands in the element specific IOB is complete. The store converter filter 376 passes the element specific IOB on down the filter stack 132.

Later, when a result IOB 182 is propagating up the filter stack 132 and reaches the store converter filter 376. The store converter filter 376 updates store hardware stats tables in the statistics database 168 with the latency value, throughput, queue depth, and use count. It should be appreciated that other tables or statistics in the statistics database 168 may also be updated.

Store Stats Collection Filter. Generally, the store stats collection filter 378 operates to collect certain store and element related data/statistical information for each IOB passed to the store stats collection filter 378 from the store convertor filter 376 when the IOB is going down the filter stack 132. To elaborate with respect to IOB 182, the store stats collection filter 378 processes the IOB 182 to obtain the store id from the StoreId field 246, the element id from the ElementID field 256, the sector count from the SectorCount/PageOffset field 228, and the "In" time stamp value from the In Time Stamp field 250. The store stats collection filter 378 also obtains the current time from the operating system. The store stats collection filter 378 uses the value of the "In" Time Stamp and the current time to calculate the latency that the IOB has experienced between when the "In" Time Stamp value was established in the destage filter 370 and when the current time is obtained by the store stats collection filter 378 (hereinafter referred as "first latency"). The store stats collection filter 378 communicates with the statistics database 168 so as to: (a) update a table for the store that is maintained in the database to reflect that an IOB associated with the store will be processed that has the sector size obtained from the IOB and that the IOB has experienced the calculated first latency and (b) update a table for the element that is maintained in the database to reflect that an IOB associated with the element will be processed that has the sector size obtained from the IOB and that the IOB has experienced the calculated first latency.

The store stats collection filter 378 also pushes an indication onto the IssuerStack field 252 of the IOB 182 that the store stats collection filter 378 needs to do additional processing when the IOB is propagating up the filter stack 132. Further, the store stats collection filter 378 also pushes the current time onto the XtraContextStack field 254.

Later, when the IOB 182 is propagating up the filter stack 132 and reaches the store stats collection filter 378, the store stats collection filter 378 obtains the time from the XtraContextStack field 254 (which is no longer the current time), obtains the "new" current time, and calculates a second latency, i.e., the elapsed time between when the time value was obtained that was pushed onto the XtraContextStack field 254 and the IOB was propagating down the filter stack 132 and the when the "new" current time was obtained. The store stats collection filter 378 updates the store and element tables in the statistics database 168 with the second latency value.

Storage Hardware Driver. Generally, the storage hardware driver 380 controls a SCSI card so as to produce the electrical signals needed to receive a message, such as SCSI block result, and transmit a message, such as a SCSI block request. The storage hardware driver 380 assures the addressing of packets associated with a message. With respect to received packets, the storage hardware driver 380 confirms that each of the received messages does, in fact, belong to the SCSI card. With respect to messages that are to be transmitted, the storage hardware driver 380 assures that the each message is appropriately addressed so that the message gets to the desired element. With respect to a received message, the storage hardware driver 380 also recognizes the packet as requiring further routing back up the filter stack 132. The storage hardware driver 380 also performs other processing in accordance with the protocols, e.g., ordering packets, checksum etc.

It should be appreciated that the storage hardware driver 380, operates to process block commands, i.e., commands that relate to the reading of a block data from or writing of a block data to a storage medium. As such, the storage hardware driver 380 can be adapted to operate with storage hardware other that SCSI cards.

It should be appreciated that a number of functions noted with respect to the primary data storage system 28 can be realized with a primary data storage system having a single storage processor and a single data store and primary data storage systems having more elements than noted with respect to the primary data storage system 28. For example, the tiering function described with respect to I/O journal filter and the destage filter can be practiced in a primary data system with two data stores having different performance characteristics. The QoS function described with respect to the QoS filter can be practiced in a primary data storage system that has a single data store where there are two are more volumes associated with the store. The de-duplication function can be practiced in a primary data storage system with a single data store. It should also be appreciated that the redundancy described with respect to the primary data storage system 28 is not required to practice many of the functions provided by the filters in the filter stack. It should also be appreciated that a primary data storage system can employ a filter stack with a fewer number or greater number of filters than are in the filter stack 132. For instance, in a primary data storage system that is only going to service a single volume, a filter stack can be employed that omits a QoS filter. Additionally, a filter stack can be employed in which the order of filters in the stack is different than in filter stack 132. For instance, a filter stack could be employed in which an I/O journal filter preceded a dictionary deduplication filter.

Tier and Tiering. A tier is a group of stores that have similar characteristics such as throughput, latency, capacity, path redundancy, data redundancy, and atomic block size (i.e., the smallest individually addressable block of a store) or a store with a defined set of such characteristics. For example, memory store 52A and 52B comprise a tier, RAID disk arrays 56A and 56B comprise a different tier, and SSDs 54A and 54B comprise yet another tier. One tier can differ from another tier in one characteristic or multiple characteristics. For instance, a particular tier may have specific latency and throughput characteristics while another tier may have the same latency but a different throughput characteristic.

A tiering storage system is a storage system that attempts to match the access pattern relating to a block of data in the system to the tier having the most appropriate or compatible characteristics.

Many of the filters in the filter stack 132 are involved in providing tiering functionality, e.g., the QoS filter 274, the pattern de-duplication filter 278, the dictionary de-duplication filter 280, the I/O journal filter 282, the destage filter 370, the advanced de-duplication filter 372, the page pool filter 374, the calculation engine 320, the dictionary store 322, and the statistics database 168.

The QoS filter 274 evaluates an IOB and volume, criticality, and hardware statistics from the statistics database 168 to determine the most compatible and available tier(s) for the blocks of data relating to an IOB. The QoS filter 274 updates the AllowedStores field 260B of the IOB with the identified tier(s). It should be appreciated that the AllowedStores field 260B can be implemented as a bitmask and the QoS filter 274 can indicate in the bitmask that an IOB should skip a tier. For example, in the case of a very large write data related command, the QoS filter 274 might indicate that the write data associated with the IOB be written to the RAID disk array 56A or 56B instead of the SSDs 54A or 54B, which are in a higher tier than the RAID disk arrays 56A, 56B.

The pattern de-duplication filter 278 and the calculation engine 320 implement a tier-1 (the fastest tier, but with a limited capacity) functionality in the illustrated primary data storage system 28. The pattern de-duplication filter 278 operates to identify and respond to IOBs that contain blocks of data capable of being stored or retrieved from the calculation engine 320 or other similar engines. The calculation engine 320 provides a CPU store for storing and retrieving blocks of data that are readily calculable. The calculation engine 320 is implemented by using a CPU and a limited amount of high speed memory to store and retrieve blocks of data. The calculation engine has a block size characteristic of 512 bytes (the smallest of any tier). The calculation engine 320 has the lowest latency and highest bandwidth of the stores illustrated. It should be appreciated that the calculation engine 320 could be realized using specialized hardware such as a DMA engine or an MMX processor.

The dictionary de-duplication filter 280 and the dictionary store 322 implement a tier-2 (slower than tier-1 but with greater capacity than tier-1) functionality. The dictionary de-duplication filter 280 operates to identify and respond to IOBs that contain blocks of data that are identical to the blocks of data stored in the dictionary store 322. The dictionary store 322 provides a dictionary table and a memory store 52A or 52B for storing and retrieving blocks of data which are not readily calculable. The dictionary store 322 has a block size characteristic of 2 MB.

The I/O journal filter 282 and the SSDs 54A and 54B implement a tier-3 (slower than tier-2 but with greater capacity than tier-2) functionality. The I/O journal filter 282 operates to identify and respond to IOBs that the filters above in the filter stack 132 have not fully processed. The I/O journal filter 282 stores blocks of data to and retrieve blocks of data from the SSDs 54A and 54B based upon the characteristics of the SSDs 54A and 54B (e.g. atomic block size, performance, throughput, IOPs, persistence, and redundancy). The SSDs 54A and 54B each provide a persistent store for storing blocks of data. The SSDs 54A and 54B each have an atomic block size characteristic of 4 KB.

The destage filter 370 is responsible for movement of blocks of data between two tiers. The destage filter 370 decides when blocks of data relating to an IOB should be copied, moved, or cleared relative to multiple tiers (in the illustrated system 28, the tier-3 SSDs 54A or 54B and the tier-4 RAID disk array 56A or 56B). The destage filter 370 uses the characteristics of the source and destination tiers to accommodate the different tier requirements. For example, the SSDs 54A and 54B require atomic block accesses to be 4 KB in size while the RAID disk arrays 56A and 56B require atomic block accesses to be 2 MB (page size). Thus, destage filter 370 executes a multitude of reads from the SSD 54A or 54B in 4 KB chunks that coalesce in high speed memory until 2 MB have been read. The destage filter 370 then executes a write command to the RAID disk array 56A or 56B with the 2 MB that is now in high speed memory. Likewise, the destage filter 370 evaluates other characteristics of the various stores and accommodates the characteristic strengths and attempts to avoid the characteristic weaknesses. For example, the RAID disk array 56A or 56B has a seek penalty. Due to this penalty, the destage filter 370 processes IOBs in a fashion to limit or reduce this seek penalty impact. The ability of destage filter 370 to accommodate various characteristics of different stores enables more efficient use of resources. For example, the atomic block size of the SSDs 54A and 54B is smaller than the atomic block size of the RAID disk array 56A or 56B which allows the SSDs 54A and 54B to contain smaller segments of more frequently accessed blocks of data and not require the SSDs 54A and 54B to hold blocks of data that are adjacent to the frequently accessed blocks of data. In effect this is more efficient use of the SSDs 54A and 54B.

The destage filter 370 can also copy blocks of data between tiers so as to maintain a block of data in multiple tiers and thus increasing redundancy associated with the block of data. This also allows the block of data that is located in multiple tiers to be "fast reused". Fast reuse occurs when a tier includes a copy of a block(s) (i.e., there is another copy in another tier) and it is necessary to make space in the tier for a block or blocks of data associated with a different IOB command. In this case, the copy of the block(s) in the tier can be deleted or written over to make space for the block(s) associated with the different IOB command.

The destage filter 370 endeavors to match a block or blocks of related data to the tier that is appropriate for the access pattern associated with the block or blocks of related data. To accomplish this, the destage filter 370 accesses the statistics database 168 to acquire historical statistics related to the volume with which the data block or related data blocks are associated and evaluates those statistics to detect trends in the access pattern. For example, if the initiator access pattern is a streaming video (a trend represented by a sequence of consecutive IOBs), the destage filter 370 would likely direct the blocks of data to the tier containing the RAID disk array 56A or 56B because the RAID disk array 56A or 56B is more efficient than other tiers in processing large, contiguous blocks of data. In contrast, if the initiator access pattern is a random read, the destage filter 370 endeavors to maintain the blocks of data in a tier such as SSDs 54A and 54B because this tier has a smaller seek latency penalty relative to the other tiers in the system.

The advanced de-duplication filter 372 provides movement of blocks of data between tier-4 and tier-2. More specifically, advanced de-duplication filter 372 uses the super dictionary table to determine when a group of contiguous blocks of data that constitute a page is frequently accessed. If a page is accessed more frequently than other pages active in the dictionary table, then the advanced de-duplication filter 372 identifies that page as a candidate for movement to tier-2. The advanced de-duplication filter 372 subsequently coordinates with the dictionary de-duplication filter 280 to update the dictionary table with the candidate page.

The page pool filter 374 and the RAID disk array 56A or 56B implement a tier 4 (slower than tier-3 but with greater capacity than tier-3) functionality. The page pool filter 374 operates to store and retrieve blocks of data from RAID disk arrays 56A and 56B considering the characteristics of RAID disk arrays 56A and 56B.

It should be appreciated that tiering functionality can be implemented with other combinations of filters and stores. It should also be appreciated that other filter stack 132 layouts could generate different tier assignments than those listed above. Additional storage types such as the cloud storage provider 64 or tape stores would likely involve the filter stack 132 adding additional filters or re-arranging the order of the filters in such a way as to accommodate the characteristics of any new tier employing one or more of these types of stores. Further, as faster stores become available, these faster stores can be used to implement a tier that is faster than the memory that constitutes the tier-1 in the illustrated system.

The foregoing description of the invention is intended to explain the best mode known of practicing the invention and to enable others skilled in the art to utilize the invention in various embodiments and with the various modifications required by their particular applications or uses of the invention

What is claimed is:

1. A data storage system having a quality of service capability, the system comprising:
    an input/output port configured to receive a block command packet that embodies one of a read block command and a write block command and transmitting a block result packet in reply to a block command packet;
    a data store system having at least first and second data stores each configured to receive and store data in response to a write block command and retrieve and provide data in response to a read block-command;
    wherein the first data store has first data storage characteristics;
    wherein the second data store has second data storage characteristics;
    wherein the data store system has a data store system quality of service goal;
    a statistics database configured to receive, store, and provide data for use in making decisions related to the pursuit of the data store system quality of service goal; and
    a sorting processor configured to sort an input string comprised of multiple read/write block commands, wherein the sorting processor is configured to order the multiple read/write block commands in the output string based on:
        (a) the first and second data storage characteristics of the first and second data stores, (b) the data store system quality of service goal, and (c) statistical data provided by the statistics database, wherein the sorting processor is also configured, in connection with the sorting of read/write block command, to determine which of the first and second data stores should receive the read/write block command such that processing of the command via the selected one of the first and second data stores is unlikely to violate a time constraint.

2. A data storage system, as claimed in claim 1, wherein:
the data store system is adaptable to accommodating at least a first volume with a volume quality of service goal;
the statistics data base is configured to receive, store, and provide data for use in making decisions related to the pursuit of the volume quality of service goal and the data store system quality of service goal;
wherein the sorting processor is configured to sort an input string comprised of multiple read/write block commands, wherein the sorting processor is configured to order the multiple read/write block commands in the output string based on:
(a) the first and second data storage characteristics of the first and second data stores (b) the data store system quality of service goal, (c) statistical data provided by the statistics database, and (d) the volume quality of service goal.

3. A data storage system, as claimed in claim 1, wherein:
the data store system is adaptable to accommodating at least a first volume with a first volume quality of service goal and a second volume with a second volume quality of service goal;
the statistics data base is configured to receive, store, and provide data for use in making decisions related to the pursuit of the first volume quality of service goal, the second volume of service goal, and the data store system quality of service goal;
wherein the sorting processor is configured to sort an input string comprised of multiple read/write block commands, wherein the sorting processor is configured to order the multiple read/write block commands in the output string based on:
(a) the first and second data storage characteristics of the first and second data stores (b) the data store system quality of service goal, (c) statistical data provided by the statistics database, (d) the first volume quality of service goal, and (e) the second volume quality of service goal.

4. A data storage system, as claimed in claim 1, wherein the sorting processor, in sorting a read/write block command, is capable of acquiring a combination of a criticality, throughput, queue depth, latency, and input-output operations per second (IOPS) statistical data.

5. A data storage system, as claimed in claim 2, wherein the sorting processor, in sorting a read/write block command, is capable of acquiring a combination of a criticality, throughput, queue depth, latency, and input-output operations per second (IOPS) statistical data associated with the at least first volume.

6. A data storage system, as claimed in claim 3, wherein the sorting processor, in sorting a read/write block command, is capable of acquiring:
a combination of a criticality, throughput, queue depth, latency, and input-output operations per second (IOPS) statistical data associated with whichever one of the first and second volumes the read/write block command is associated; and
a combination of a criticality, throughput, queue depth, latency, and input-output operations per second (IOPS) statistical data associated with the other of the first and second volumes in deciding the sorting of the read/write block command.

7. A data storage system, as claimed in claim 1, wherein the sorting processor, in sorting read/write block commands into a string, is capable of accessing a combination of a criticality, throughput, queue depth, latency, and input-output operations per second (IOPS) statistical data relating to the first and second data stores.

8. A data storage system, as claimed in claim 3, wherein the sorting processor is capable of determining a priority of a read/write block command relative to other read/write block commands using a weighted sum of weighted factors, the factors comprising:
(a) the criticality of the volume with which the read/write command is associated;
(b) the relationship of the read/write block command to the quality of service goal for the volume with which the read/write command is associated;
(c) the relationship of the read/write block command to the quality of service goal for any other volumes having the same criticality as the volume with which the read/write command is associated;
(d) the relationship of the read/write block command to the first and second data stores; and
(e) the relationship of the read/write block command to the quality of service goal for any other volumes having a different criticality than the volume with which the read/write command is associated.

9. A data storage system, as claimed in claim 8, wherein at least one factor has a value that is a current statistic value.

10. A data storage system, as claimed in claim 8, wherein at least one factor has a value that is a historic statistic value.

11. A data storage system, as claimed in claim 8, wherein each factor is weighted by a coefficient whose value relates to:
(a) the criticality and (b) reducing the difference between quality of service goals for the first and second volumes and the actual service obtained.

12. A data storage system, as claimed in claim 8, wherein each factor is weighted by a coefficient that changes over time.

13. A data storage system, as claimed in claim 2, wherein the statistics database is capable of providing the sorting processor with current statistical data that relates to a first time frame and historical statistical data that relates to a second time frame that is greater than the first time frame.

14. A data storage system, as claimed in claim 13, wherein the current statistical data and the historical statistical data relate to the first volume.

15. A data storage system, as claimed in claim 13, wherein the current statistical data and the historical statistical data relate to a first criticality associated with the first volume.

16. A data storage system having a quality of service capability, the system comprising:
an input/output port configured to receive a block command packet that embodies one of a read block command and a write block command and transmitting a block result packet in reply to a block command packet;
a data store system having at least first and second data stores each configured to receive and store data in response to a write block command and retrieve and provide data in response to a read block-command;
wherein the first data store has first data storage characteristics; wherein the second data store has second data storage characteristics;
wherein the data store system has a data store system quality of service goal; and
a sorting processor configured to sort an input string comprised of multiple read/write block commands, wherein the sorting processor is configured to order the multiple read/write block commands in the output string based on the:

(a) first and second data storage characteristics of the first and second data stores and (b) the data store system quality of service goal, wherein the sorting processor is also configured, in connection with the sorting of read/write block command, to determine which of the first and second data stores should receive the read/write block command such that processing of the command via the selected one of the first and second data stores is unlikely to violate a time constraint.

17. A data storage system, as claimed in claim 16, wherein:
the data store system is adaptable to accommodating at least a first volume with a volume quality of service goal;
wherein the sorting processor is configured to sort an input string comprised of multiple read/write block commands, wherein the sorting processor is configured to order the multiple read/write block commands in the output string based on:
   (a) the first and second data storage characteristics of the first and second data stores (b) the data store system quality of service goal, and (c) the volume quality of service goal.

18. A data storage system, as claimed in claim 16, wherein:
the data store system is adaptable to accommodating at least a first volume with a first volume quality of service goal and a second volume with a second volume quality of service goal;
wherein the sorting processor is configured to sort an input string comprised of multiple read/write block commands, wherein the sorting processor is configured to order the multiple read/write block commands in the output string based on:
   (a) the first and second data storage characteristics of the first and second data stores (b) the data store system quality of service goal, (c) the first volume quality of service goal, and (d) the second volume quality of service goal.

19. A data storage system, as claimed in claim 16, wherein the sorting processor, in sorting a read/write block command, is capable of acquiring a combination of a criticality, throughput, queue depth, latency, and input-output operations per second (IOPS) characteristics.

20. A data storage system, as claimed in claim 17, wherein the sorting processor, in sorting a read/write block command, is capable of acquiring a combination of a criticality, throughput, queue depth, latency, and input-output operations per second (IOPS) related to the volume quality of service goal associated with the at least first volume.

21. A data storage system, as claimed in claim 18, wherein the sorting processor, in sorting a read/write block command, is capable of acquiring:

a combination of a criticality, throughput, queue depth, latency, and input-output operations per second (IOPS) related to the volume quality of service goal associated with whichever one of the first and second volumes the read/write block command is associated; and a combination of a criticality, throughput, queue depth, latency, and input-output operations per second (IOPS) related to the volume quality of service goal associated with the other of the first and second volumes in deciding the sorting of the read/write block command.

22. A data storage system, as claimed in claim 16, wherein the sorting processor, in sorting read/write block commands into a string, is capable of accessing a combination of a criticality, throughput, queue depth, latency, and input-output operations per second (IOPS) characteristics relating to the first and second data stores.

23. A data storage system, as claimed in claim 18, wherein the sorting processor capable of determining a priority of a read/write block command relative to other read/write block commands using a weighted sum of weighted factors, the factors comprising:
   (a) the criticality of the volume with which the read/write command is associated;
   (b) the relationship of the read/write block command to the quality of service goal for the volume with which the read/write command is associated;
   (c) the relationship of the read/write block command to the quality of service goal for any other volumes having the same criticality as the volume with which the read/write command is associated;
   (d) the relationship of the read/write block command to the first and second data stores; and
   (e) the relationship of the read/write block command to the quality of service goal for any other volumes having a different criticality than the volume with which the read/write command is associated.

24. A data storage system, as claimed in claim 23, wherein each factor is weighted by a coefficient whose value relates to:
   (a) the criticality and (b) reducing the difference between quality of service goals for the first and second volumes and the actual service obtained.

25. A data storage system, as claimed in claim 23, wherein each factor is weighted by a coefficient that changes over time.

26. A data storage system, as claimed in claim 16, wherein the sorting processor, in sorting a read/write block command, is capable of acquiring a combination of a criticality, throughput, queue depth, latency, and input-output operations per second (IOPS) related to the data store system quality of service goal.

* * * * *